United States Patent [19]
Betts et al.

[11] Patent Number: 5,305,396
[45] Date of Patent: Apr. 19, 1994

[54] DATA PROCESSING SYSTEM AND METHOD FOR SELECTING CUSTOMIZED CHARACTER RECOGNITION PROCESSES AND CODED DATA REPAIR PROCESSES FOR SCANNED IMAGES OF DOCUMENT FORMS

[75] Inventors: Timothy S. Betts, Germantown; Valerie M. Carras, Kensington; Lewis B. Knecht, Olney, all of Md.

[73] Assignee: International Business Machines Corporation, Armonk, N.Y.

[21] Appl. No.: 870,507

[22] Filed: Apr. 17, 1992

[51] Int. Cl.$^5$ .............................................. G06K 9/62
[52] U.S. Cl. ...................................... 382/36; 382/40; 382/61
[58] Field of Search .................. 382/36, 38, 40, 61, 382/9

[56] References Cited

U.S. PATENT DOCUMENTS

| | | | |
|---|---|---|---|
| 4,503,556 | 3/1985 | Scherl et al. | 382/9 |
| 4,533,959 | 8/1985 | Sakurai | 382/61 |
| 4,589,142 | 5/1986 | Bednas | 382/38 |
| 4,616,854 | 10/1986 | Landrum et al. | 283/74 |
| 4,741,045 | 4/1988 | Denning | 382/9 |
| 4,748,678 | 5/1988 | Takeda et al. | 382/61 |
| 4,813,077 | 3/1989 | Woods et al. | 382/61 |
| 4,876,731 | 10/1989 | Loris et al. | 382/40 |
| 4,933,979 | 6/1990 | Suzuki et al. | 382/61 |
| 4,933,984 | 6/1990 | Nakano et al. | 382/61 |
| 4,949,392 | 8/1990 | Barski et al. | 382/61 |
| 5,010,580 | 4/1991 | Vincent et al. | 382/61 |
| 5,025,484 | 6/1991 | Yamanori et al. | 382/40 |
| 5,050,218 | 6/1991 | Ikeda et al. | 382/40 |
| 5,119,437 | 6/1992 | Kuwamura et al. | 382/40 |

OTHER PUBLICATIONS

R. G. Casey, et al. entitled "Intelligent Forms Processing," *IBM Systems Journal*, vol. 29, No. 3, 1990, pp. 435–450.

*Primary Examiner*—Joseph Mancuso
*Attorney, Agent, or Firm*—John E. Hoel

[57] ABSTRACT

A data processing method, system and computer program repairs character recognition errors for digital images of document forms. A document form processing template is provided which specifies the identity and preferred sequence for selected, customized character recognition processes and selected, customized coded data error correction processes which are reasonably likely to be needed to automatically process a selected batch of document forms whose fields have certain, anticipated, uniform characteristics.

19 Claims, 48 Drawing Sheets

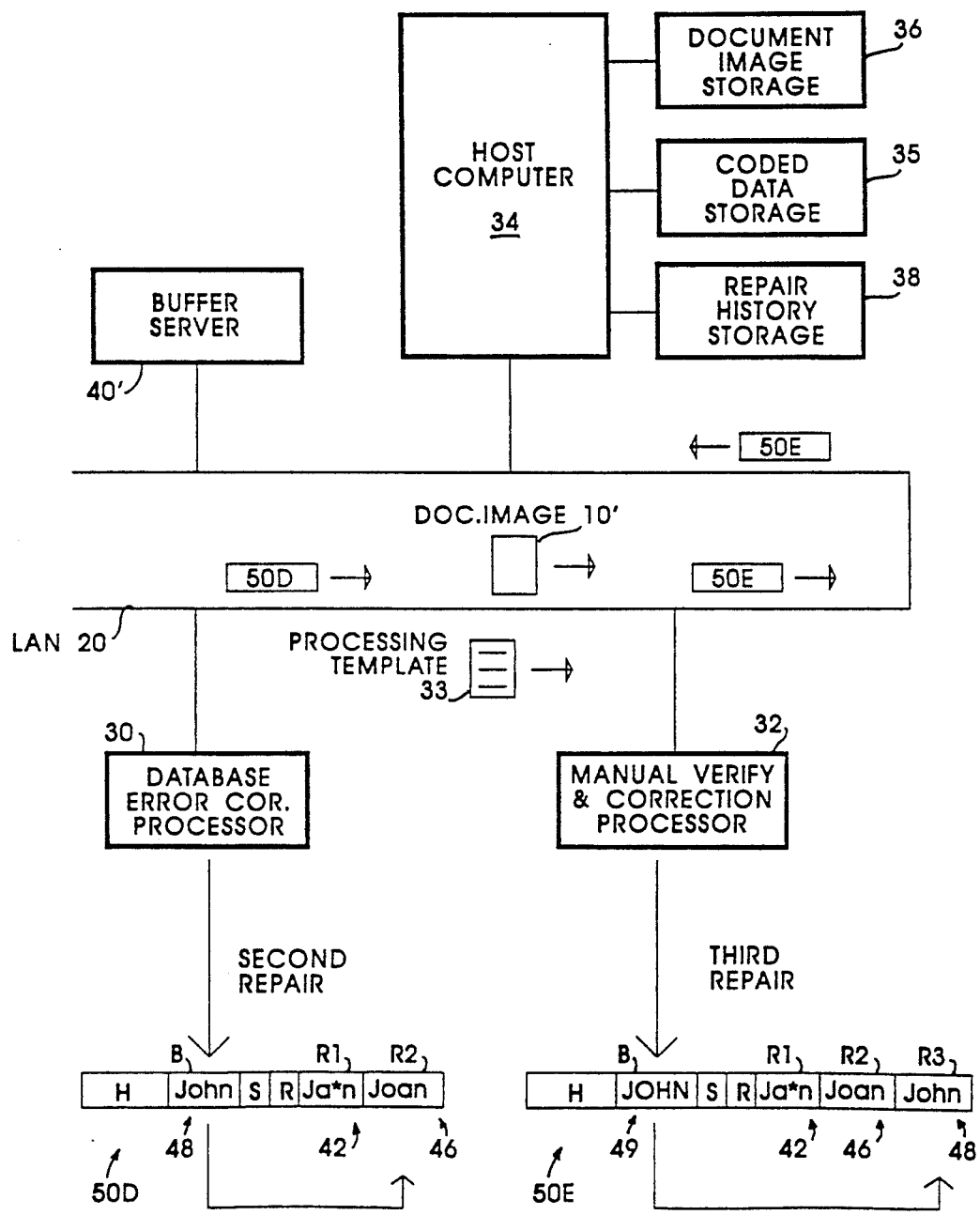

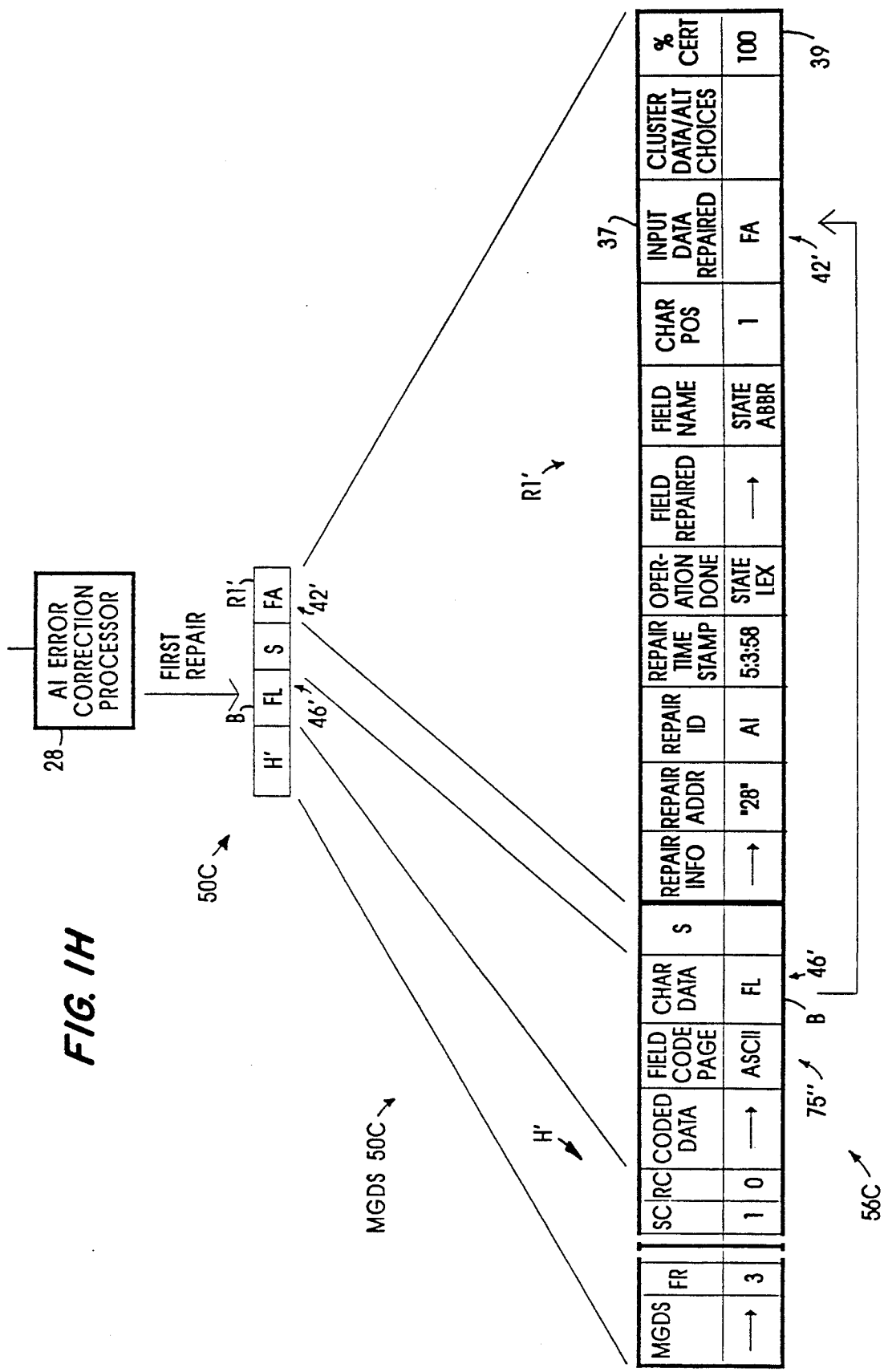
FIG. IH

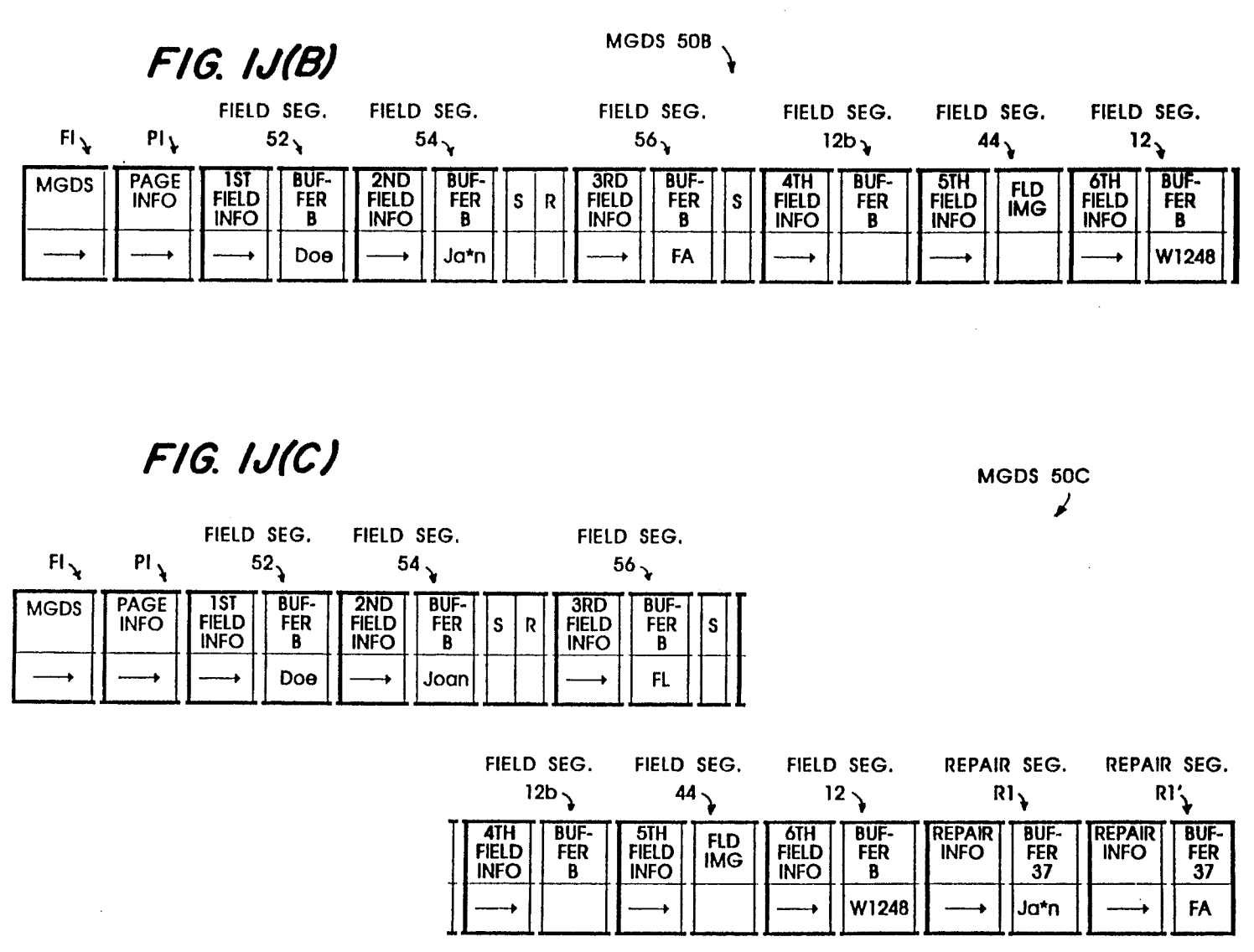

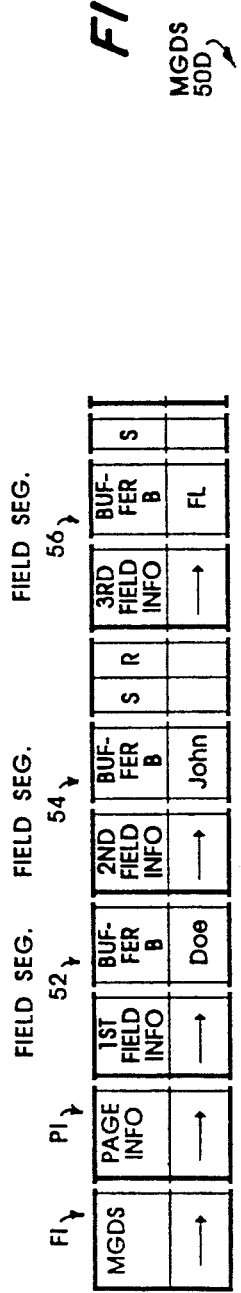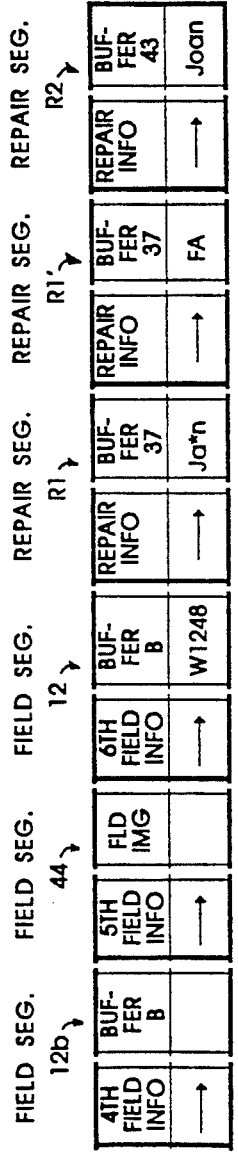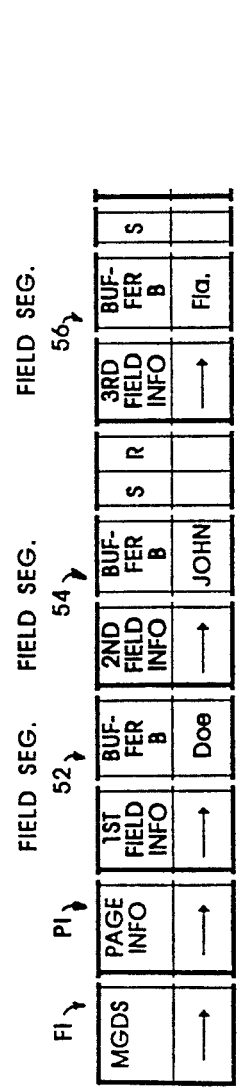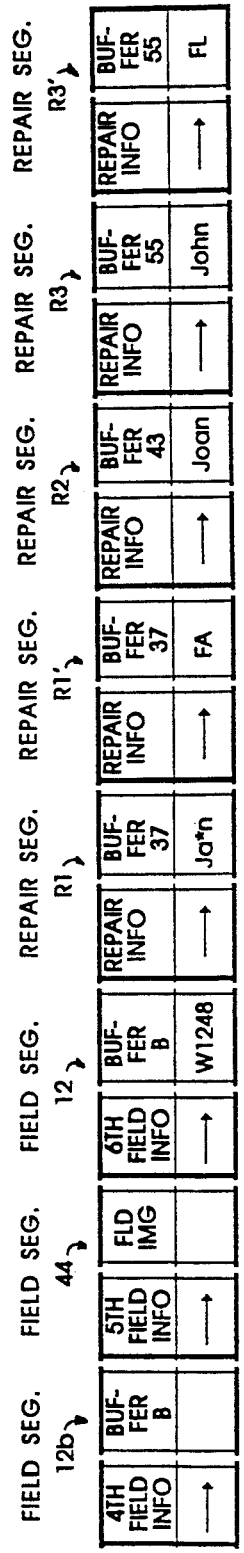
FIG. 1J(D)
FIG. 1J(E)

FIG. 2A

MASTER FORM 10F

- 11F → FIELD: FORM NUMBER
- FIELD: SERIAL NUMBER
- 12F
- 14F → FIELD: LAST NAME — 13
- Insurance Claim Form
- 16F → FIELD: FIRST NAME — 17
- 12aF → FIELD: STATE
- 12bF → FIELD: ADDRESS
- 44F → FIELD: SIGNATURE

FIG. 2C

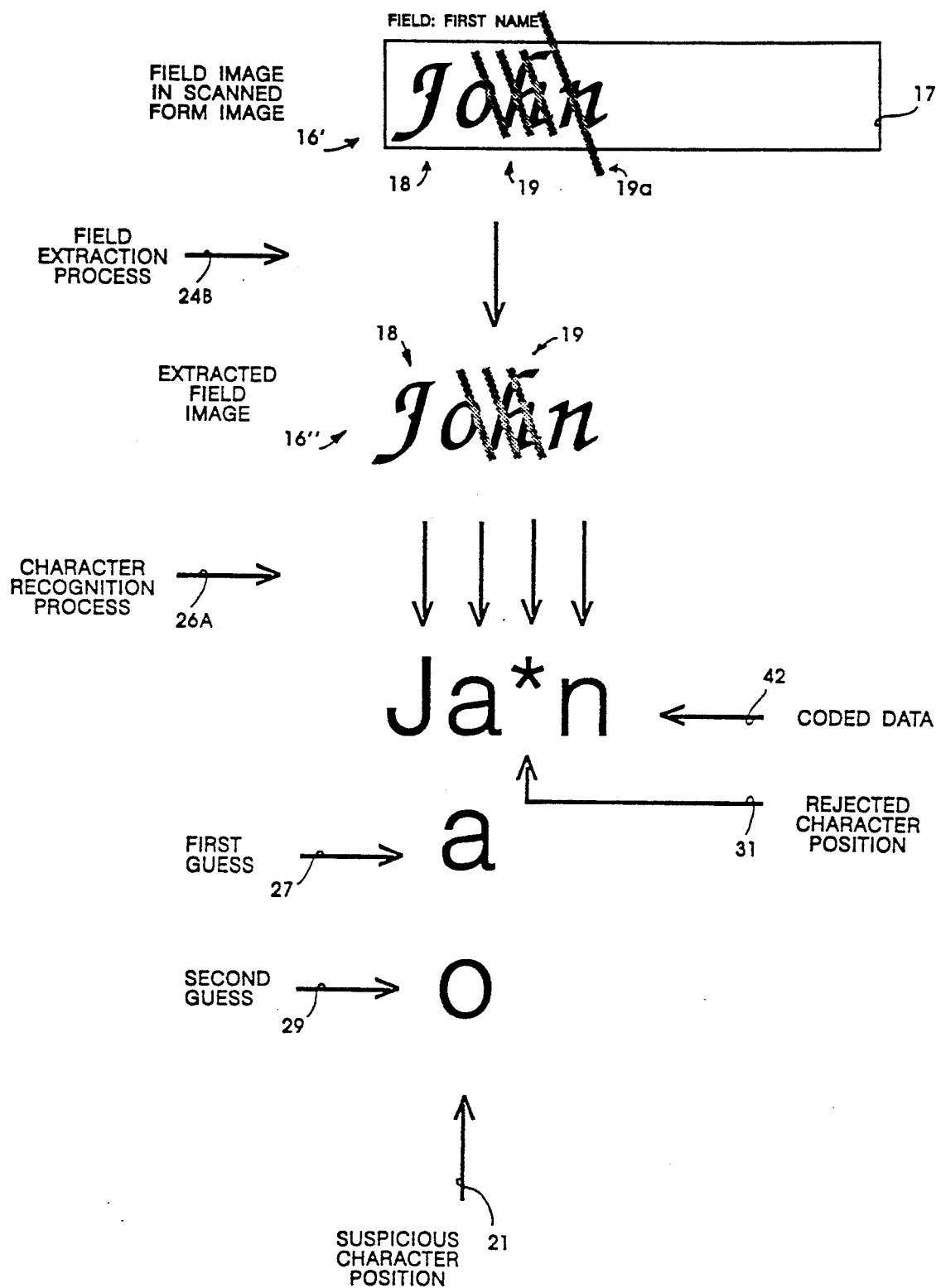

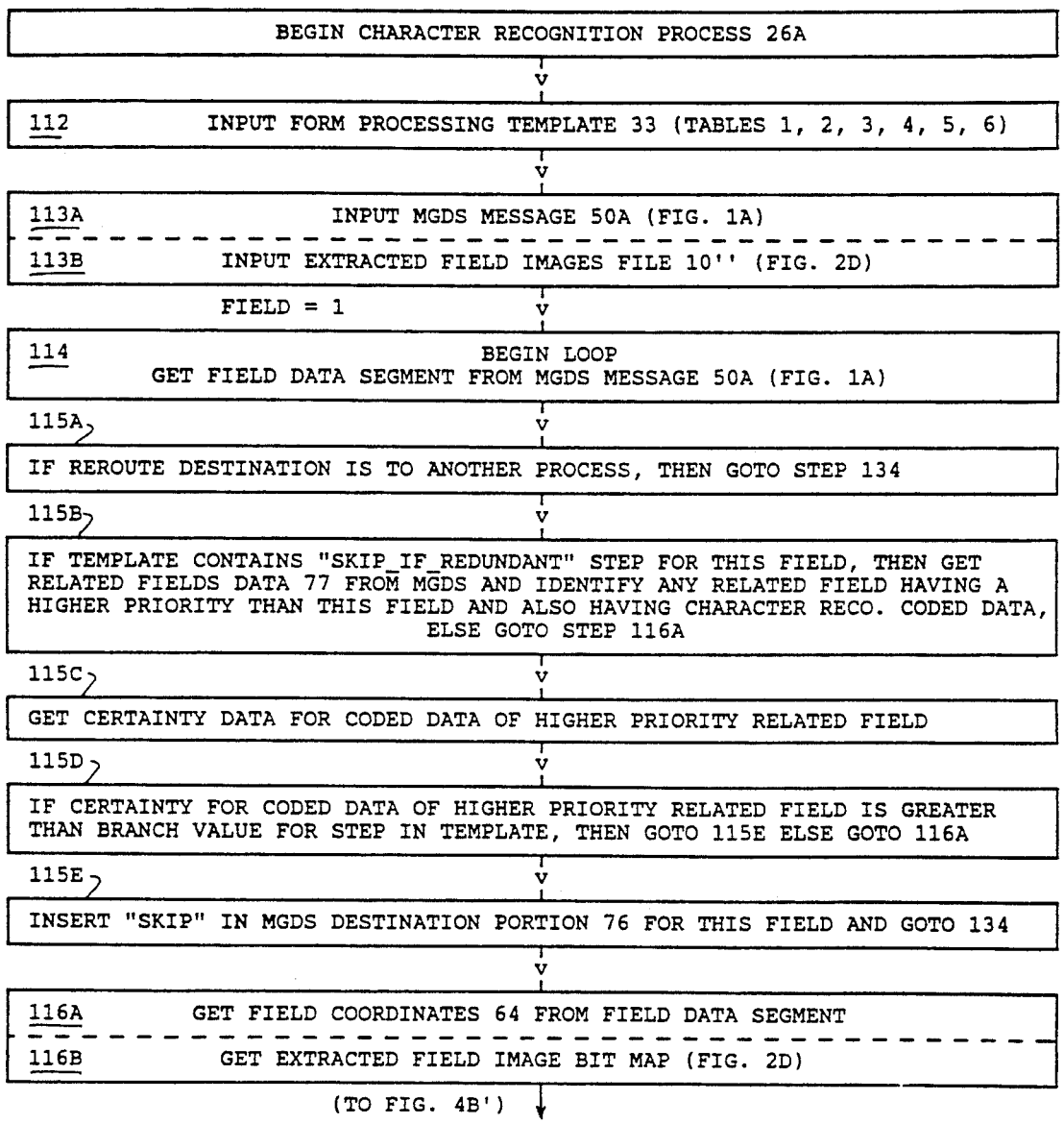

FIG. 4B

| | |
|---|---|
| | BEGIN CHARACTER RECOGNITION PROCESS 26A |

| | |
|---|---|
| 112 | INPUT FORM PROCESSING TEMPLATE 33 (TABLES 1, 2, 3, 4, 5, 6) |

| | |
|---|---|
| 113A | INPUT MGDS MESSAGE 50A (FIG. 1A) |
| 113B | INPUT EXTRACTED FIELD IMAGES FILE 10'' (FIG. 2D) |

FIELD = 1

| | |
|---|---|
| 114 | BEGIN LOOP<br>GET FIELD DATA SEGMENT FROM MGDS MESSAGE 50A (FIG. 1A) |

115A
IF REROUTE DESTINATION IS TO ANOTHER PROCESS, THEN GOTO STEP 134

115B
IF TEMPLATE CONTAINS "SKIP_IF_REDUNDANT" STEP FOR THIS FIELD, THEN GET RELATED FIELDS DATA 77 FROM MGDS AND IDENTIFY ANY RELATED FIELD HAVING A HIGHER PRIORITY THAN THIS FIELD AND ALSO HAVING CHARACTER RECO. CODED DATA, ELSE GOTO STEP 116A

115C
GET CERTAINTY DATA FOR CODED DATA OF HIGHER PRIORITY RELATED FIELD

115D
IF CERTAINTY FOR CODED DATA OF HIGHER PRIORITY RELATED FIELD IS GREATER THAN BRANCH VALUE FOR STEP IN TEMPLATE, THEN GOTO 115E ELSE GOTO 116A

115E
INSERT "SKIP" IN MGDS DESTINATION PORTION 76 FOR THIS FIELD AND GOTO 134

| | |
|---|---|
| 116A | GET FIELD COORDINATES 64 FROM FIELD DATA SEGMENT |
| 116B | GET EXTRACTED FIELD IMAGE BIT MAP (FIG. 2D) |

(TO FIG. 4B')

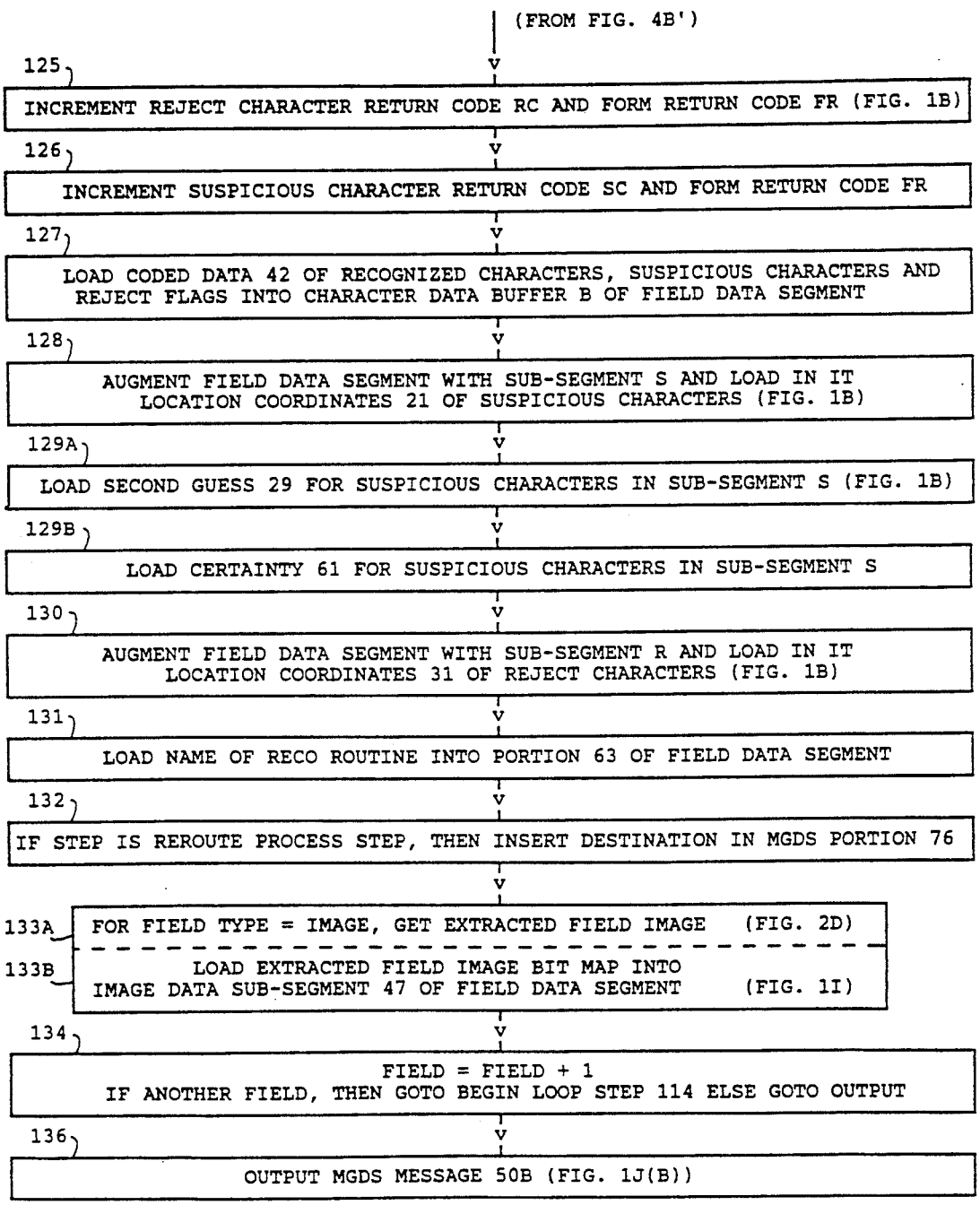

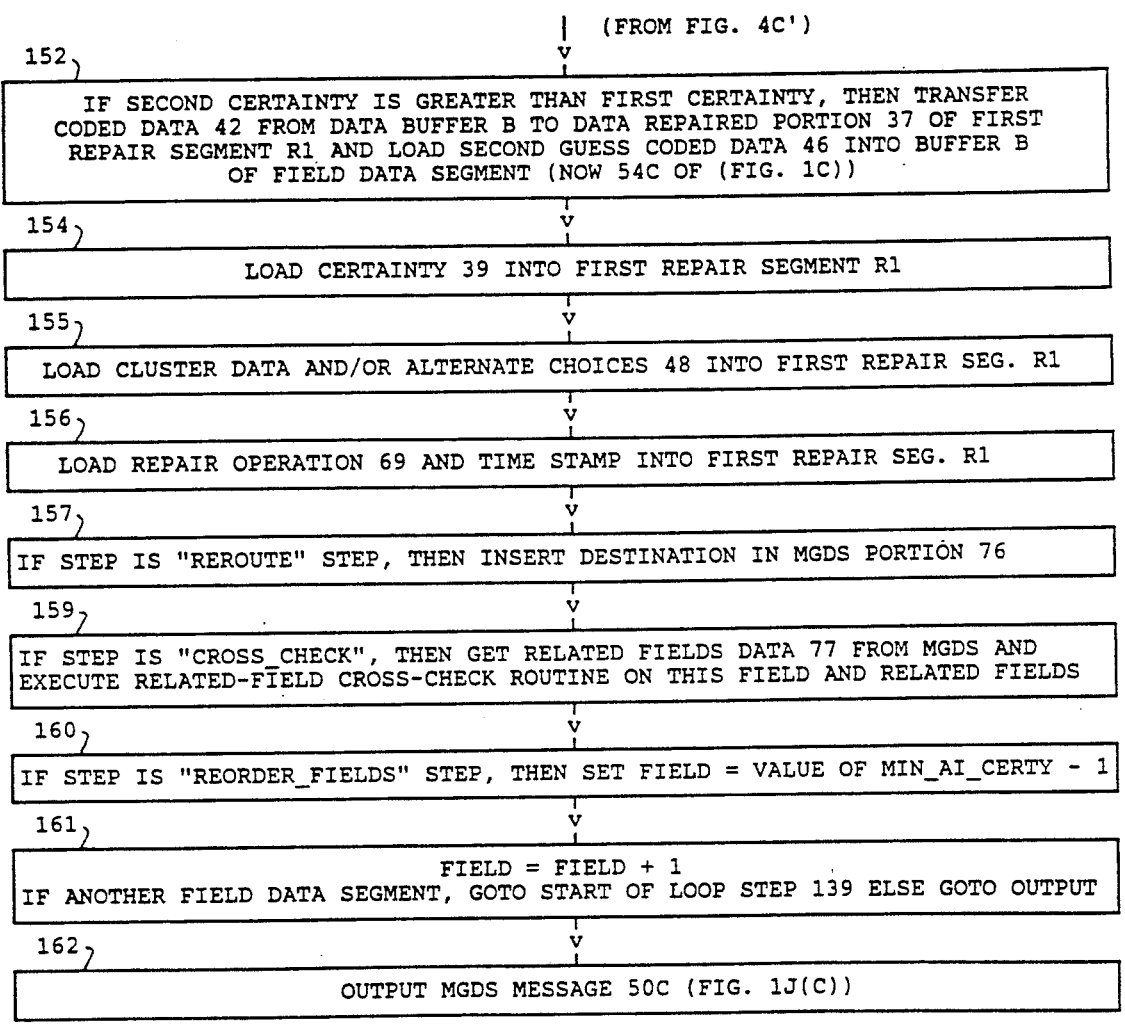
FIG. 4C"

FIG. 6

FORM INFORMATION

| MGDS | | | MGDS VERSION | | | FORM RETURN CODE | | | WHEN TO CONVERT | | |
|---|---|---|---|---|---|---|---|---|---|---|---|
| LENGTH | ID | DATA | LENGTH | ID | DATA | LENGTH | ID | DATA | LENGTH | ID | DATA |
| ???? | 1100 | → | 0006 | 1121 | 0001 | 0006 | 1101 | 0000 | 0005 | 112B | 00 |

| FORM CLASS NAME | | | FORM NAME | | | GENERAL CODE PAGE | | | UNRECOED CHAR. FLAG | | |
|---|---|---|---|---|---|---|---|---|---|---|---|
| LENGTH | ID | DATA | LENGTH | ID | DATA | LENGTH | ID | DATA | LENGTH | ID | DATA |
| 000A | 1102 | FCLASS | 0009 | 1103 | FTYPE | 0006 | 1122 | 0352 | 0005 | 1104 | * |

| NUMBER OF FIELDS | | | FORM CODE PAGE | | | HOST FORM CODE PAGE | | |
|---|---|---|---|---|---|---|---|---|
| LENGTH | ID | DATA | LENGTH | ID | DATA | LENGTH | ID | DATA |
| 0006 | 1105 | 0003 | 0006 | 1106 | 0352 | 0006 | 112C | 01F4 |

| HOST CODE PAGE | | | PAGE INFORMATION | | | PAGE INFORMATION | | |
|---|---|---|---|---|---|---|---|---|
| LENGTH | ID | DATA | LENGTH | ID | DATA | LENGTH | ID | DATA |
| 0006 | 1111 | 01F4 | ???? | 1127 | → | ???? | 1127 | → |

| FIELD INFORMATION | | | FIELD INFORMATION | | | FIELD INFORMATION | | |
|---|---|---|---|---|---|---|---|---|
| LENGTH | ID | DATA | LENGTH | ID | DATA | LENGTH | ID | DATA |
| ???? | 1107 | → | ???? | 1107 | → | ???? | 1107 | → |

PAGE INFORMATION

| PAGE INFORMATION | | | PAGE NUMBER | | | PAGE RESOLUTION | | | PAGE ORIENTATION | | |
|---|---|---|---|---|---|---|---|---|---|---|---|
| LENGTH | ID | DATA | LENGTH | ID | DATA | LENGTH | ID | DATA | LENGTH | ID | DATA |
| 0016 | 1127 | → | 0006 | 1128 | 0001 | 0006 | 1126 | 012C | 0006 | 111D | 0001 |

FIG. 7C

FIELD INFORMATION

| FIELD INFORMATION | | | REJECTED CHAR. RC | | | SUSPICIOUS CHAR RC | | | FIELD ASSOCIATION | | |
|---|---|---|---|---|---|---|---|---|---|---|---|
| LENGTH | ID | DATA | LENGTH | ID | DATA | LENGTH | ID | DATA | LENGTH | ID | DATA |
| ???? | 1107 | → | 0006 | 110D | 0000 | 0006 | 110B | 0000 | 0006 | 1109 | AUTO |

| FIELD NAME | | | FIELD FORM PAGE | | | FIELD COORDINATES | | |
|---|---|---|---|---|---|---|---|---|
| LENGTH | ID | DATA | LENGTH | ID | DATA | LENGTH | ID | DATA |
| 000A | 110E | UNIT # | 0006 | 1120 | 0001 | 0014 | 110C | 00000064000000320000012C000000C8 |

| REJECT CHAR. INFO | | | REJECT CHAR. INFO | | |
|---|---|---|---|---|---|
| LENGTH | ID | DATA | LENGTH | ID | DATA |
| 0016 | 110F | → | 0016 | 110F | → |

| CODED DATA | | |
|---|---|---|
| LENGTH | ID | DATA |
| ???? | 1112 | → |

FIG. 7D

CODED DATA INFORMATION

| CODED DATA | | | FIELD CODE PAGE | | | CHARACTER BUFFER | | |
|---|---|---|---|---|---|---|---|---|
| LENGTH | ID | DATA | LENGTH | ID | DATA | LENGTH | ID | DATA |
| 0012 | 1112 | → | 0006 | 1113 | 01F4 | 0008 | 1108 | JOHN |

FIG. 7E

REJECT INFORMATION

| REJECT CHAR. INFO | | | CHARACTER COORDINATES | | | CHARACTER POSITION | | |
|---|---|---|---|---|---|---|---|---|
| LENGTH | ID | DATA | LENGTH | ID | DATA | LENGTH | ID | DATA |
| 001E | 110F | → | 0014 | 1114 | 0000026000000300000026A000000D8 | 0006 | 1115 | 0005 |

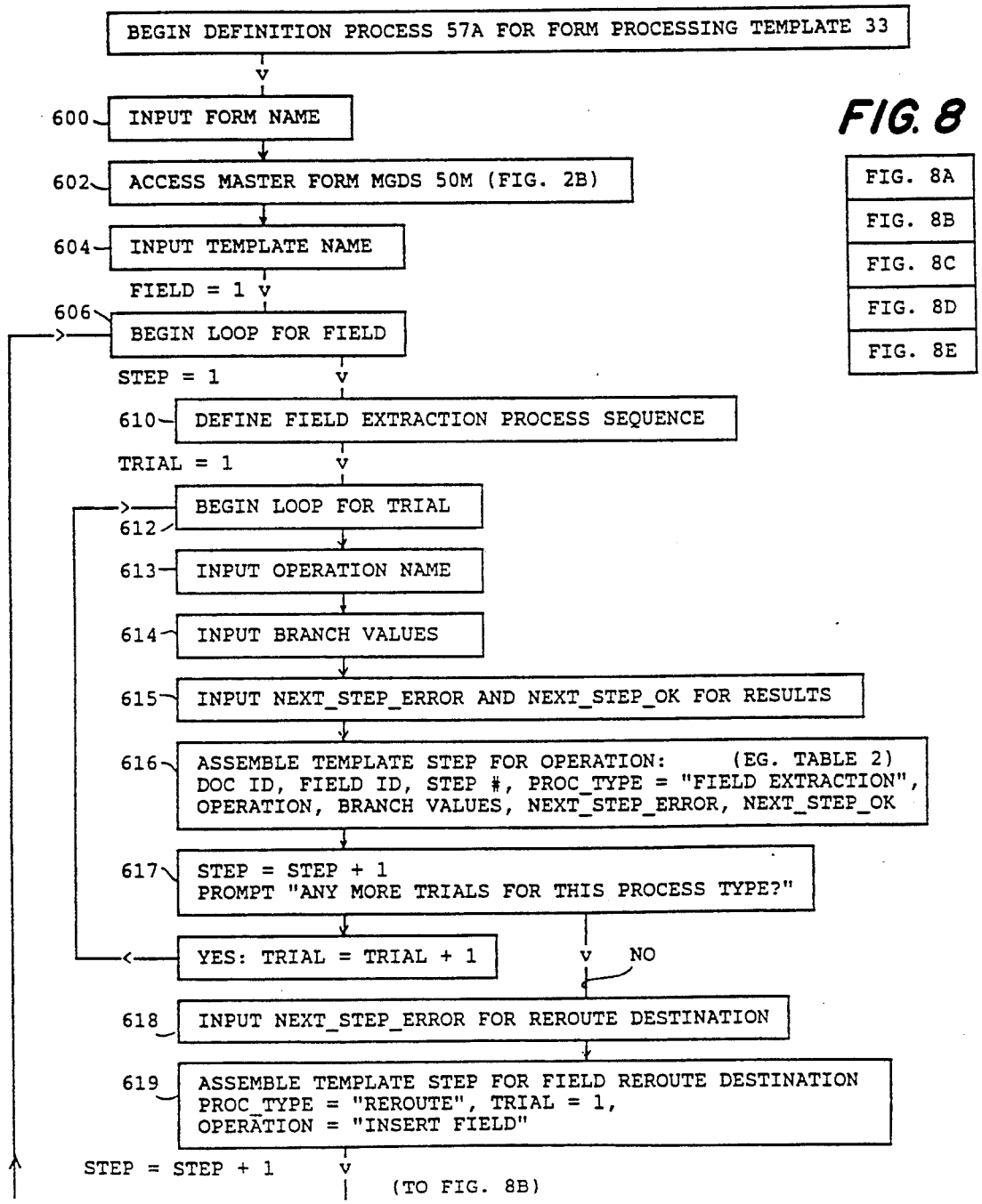

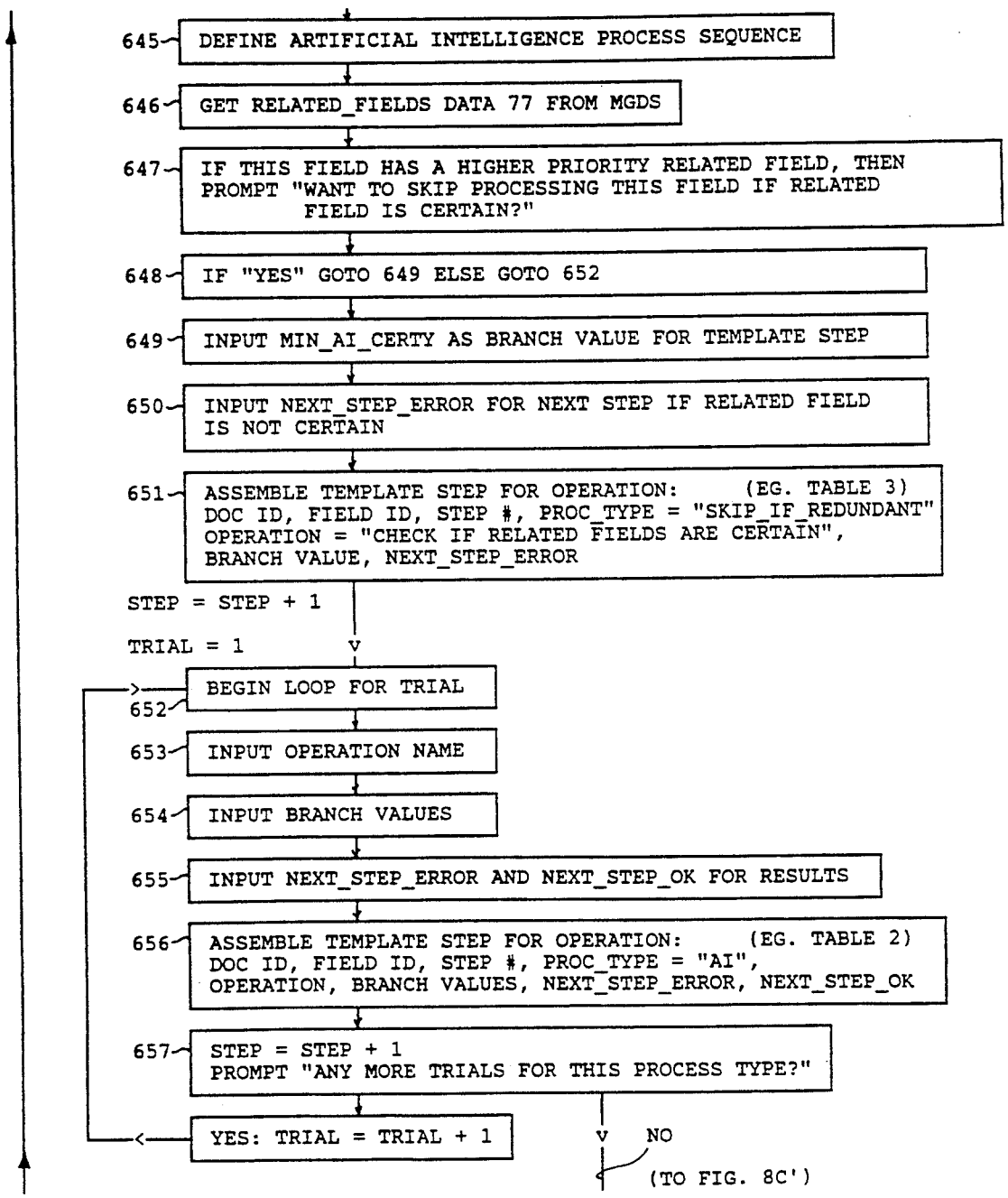

FIG. 8C"
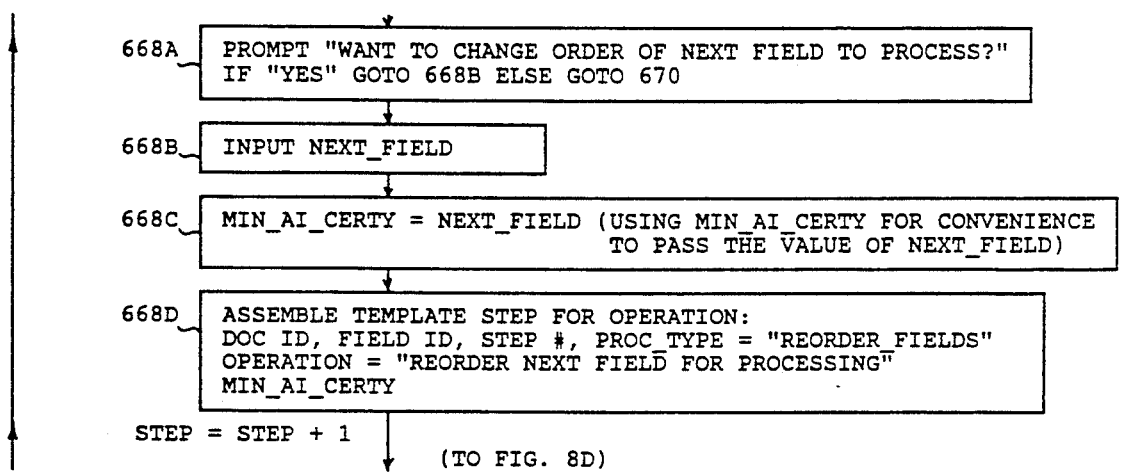

(FROM FIG. 8D)

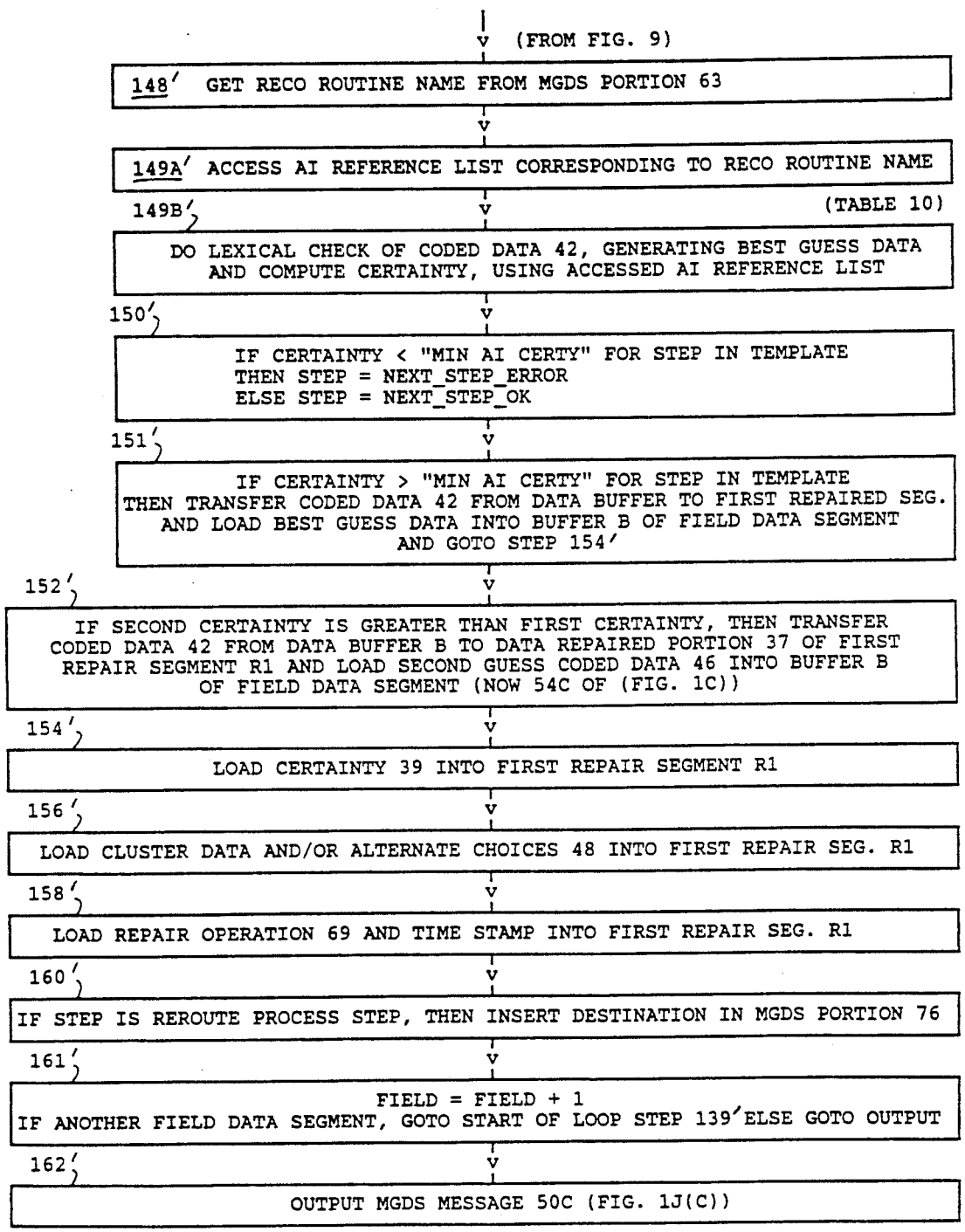

FIG. 10

| PROCESSING TEMPLATE 33 |
|---|
| HEADER PORTION 78<br>　　Template Name: "FLOOD CLAIMS"<br>　　Form Name: "INSURANCE CLAIM FORM"<br>　　Number of Fields: 6<br>　　Option for "SKIP_IF_REDUNDANT" step for all fields: NOT SELECTED<br>　　Option for "CROSS_CHECK" of all related fields: NOT SELECTED |
| FIELD PROCESSING DEFINITION PORTION 80<br>　　First Field　　(Table 1)<br>　　Second Field　(Table 2)<br>　　Third Field　　(Table 3)<br>　　Fourth Field　(Table 4)<br>　　Fifth Field　　(Table 5)<br>　　Sixth Field　　(Table 6) |

DATA PROCESSING SYSTEM AND METHOD FOR SELECTING CUSTOMIZED CHARACTER RECOGNITION PROCESSES AND CODED DATA REPAIR PROCESSES FOR SCANNED IMAGES OF DOCUMENT FORMS

BACKGROUND OF THE INVENTION

1. Technical Field

The invention disclosed broadly relates to data processing systems and methods and more particularly relates to techniques for the repair of character recognition information derived from scanned document images.

2. Related Patent Applications

This patent application is related to the co-pending U.S. patent application Ser. No. 07/870,129, filed Apr. 15, 1992, entitled "Data Processing System and Method for Sequentially Repairing Character Recognition Errors for Scanned Images of Document Forms," by T. S. Betts, V. M. Carras, L. B. Knecht, T. L. Paulson, and G. R. Anderson, the application being assigned to the IBM Corporation and incorporated herein by reference.

This patent application is also related to the co-pending U.S. patent application Ser. No. 07/305,828, filed Feb. 2, 1989, entitled "A Computer Implemented Method for Automatic Extraction of Data From Printed Forms," by R. G. Casey and D. R. Ferguson, the application being assigned to the IBM Corporation and incorporated herein by reference.

3. Background Art

Document forms can be filled out in a variety of ways. The examples of writing methods can include hand printing of block letters, cursive hand writing of characters, impact typing, and printing with a dot matrix printer. There can be a variety of character styles and alphabets used in filling out document forms. Latin alphabets are typically used for document forms filled out in western countries. Kanji and Mandarin alphabets are typically used in some East Asian countries. Hebrew or Arabic alphabets are used to fill out forms in some Middle Eastern countries. And Greek or Cyrillic alphabets are used in some Eastern European countries.

Each of the writing methods and alphabets requires a different, customized character recognition process to convert an image of a field in the document form into an alphanumeric string of coded data.

Errors which occur in the coded data output by a character recognition process, can be repaired if the original meaning of the writer can be inferred from the context of the erroneous data. Since the fields in document forms are categorized by subject matter, such as "Name," "Address," "City," "State," "Zip Code," "Country," etc, the context is already provided for making many error correction inferences. The original meaning of erroneous coded data in the "State" field, for example, can be inferred from correct coded data in the "Zip Code" field of the same document form.

Artificial intelligence (AI) knowledge base techniques can be applied to automatically make error correction inferences for narrow subject matter categories of most fields in a document form. For example, reference lists of common given names can be used for "First Name" fields. Reference lists of city, state or country names can be used for "City," "State" and "Country" fields, respectively. The shorter the reference list, the greater the certainty will be in resolving ambiguous coded data strings for a given field.

The number of different AI reference lists for a given document form can be at least as large as the number of fields on the form. And for each field, if the selection of the appropriate AI reference list is governed by the writing method or by the country where the document form was filled out, then the number of possible AI reference lists for each respective field increases by the number of such variations.

In many applications using document forms for the receipt of information from the public, the forms will be received in batches which are characterized by certain uniformities. For example, an international importer of general cargo will receive bills of lading in a batch with each arriving ship or airplane. If the cargo arriving on a first day was shipped from East Asia, for example, then it is reasonable to expect that some of the bill of lading document forms will have their fields filled out with Mandarin or Kanji characters, as well as with Latin alphabetic characters. On a second day, if the cargo was shipped from Eastern Europe, for example, then it is reasonable to expect that Greek and Cyrillic, as well as Latin alphabetic characters will have been used to fill out the same fields on the bill of lading document forms.

The character recognition processes and the AI error correction processes needed to automatically read the bill of lading document forms for the shipment received on the first day will be different from those which are needed to read the document forms for the shipment received on the second day.

There are still other secondary and tertiary coded data repair processes which can be applied to some of the subject matter fields on a document form. An example of this is a comparison of the corrected coded data derived from the "Name" field, with a data base of customer names for a particular application. If the selection of the appropriate data base is governed by the country where the document form was filled out, then the number of possible data base error correction processes for such a field increases by the number of such variations.

What is needed is a means to select customized character recognition processes and customized coded data error correction processes which are reasonably likely to be needed to automatically process a batch of document forms whose fields have certain, anticipated, uniform characteristics.

OBJECTS OF THE INVENTION

It is therefore an object of the invention to automatically perform error correction of character recognized coded data from document forms, in an improved manner.

It is another object of the invention to automatically perform error correction of character recognized coded data from document forms whose fields have have been filled out with a variety of writing methods, character styles and alphabets.

It is still a further object of the invention to provide a means to select customized character recognition processes and customized coded data error correction processes which are reasonably likely to be needed to automatically process a batch of document forms whose fields have certain, anticipated, uniform characteristics.

SUMMARY OF THE INVENTION

The invention is a data processing method, system and computer program for repairing character recognition errors for digital images of document forms.

The invention provides a document form processing template which specifies the identity and preferred sequence for selected, customized character recognition processes and selected, customized coded data error correction processes which are reasonably likely to be needed to automatically process a selected batch of document forms whose fields have certain, anticipated, uniform characteristics.

When a selected batch of document forms is to be processed, the method of the invention begins by inputting a document form processing template selected by the user. The template will include a first sequence specification for a first plurality of character recognition processes. These will include first occurring and second occurring character recognition processes. The template will also include a second sequence Specification for a second plurality of coded data repair processes. These will include first occurring and second occurring coded data repair processes.

Then a document form from the batch is scanned into the system, inputting a digital document image of a document form and extracting a field image from the document image, forming a corresponding extracted field image.

Then, in accordance with the invention, the method selects the first occurring character recognition process from the first plurality in the template which generates first recognition coded data from the extracted field image and generates first recognition error data.

The template includes a predetermined maximum recognition error value and this is used to determine if the first recognition error data is greater than the predetermined value.

If the error is too large, then in response to this, the method of the invention selects the second occurring character recognition process from the first plurality in the template which generates second recognition coded data from the extracted field image and generates second recognition error data.

Then, in accordance with the invention, the method selects the first occurring coded data repair process from the second plurality in the template which operates on the second recognition coded data and the second recognition error data to generate first repaired coded data.

The template also includes a predetermined minimum certainty value and this is used to determine if the first repaired coded data has less certainty than the predetermined value. If it does, then in response, the method selects the second occurring coded data repair process from the second plurality in the template which operates on the second recognition coded data and the second recognition error data to generate second repaired coded data.

In this manner, the invention provides a document form processing template which specifies the identity and preferred sequence for selected, customized character recognition processes and selected, customized coded data error correction processes which are reasonably likely to be needed to automatically process a selected batch of document forms whose fields have certain, anticipated, uniform characteristics.

Another aspect of the invention is the provision of a method for constructing a customized document form processing template which enables the user to customize character recognition processing sequences and coded data error correction processing sequences for particular batches of document forms.

Still another aspect of the invention is the provision of specialized error correction techniques which can be specified by the document form processing template. For example the document form processing template can specify that if a field of a form has a higher priority related field, then the option is provided to skip processing of the redundant field if the higher priority related field has a high certainty for its coded data. Another specialized feature is the provision of searching for linked knowledge base lists, a feature which can be selected from the document form processing template. Another feature of the invention is the provision of cross-checking of related fields, which can be specified by the document form processing template. Still another feature of the invention is the provision of optional re-routing of the processing sequence for a particular field and the optional changing of the order of the next field to be processed, as may be specified by the document form processing template. In this manner, the invention provides great flexibility to the user in specifying customized processing scenarios for character recognition and coded data correction for particular batches of document forms.

DESCRIPTION OF THE FIGURES

These and other objects, features and advantages will be more fully appreciate with reference to the accompanying figures.

FIG. 1J(C) illustrates the MGDS 50C after the artificial intelligence error correction processor 28 has completed its operations on all six of the fields in the form.

FIG. 1J(D) illustrates the MGDS 50D after the data base error correction processor 30 has completed its operations on all six of the fields in the form.

FIG. 1J(E) illustrates the MGDS 50E after the manual verify and correction processor 32 has completed its operations on all six of the fields in the form.

FIG. 2A illustrates the master form 10F.

FIG. 2C illustrates the scanned form image 10' of a document form.

FIG. 3 illustrates the sequence of processing steps for the field 16' in the document form image 10' shown in FIG. 2C.

FIG. 6 illustrates the relationships between machine generated data structure (MGDS) parameters.

FIG. 7A illustrates the form information portion FI of an MGDS.

FIG. 7B illustrates the page information portion PI for an MGDS.

FIG. 7C illustrates the field information format 54A for an MGDS.

FIG. 7D illustrates the coded data information portion 75 of an MGDS.

FIG. 7E illustrates the reject information portion S or R of an MGDS.

FIG. 10 illustrates the structure of an example processing template 33.

DISCUSSION OF THE PREFERRED EMBODIMENT

The repair history for a particular field of a document form is assembled in a machine generated data structure (MGDS) message. The MGDS is used as a data interface between the sequential repair processes and processors in the system. The MGDS also serves as the repository for the history of the repairs to the particular misrecognized character string, for the purpose of maintaining an audit trail.

Figure 5A:
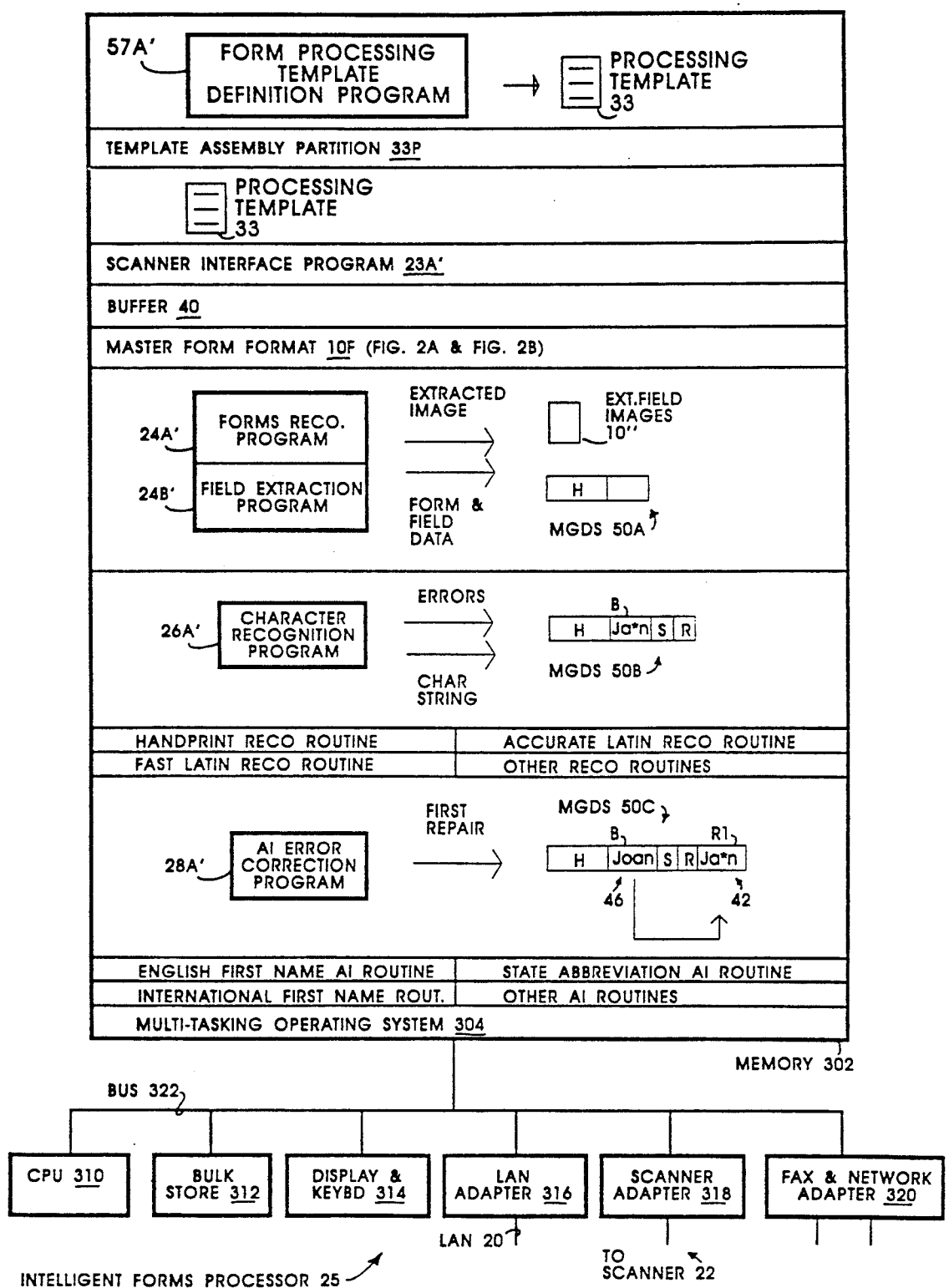
FIG. 5A illustrates a detailed architectural diagram of the intelligent forms processor 25.

FIG. 1 shows an overall architectural description of the data processing system for repairing character recognition errors for digital images of document forms. FIG. 1 is partitioned into a left half FIG. 1L and a right half FIG. 1R. A hard copy document 10 is scanned into the system with a scanner 22, resulting in a document image 10' which is shown in FIG. 2C. In the preferred embodiment of the invention, an intelligent forms processor 25, shown in greater detail in the architectural diagram of FIG. 5A, provides the form processing template definition processor 57, which generates the processing template 33. The document form processing template 33 specifies the identity and preferred sequence for selected, customized character recognition processes and selected, customized coded data error correction processes. It is these processes which the user feels are reasonably likely to be needed to automatically process a selected batch of documents whose fields have certain, anticipated, uniform characteristics. An example structure for the document form processing template 33 is shown in FIG. 10.

In the preferred embodiment of the invention, the intelligent forms processor 25 of FIG. 5A, also provides the scanner interface process with the scanner 22. The intelligent forms processor 25, shown in dotted outline in FIG. 1, also includes a buffer 40, a forms recognition and field extraction processor 24, a character recognition processor 26 and an artificial intelligence error correction processor 28. In the preferred embodiment of the invention, these various processors are implemented through corresponding computer programs which, when executed, perform the respective processes. In an alternate embodiment of the invention, as is shown in FIG. 1, the form processing template definition processor 57, the scanner processor 23, the buffer 40, the forms recognition and field extraction processor 24, the character recognition processor 26 and the artificial intelligence error correction processor 28, may each be separate processors connected together by the local area network (LAN) 20. In order to facilitate an understanding of the invention, the separate processor embodiment shown in FIG. 1 will be described first.

The local area network (LAN) 20 interconnects the template processor 57, scanner processor 23, buffer 40, forms recognition and field extraction processor 24, character recognition processor 26 and artificial intelligence error correction processor 28, to the host computer 34. Also connected to the LAN 20 is the data base error correction processor 30 and the manual verify and correction processor 32. In addition, an additional image capture facility buffer server 40' can be connected to the LAN 20. The host computer 34 has connected to it a document image storage 36, a coded data storage 35, and a repair history storage 38.

When a selected batch of document forms is to be processed by the system, the method of the invention begins by inputting a document form processing template 33 which has been selected by the user. The template will include a first sequence specification for a first plurality of character recognition processes that will be run by the character recognition processor 26. These will include a first occurring and a second occurring character recognition processes. The processing template 33 will also include a second sequence specification for a second plurality of coded data repair processes, such as will be carried out in the artificial intelligence error correction processor 28, or the data base error correction processor 30, or the manual verify and correction processor 32. These processors can include a first occurring and a second occurring coded data repair process.

A document 10 from the batch, is scanned into the system by means of the scanner 22, forming the document image 10' shown in greater detail in FIG. 2C. The document image 10' is a bit map representation of the image of the hard copy document 10. The scanner 22 outputs the document image 10' over the local area network 20 to the forms recognition and field extraction processor 24. A copy of the document image 10' can also be transferred to the host computer 34 and a temporary indexing identity can be assigned to the document image 10' so that it can be temporarily archived in the document image storage 36.

The forms recognition and field extraction processor 24 will include a library of master form definitions of forms which are to be processed by the system. The model of a form consists of a form pattern and a description of each field contained on a form. The form pattern is a set of characteristics that are used to distinguish one form type from another. The field description consists of the location of the field on the form expressed in Cartesian coordinates, an acceptance threshold for character recognition, identifying and field specifying information. A data field location can be expressed in the model by two points that describe the opposing corners of a rectangle. The rectangular area may be called a mask.

When the document image 10' is input to the forms recognition and field extraction processor 24, the image is analyzed to identify the form so that the appropriate master form definition data can be accessed. Several methods can be used for form recognition. One method matches the form number which may be typically printed on the document. A second method compares the layout or geography of the forms text and lines which may differentiate form types. A third method relies on the horizontal and vertical lines of the form. Once the document image 10' for the form is characterized, the corresponding master form definition data can be accessed which defines the coordinates for the respective fields, the names of the fields, and the code page for each respective field in the form.

Figure 4A:
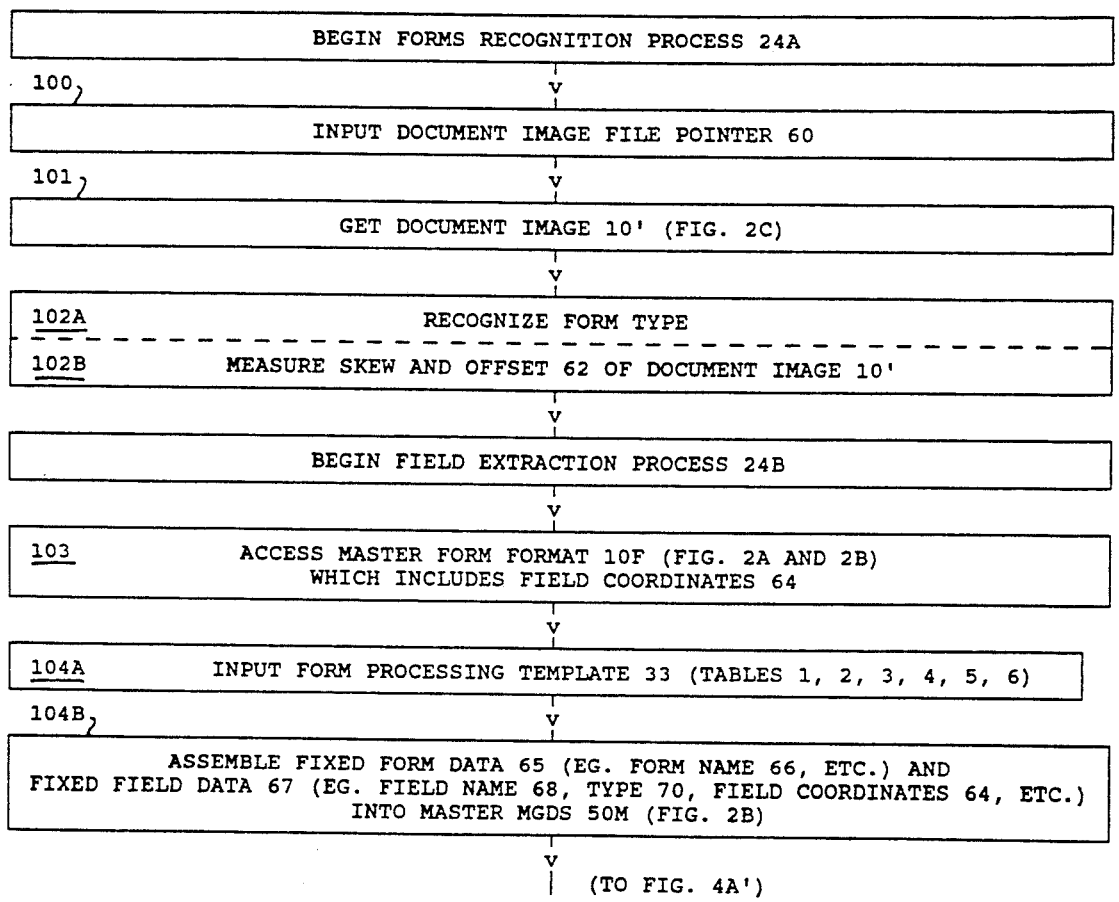
FIGS. 4A and 4A' show a flow diagram of the sequence of operational steps for the forms recognition process 24A and the field extraction process 24B.
Figure 4A:
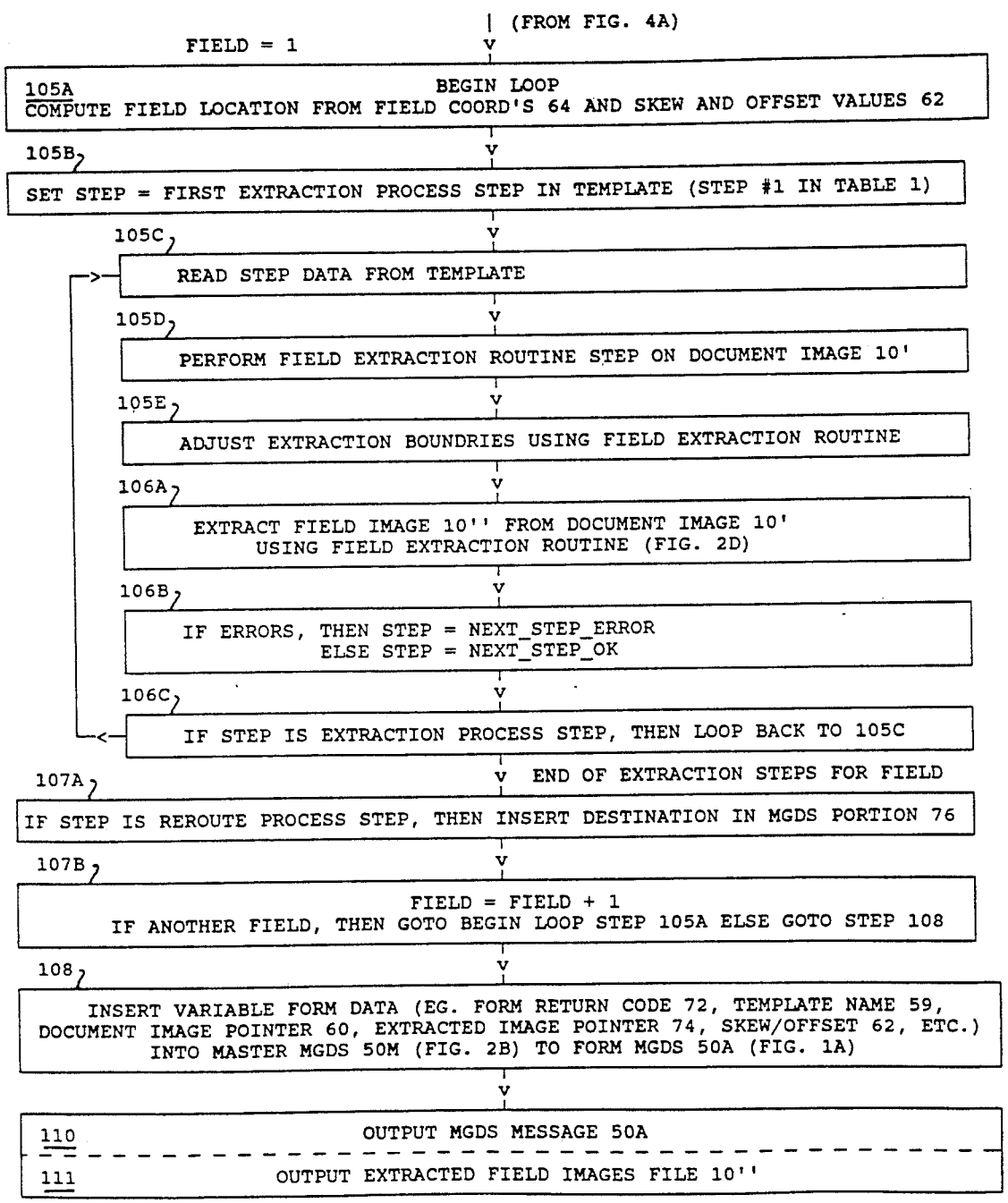

FIG. 4A is a flow diagram of the sequence of operational steps carried out in the forms recognition process 24A and in the field extraction process 24B.

When the scanner 22 scans in the document 10, the scanner processor 23 can perform some front-end operations such as rescaling and compression of the image into an image file to which is assigned a file address. The image file of the document image 10' can be temporarily buffered in the buffer 40 or alternately in the buffer server 40', accessible under an assigned address. Alternately, the scanner processor 23 can output the document image 10' directly to the forms recognition and field extraction processor 24.

FIG. 4A begins the forms recognition process 24A with step 100 which inputs a document image file pointer 60 which enables accessing the document image 10' from the buffer 40 or from the buffer server 40'. Step 101 of FIG. 4A gets the document image 10' which is shown in FIG. 2C. The example scanned form image 10' has six data fields and one form number field. The form number field 11' contains a bar code representation of the identity of the form, which is an insurance claim form. The first data field is field 14' which is the last name field. The second field 16' is the first name field. The third field is 12a' which is the state field. The fourth field 12b' is the address field. The fifth field 44' is the signature field and the sixth field 12' is the serial number field. Note that the first through fourth fields and the sixth field contain images of alphanumeric characters whereas the fifth field 44' contains the image of a signature.

Step 102A of FIG. 4A recognizes the form type. In the example of FIG. 2C, the form type will be recognized from the bar coded form number in field 11'. Then, in step 102B of FIG. 4A, the skew and offset of the form is measured, as it was scanned into the system. Skew and offset values 62 are important in that they must be combined with the pre-specified coordinates of each field on the form in order to locate the actual position of the fields on the scanned form image 10'.

The flow diagram of FIG. 4A then transitions to begin the field extraction process 24B which starts at step 103 by accessing the master form format 10F which includes the field coordinates for the fields on the form 10'. The master form format 10F is shown in FIG. 2A. The data representing the coordinates of each respective field on the form are pictorially represented in FIG. 2A, which depicts the master form 10F. Field 11F is the form number field, field 14F is the last name field, and it is bounded by a boundary 13. Field 16F is the first name field and it is bounded by a boundary 17. Field 12aF is the state field. Field 12bF is the address field. Field 44F is the signature field, and field 12F is the serial number field. These fields shown in FIG. 2A are the pictorial representation of coordinate data which is provided in the master form definition data set corresponding to the insurance claim form in this example.

Figure 2B:
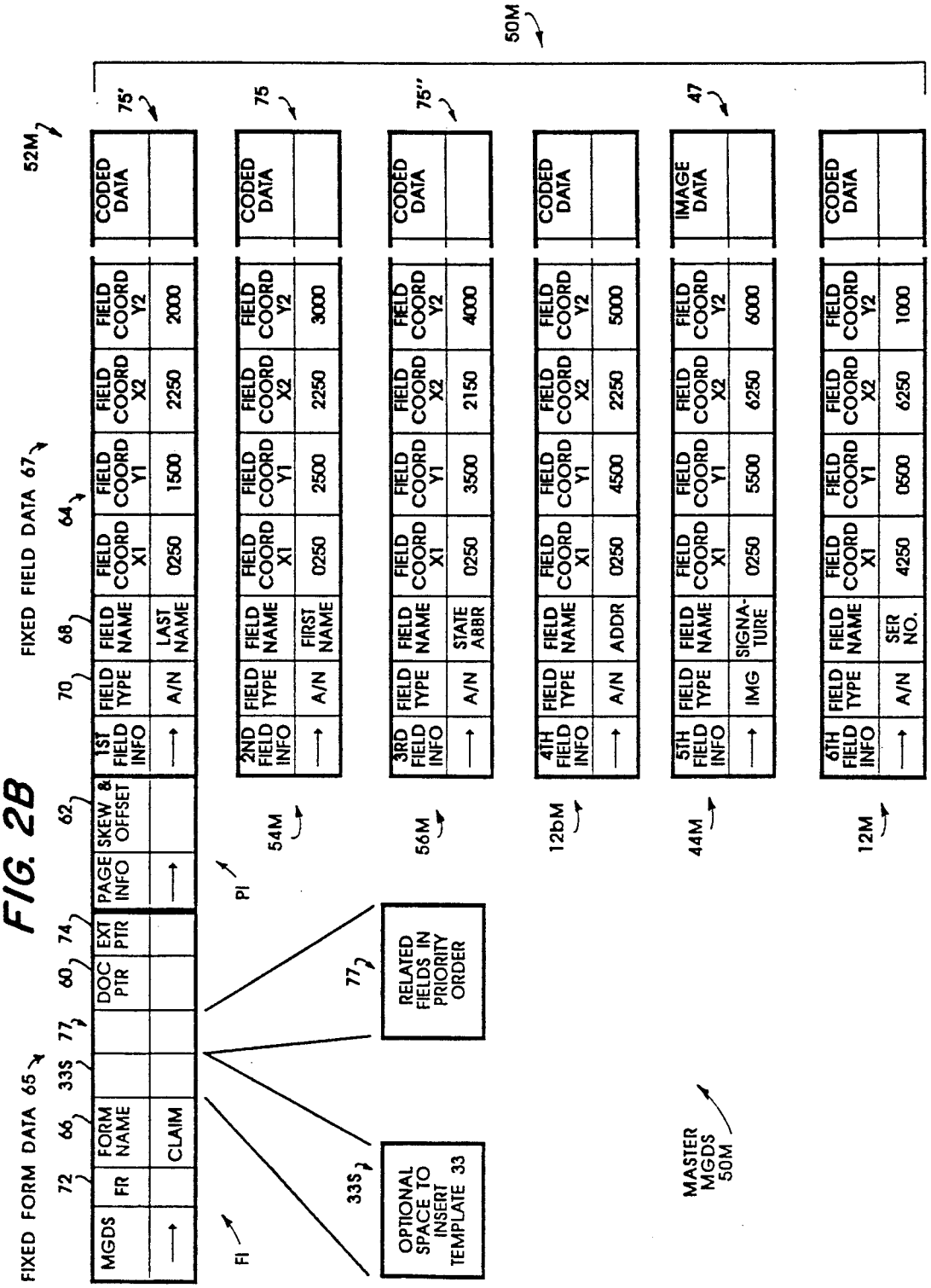
FIG. 2B illustrates the master MGDS 50M corresponding to the master form 10F of FIG. 2A.

FIG. 2B shows additional information which is included in the master form definition for the master form 10F shown in FIG. 2A. FIG. 2B depicts a master machine generated data structure (MGDS) 50M. The fixed form data 65 is included in the master MGDS 50M, such as the form name "claim," the number of fields and other like information such as is shown in the form information FI which is depicted in FIG. 7A. The identity of related fields, expressed in their order of priority, is inserted at 77 in the fixed form data portion of the MGDS. In addition, optional space can be provided to insert the form processing template 33 in the space 33S. Since the template 33 contains customized data for particular batches of forms, the actual template data 33 will be inserted into the space 33S at a later stage in the processing, typically by the forms recognition and field extraction processor 24. Also included in the fixed form data 65 of the master MGDS 50M of FIG. 2B is the page information PI for each page of the form. In the example shown herein, a single page form is employed. Fixed form data for a page would include for example the page number. Also included in the master MGDS 50M is fixed field data 64 for each of the six data fields in the master form 10F of FIG. 2A. Each field on the form is represented by a field data segment, such as field data segment 52M in FIG. 2B which corresponds to the first data field 14F in FIG. 2A. The field data segment 52M includes fixed field data 67 such as the field coordinates 64. Shown in FIG. 2B are the coordinates X1 and Y1 for the upper left-hand corner and X2 and Y2 for the lower right-hand corner of each rectangular field of the master form 10F of FIG. 2A. Also included in the fixed field data 67 is the field name, for example for the field data segment 52M corresponding to the last name field 14F of FIG. 2A, specifies that the field name 68 is "last name." Also included in the fixed field data 67 of FIG. 2B is the field type 70. For example, the field data segment 52M of FIG. 2B has a field type "A/N" which corresponds to alphanumeric.

Other field data 67 which can be included is shown in the field information depicted in FIG. 7C. The master MGDS 50M shown in FIG. 2B is one example of how the master form definition data can be organized and stored in the forms recognition and field extraction processor 24. The forms recognition and field extraction processor 24 will organize the fixed form data 65 for the form information FI and the page information PI and it will organize the fixed field data 67 for each respective field data segment 52M, etc. into a master MGDS 50M which it will transfer to the character recognition processor 26. Prior to such transfer, additional data will be added which is developed by the forms recognition process steps 100 through 102B, and in particular the information which will be added is the skew and offset data 62 for the form image 10', and optionally, the template 33 can be inserted into the space 33S.

Additional spaces can be allocated in the master MGDS 50M of FIG. 2B, for information which will be added at later stages in the recognition process. For example, the form return FR field 72 can have space allocated, optional document image file pointer 60 and optional extracted image file pointer 74 can be allocated. The coded data portion 75 can be added, among others. Each of these allocated fields in the MGDS 50M will be empty until they reach the processing stage in the system where the corresponding data is generated in the character recognition repair of the form.

Step 103 then transitions to step 104A in FIG. 4A, which inputs the form processing template 33. An example of a form processing template 33 is shown in Tables 1, 2, 3, 4, 5 and 6, all of these tables composing a single processing template 33, depicted in FIG. 10. The form processing template 33 was generated by the form processing template definition processor 57 to characterize a batch of forms. The processing template 33 is input to the forms recognition and field extraction processor 24.

Step 104A of FIG. 4A then transitions to step 104B in which fixed form data 65, for example a form name 66, etc., and fixed field data 67, for example the field name 68, the type 70, field coordinates 64, etc., are assembled into the master MGDS 50M, as is shown in FIG. 2B.

Step 104B then transitions to step 105A in FIG. 4A, which starts a loop for each field specified by the master MGDS for the form. The field variable is set equal to one and then in step 105A, the loop begins and the field location is computed for the first field from the field coordinates 64 and the skew and offset values 62.

Step 105A then transitions to step 105B, which sets the step variable equal to the first extraction process step in the template. For example, this would be step 1 in Table 1.

Figure 2C:
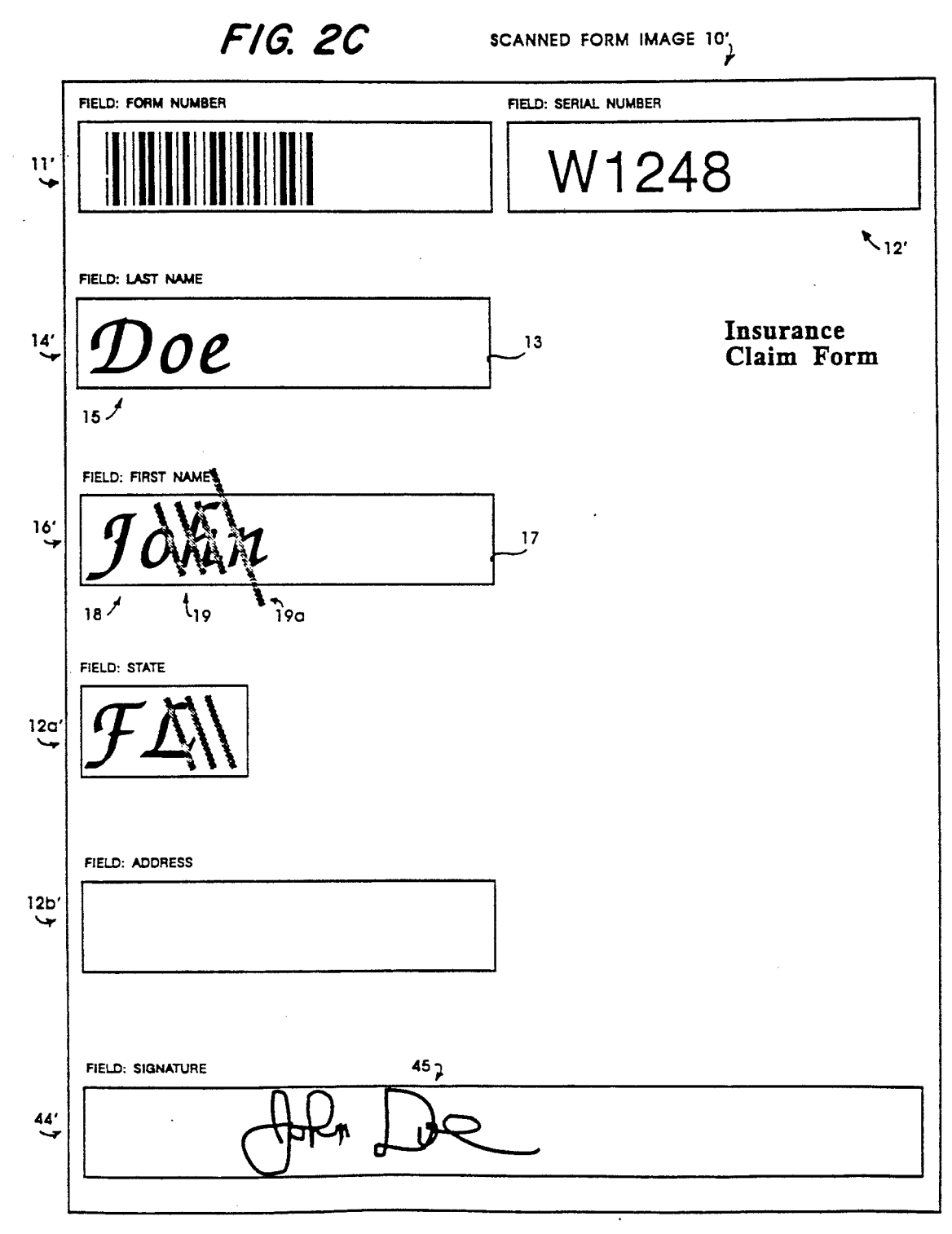
Figure 2D:
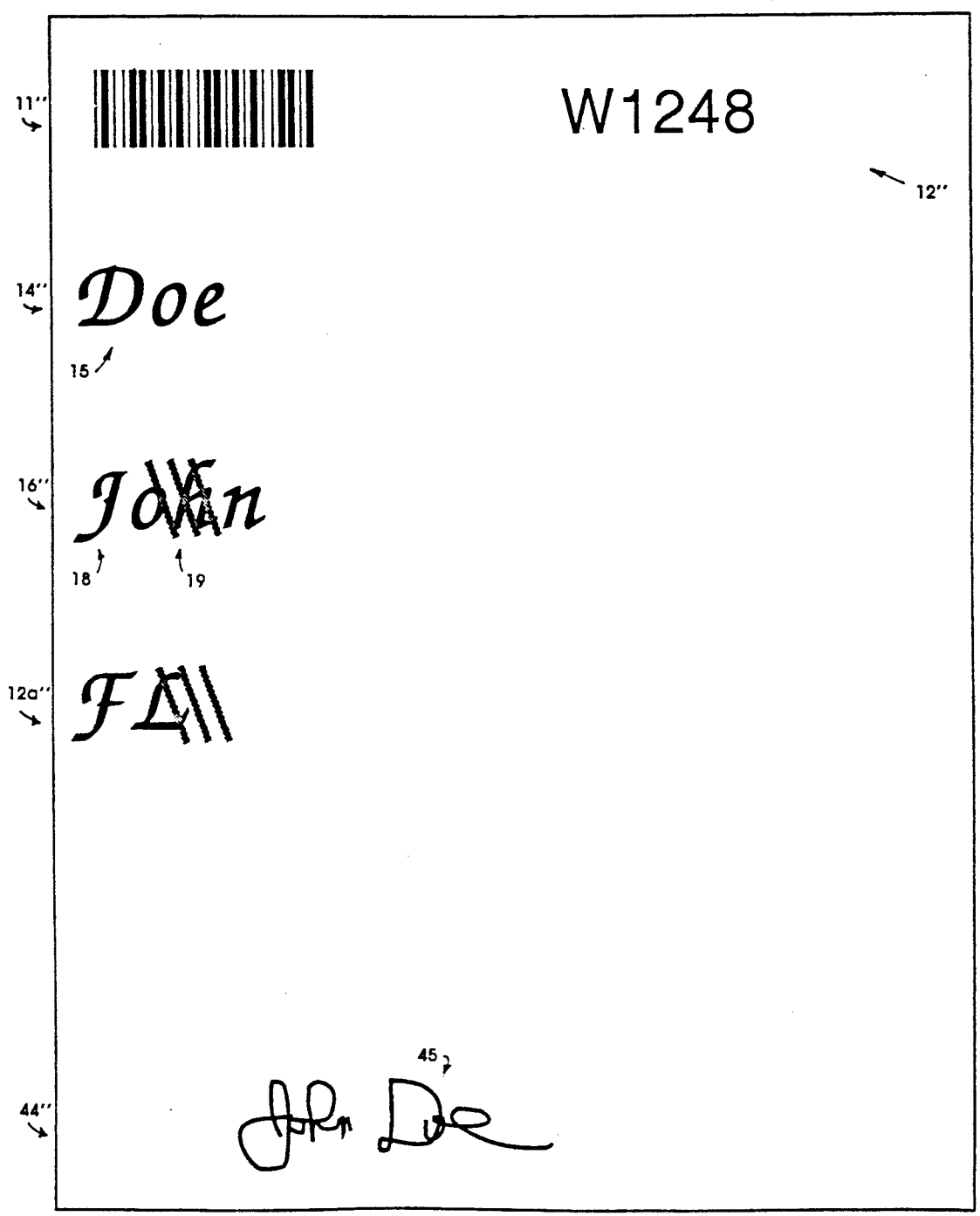
FIG. 2D illustrates the extracted field images 10" from the scanned form image 10' of FIG. 2C.

Then step 105B transitions to step 105C, which reads the step data from the template. This begins a loop for the particular step in the template. Then in step 105D, the field extraction routine step is performed on the document image 10'. Then in step 105E, the extraction boundaries are adjusted using image 10" is extracted from the document image 10', using the field extraction routine, as shown in FIG. 2D.

Step 106A then transitions to step 106B, which determines if there are errors resulting from executing the field extraction routine. If errors are detected, then the step variable is set equal to the next step error value provided in the template. Alternately, if no errors are detected in the field extraction routine, then the step variable is set equal to the next step OK, as provided in the template for this step.

Then step 106B transitions to step 106C, which determines if the new step is an extraction process step. If it is, then the process loops back to step 105C. Alternately, if the new step is not an extraction process step, then this ends the extraction steps for this field.

Step 106C then transitions to step 107A, which determines if the step is a re-route process step. If the template 33 has provided that the new step is a re-route process step, then the destination provided in the template, is inserted into the MGDS in portion 76.

Then step 107A transitions to step 107B, which increments the field variable by one and determines if there is another field in the form. If there is, then the process flows back to step 105A. If there is no additional field, then the process flows to step 108.

Figure 1A:
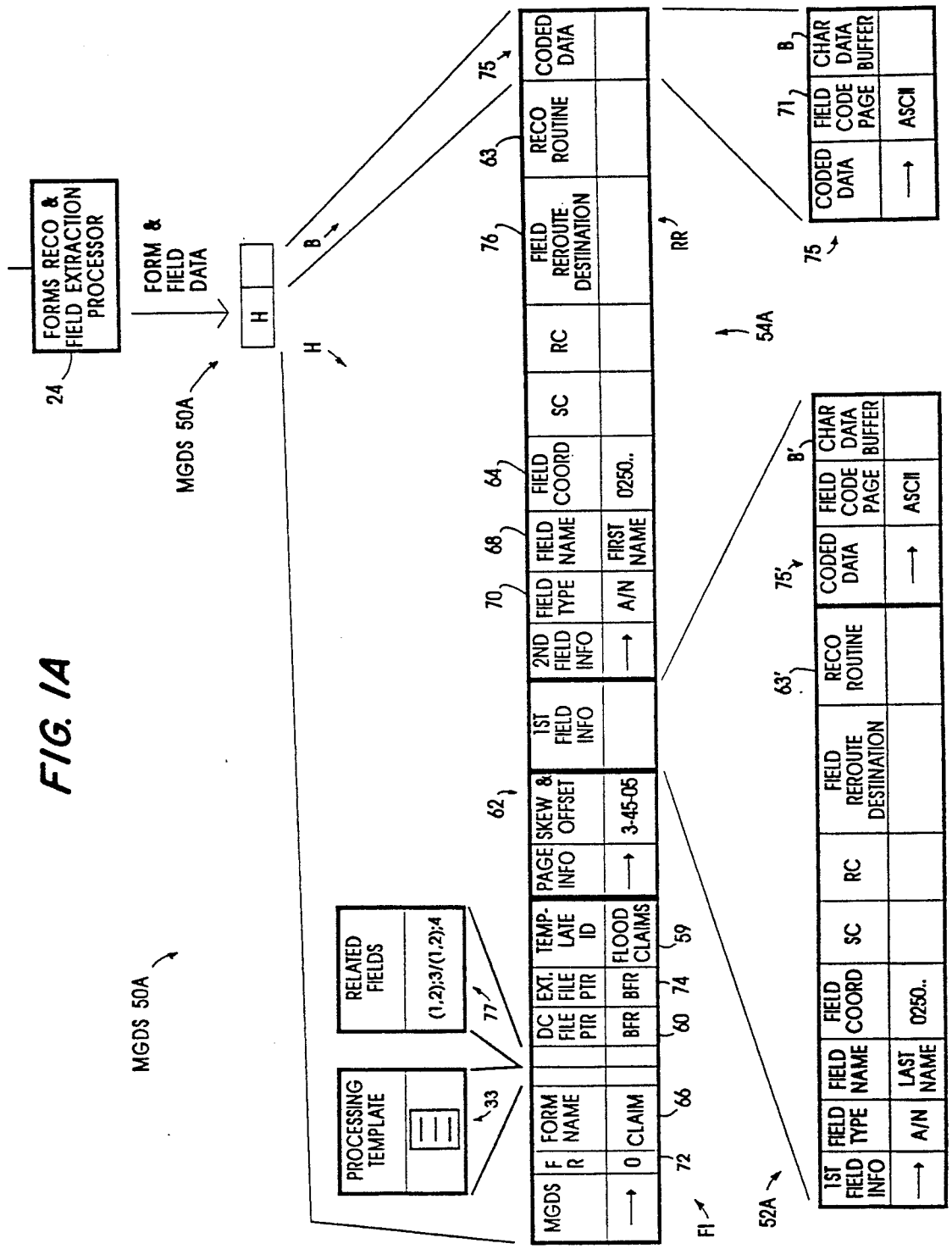
FIG. 1A illustrates the machine generated data structure (MGDS) 50A from the forms recognition and field extraction processor 24.

Step 108 inserts the variable form data for example the form return code 72, the template name 59, the document image pointer 60, the extracted image pointer 74, the skew and offset 62, etc., into the master MGDS 50M shown in FIG. 2B, thereby forming the MGDS 50A, now shown in FIG. 1A. The processing template 33 may be added to the MGDS 50A at this time, as is shown in FIG. 1A. There are two options for conveying the processing template 33 along the process sequence from the processor 24 to the processor 32, the first being incorporation of the processing template 33 into the MGDS 50A, and second alternately keeping the processing template 33 separate from the MGDS 50A.

Then the flow diagram of FIG. 4A transitions to step 110 which outputs the MGDS message 50A and the flow diagram then transitions to step 111 which outputs the extracted field images file 10".

Reference can be made to FIG. 3 which illustrates an example field extraction process. FIG. 3 shows the field image 16' for the first name field as it appears on the document image of FIG. 2C. The field image 16' is shown with the surrounding box 17, the characters 18 and the spurious lines 19 and 19a. In the process of field extraction, the image of the box 17 is removed. In addition, in the process of extraneous line removal, the image of the extraneous line 19a is eliminated, because a portion of it lies outside the pre-defined area of the field 16'. However, for this example, the extraneous lines 19 have not been removed from the image 18 of the characters in the field 16', as can be seen in the resulting extracted field 16" of FIG. 3. The extracted field image 16" will appear on the extracted field images 10" of FIG. 2D for the form.

An additional example of spurious lines which remain in the extracted field is shown for the state field 12a' in the form image 10' of FIG. 2C, whose corresponding extracted image 12a" still possesses the spurious lines overlapping the letter L in the state abbreviation for the state of Florida "FL."

Then the field extraction process 24B of FIG. 4A transitions to step 107 which assembles the fixed form data 65, for example the form name 66, etc., along with the fixed field data 67, for example the field name 68, type 70, field coordinates 64, etc., into the master MGDS 50M shown in FIG. 2B. Then in step 108, variable form data is inserted into the master MGDS 50M. For example, the form return code 72, which currently has a value of "zero," the document image pointer 60, which is the pointer address for the file of the document image 10', the extracted image pointer 74, which is the pointer address for the file containing the extracted image 10", the skew and offset value 62, and other data currently available at this stage in the forms recognition and field extraction processor 24.

The field extraction process 24B of FIG. 4A outputs the MGDS message 50A shown in FIG. 1A, to the character recognition processor 26. If this were the multi-task embodiment of these processes in the intelligent forms processor 25 of FIG. 5A, then the transfer of the MGDS message 50A would be to a commonly accessible partition in the memory of the processor 25. Alternately in the multiprocessor LAN embodiment of FIG. 1, the MGDS message 50A is transferred over the LAN 20 to the character recognition processor 26.

The process of FIG. 4A outputs the extracted images file 10". The extracted field images file 10" can be placed in a file whose address is referred to by the extracted image pointer 74, and the extracted image 10" can then be stored in the buffer 40 or the buffer server 40'. Alternately, the extracted field images 10" can be transferred directly to the character recognition processor 26.

FIG. 1A shows a more detailed illustration of the MGDS 50A as it is output from the forms recognition and field extraction processor 24. In particular, the MGDS 50A shown in FIG. 1A is depicted for the first field data segment 52A and the second field data segment 54A corresponding to the first two out of the six fields of the form image 10' shown in FIG. 2C.

Figure 1B:
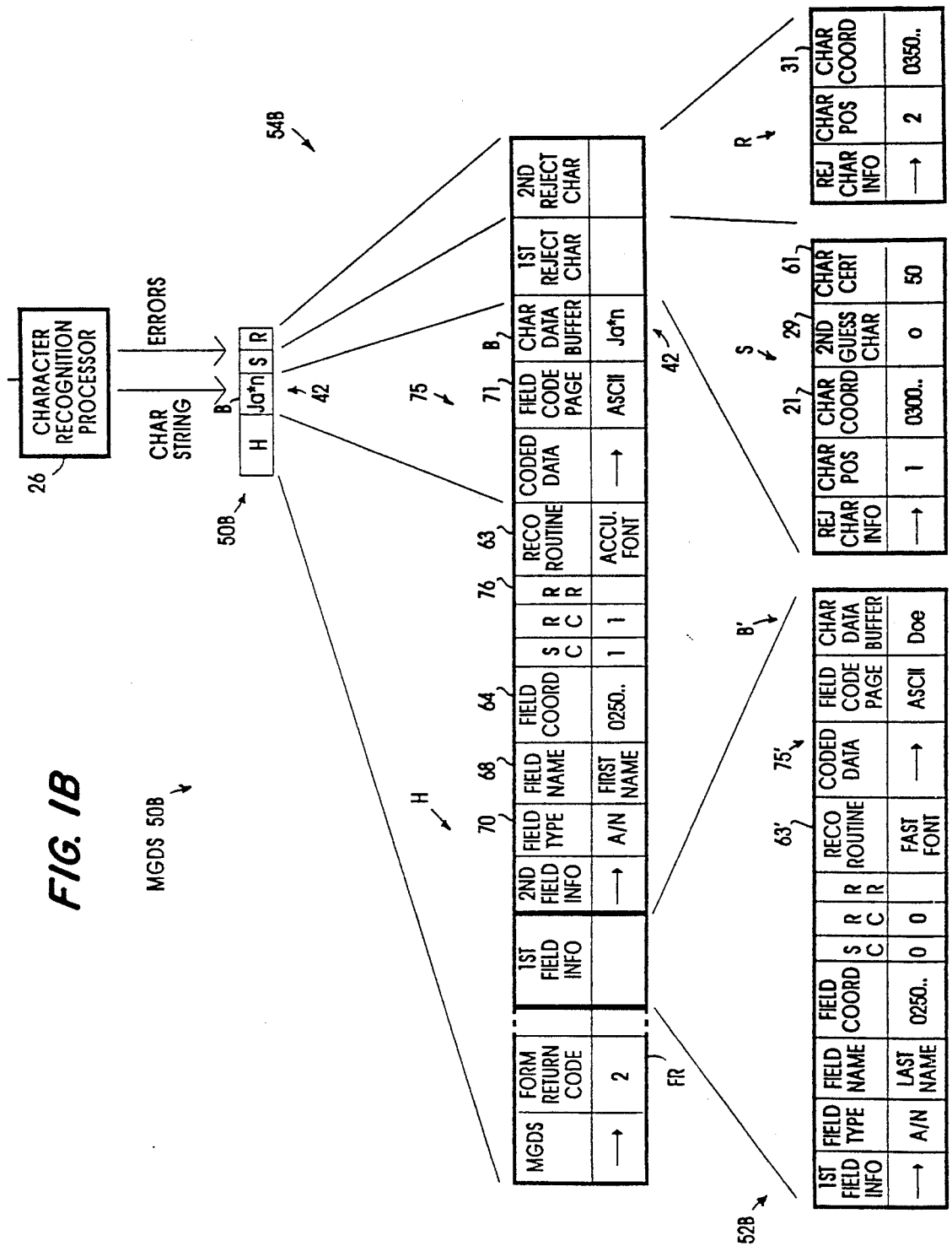
FIG. 1B illustrates the MGDS 50B output from the character recognition processor 26.
Figure 1C:
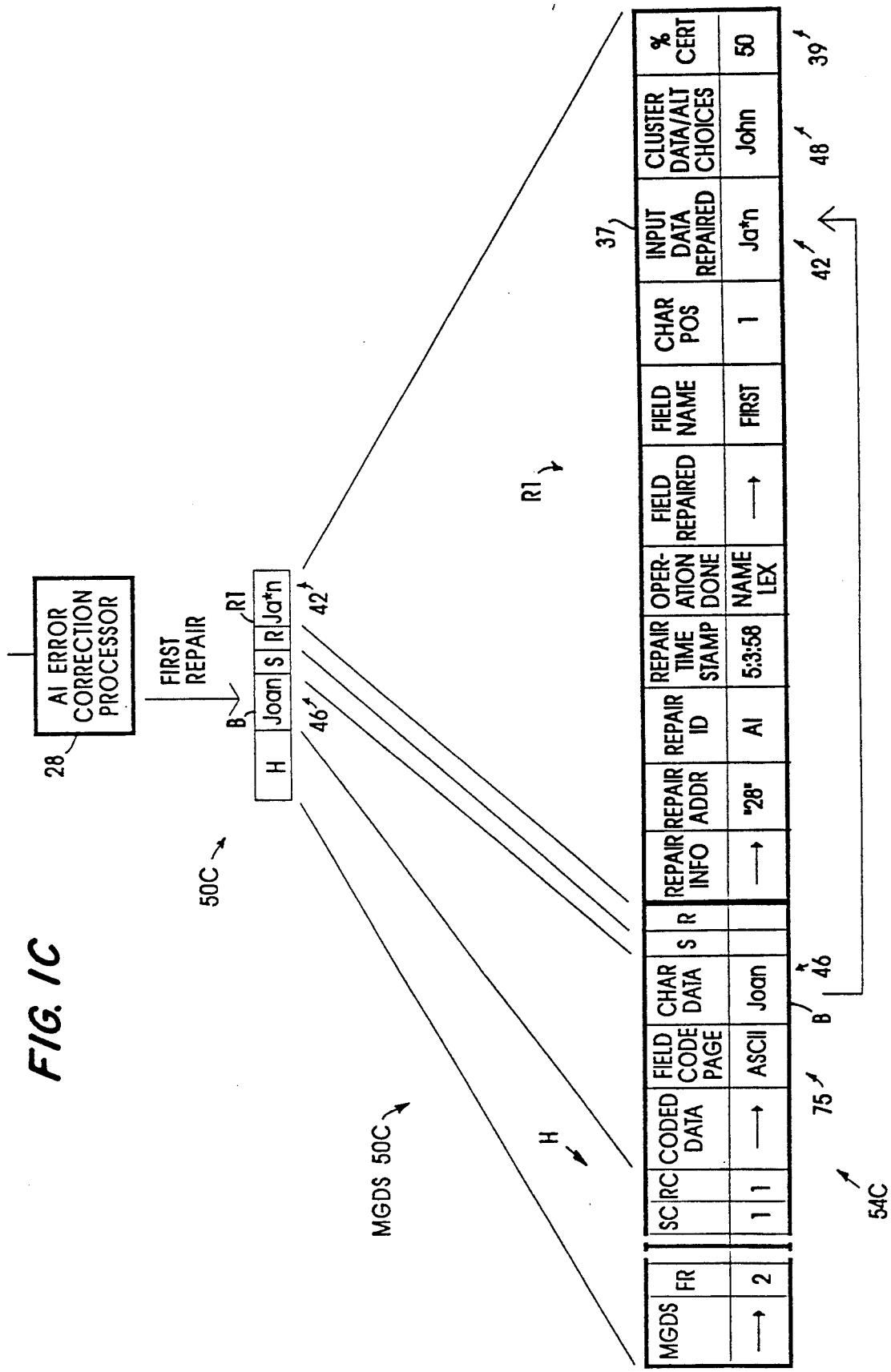
FIG. 1C illustrates the MGDS 50C including the first repair segment R1 output from the artificial intelligence error correction processor 28.
Figure 1D:
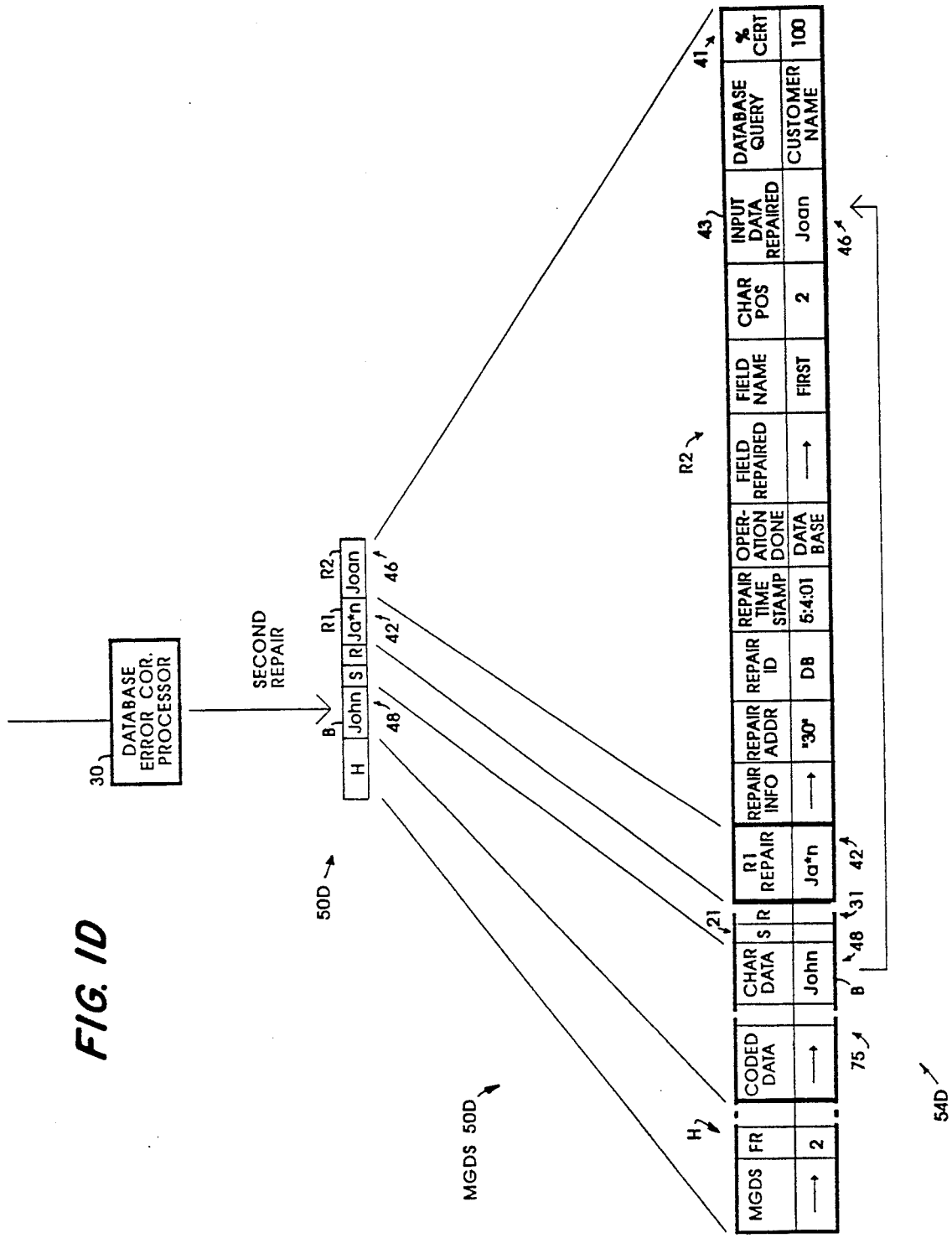
FIG. 1D illustrates the MGDS 50D including the second repair segment R2 output from the data base error correction processor 30.
Figure 1E:
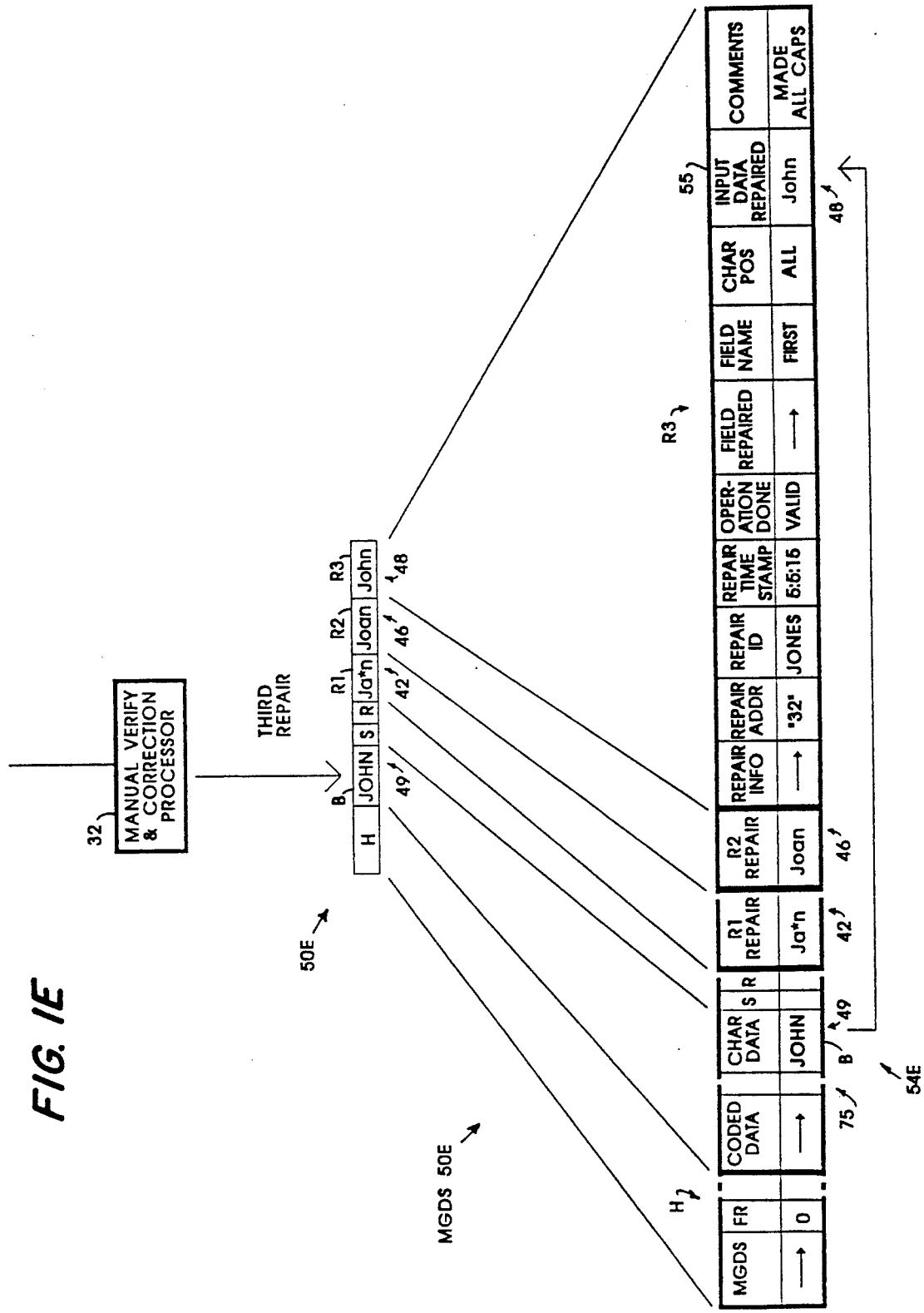
FIG. 1E illustrates the MGDS 50E including the third repair segment R3 output from the manual verify and correction processor 32.
Figure 1F:
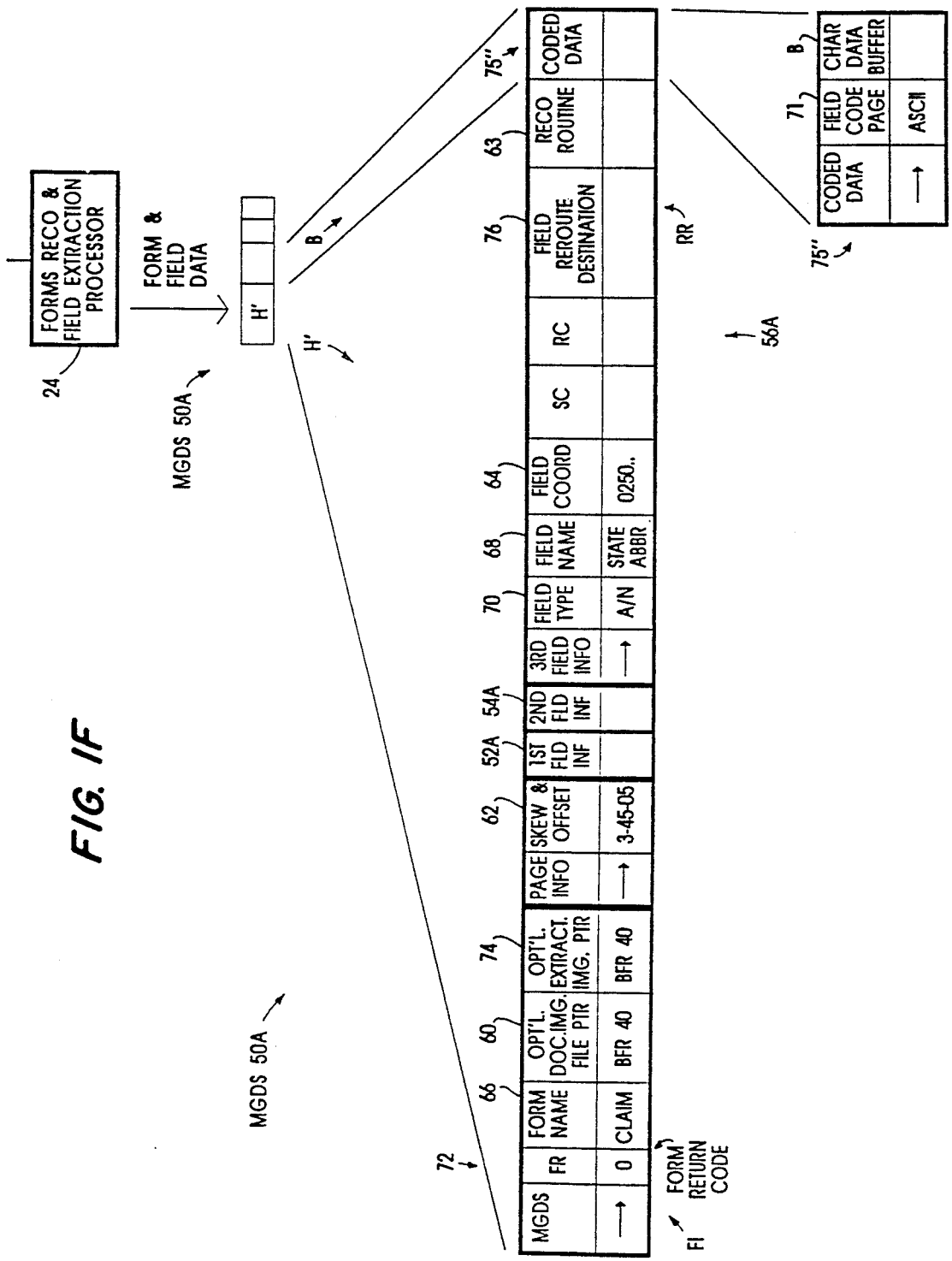
FIG. 1F illustrates the machine generated data structure (MGDS) 50A after having generated the third field data segment 56A.

FIG. 1F shows the MGDS 50A output from the forms recognition and field extraction processor 24 at a later stage in the assembly of the MGDS 50A, when it includes not only the first field data segment 52A and the second field data segment 54A but also the third field data segment 56A corresponding to the third field 12a' on the form image 10' of FIG. 2C.

The forms recognition and field extraction processor 24 will generate a first stage MGDS data structure message 50A which is shown in greater detail in FIG. 1A. A specific format for the form information in the MGDS 50A, is shown in FIG. 7A. The form return code parameter has a length entity with a value of six, an ID entity and a data entity. The data entity is two bytes long, the ID entity is two bytes long and the length entity is two bytes long, and thus the value in the length entity is six, which represents the total number of bytes in the parameter. The MGDS groups related parameters together to allow the entire group of associated parameters to be passed and parsed easily. The parameters are grouped by specifying a parameter that is intended to encompass several sub-parameters. Such an encompassing parameter or container object, for example the field information parameter, is shown in FIG. 7A to have a length entity, an ID entity and a data entity. Included in the data entity is an arrow which indicates that the encompassing parameter's data is the group of parameters that follow within the length specified for the encompassing parameter in its length entity. Note that the lengths and IDs are hexadecimal values.

The form information FI which is included in the beginning portion H of the MGDS 50A, includes the parameters shown in the FIG. 7A. The MGDS parameter is an encompassing parameter which encompasses the entire MGDS 50A. The MGDS version parameter states the version of MGDS being used. The form return code parameter will indicate if errors were encountered when processing the image. If the return code indicates errors existed at the field level, the rejected character and suspicious character return codes must be checked to determine the exact error. The form return code is the main indicator to determine if reject processing is required on a document image. Negative return codes will indicate a processing error occurred at the form or field level so that the form may actually be mis-identified. Positive return codes will indicate the number of rejected and suspicious characters that were found on the form for all of its fields. This return code can be reset to zero after error correction has successfully taken place.

The when-to-convert parameter indicates if the application creating the MGDS, that is the forms recognition and field extraction processor 24, has converted the character data in the MGDS to the appropriate host code pages. A parameter value of zero indicates that the application creating the MGDS has left the character data in the original ASCII code pages in which it was created and the numeric data appears in the workstation byte order where the hexadecimal representation of numerics is read by flipping the bytes. A value of two indicates that the application creating the MGDS converted the character data to the appropriate host EBCDIC code pages and the numeric data replica appears in the host byte order where the hexadecimal representation of the numerics is read without flipping the bytes. A value of one requires inspection of the form return code to determine the byte order of the numeric data and whether the character data has been code page converted.

The form class name parameter indicates the name of the form class recognized for the form. This name is defined by the forms recognition and field extraction processor 24 which performs the form recognition operation.

The form name parameter gives the name of the form as it is defined by the forms recognition and field extraction processor 24 performing the form recognition operation.

The general code page parameter is the code page for the unrecognized character flag, the form class name, field names, field associations and field repaired parameters. An assumption is made that all of these items will appear on one code page. If several code pages exist for these different items, the code page of the unrecognized character flag will be used.

The unrecognized character flag parameter is used to denote an unrecognized character in the character data buffer. The number of fields parameter indicates the number of fields that data will be returned for in the MGDS.

The form code page parameter is used for all the data on the form. If all the data on the form uses the same code page, this parameter will show that code page. If different code pages are used on the form, this field will not be returned and the field code page parameters will indicate the code pages in each field. As data is translated from code page to code page and stored back in the MGDS, this parameter should reflect the current code page for the forms data.

The host form code page parameter is the code page that the host has specified for all character information retrieved off the image. Characters should be converted to this code page before the information is submitted to the host for final processing. All character information that is associated with the form code page parameter will be translated to the host code page based upon the when to convert parameter value.

The host code page parameter indicates the host code page to which the field information for a specific field code page should be translated. This parameter maps one-to-one with the field code page parameters when they are present to indicate the host code page to which the data in the specific field should be translated.

The page information parameter is an encompassing parameter that encompasses information about each page of a document. This parameter does not encompass information about fields on each page.

The field information parameter is an encompassing parameter for a field data segment and is used to group all of the information that is returned for each respective field on a page of the form. There is no information in the parameter other than the length of the entire set of field data for each field.

Page information formats are shown in FIG. 7B. The page number parameter provides a page number for information that appears in the page information encompassing parameter. The page resolution parameter provides that the resolution of a specific page indicated by the page number parameter located in the page information parameter. The page orientation parameter provides the orientation of a specific form page. The values indicate no rotation or a positive clockwise rotation of 90, 180 or 270 degrees.

FIG. 7C illustrates the detailed format of field information. The rejected character return code parameter indicates rejected characters were encountered during the character recognition process. This parameter will not be filled with data until the character recognition processor performs its operation. The number in this field indicates the number of rejected characters that were encountered in the field. If the number is negative, it indicates an error was encountered while processing the field.

The suspicious character return code parameter will indicate suspicious characters were encountered during the character recognition process by the character recognition processor 26. The number in this field indicates the number of suspicious characters that were encountered in the field. The field association parameter is used to associate the field with the host fields. This is the ID the user will enter into a forms definition utility to indicate its association value and is provided by the forms recognition and field extraction processor 24. This field differs from the field name parameter because it is used to describe the field in terms of an application use rather than in terms of the field as it appears on the form. For example, this field may contain indexing information which is significant to a host application.

The field name parameter is the field description that will be used to describe the field during error correction and data entry. The field form page parameter is the form page on which the field appears.

The field coordinates parameter is filled out by the character recognition processor 26, with the coordinates of the field used for highlighting the field and further processing of the field in subsequent repair stages. These coordinates are the upper left and lower right coordinates of a rectangle enclosing the field and are based on a coordinate system with the 00 coordinate located in the upper left corner of the image. Each of the four coordinate values uses four bytes, that is the X left, Y bottom, X right and Y top.

The coded data parameter shown in FIG. 7D, is an encompassing parameter that is used to group all character information having the same code page in each field. Since multiple code pages may be used in each field, the coded data parameter will group the code page and the character information. Character information will not be supplied until the character recognition processor performs its operation. There is no information in this parameter other than the length of code page and character information. The presence of the coded data parameter is mutually exclusive with the presence of the field existence parameter. Both parameters may not exist for the same field at the same time. The field existence parameter denotes whether the field contains data or not and can be used for example a check box field.

Reject character information parameter shown in FIG. 7E, is an encompassing parameter which will be added by the character recognition processor 26, and is used to group all information about a rejected or suspicious character. There is no information in this parameter other than length of the reject information.

The MGDS 50A shown in FIG. 1A also includes a portion 59 for the storage of the template ID. For the example shown in Tables 1-6, the template ID is "flood claims," and this will be inserted into portion 59. Also included in the MGDS 50A of FIG. 1A is a portion 76 for storing the field re-route destination (RR). If a particular combination of errors results in the template pointing to a re-route destination, the identity of that re-route destination will be stored in portion 76. Also shown in FIG. 1A is the portion 63 of MGDS 50A, which will store the identity of the recognition routine for each respective field subjected to character recognition in the character recognition processor 26. Also shown in FIG. 1A is the optional inclusion of the processing template 33 in the MGDS 50A. Also, FIG. 1A shows the location of the related fields data 77 in the MGDS 50A.

Figure 6:
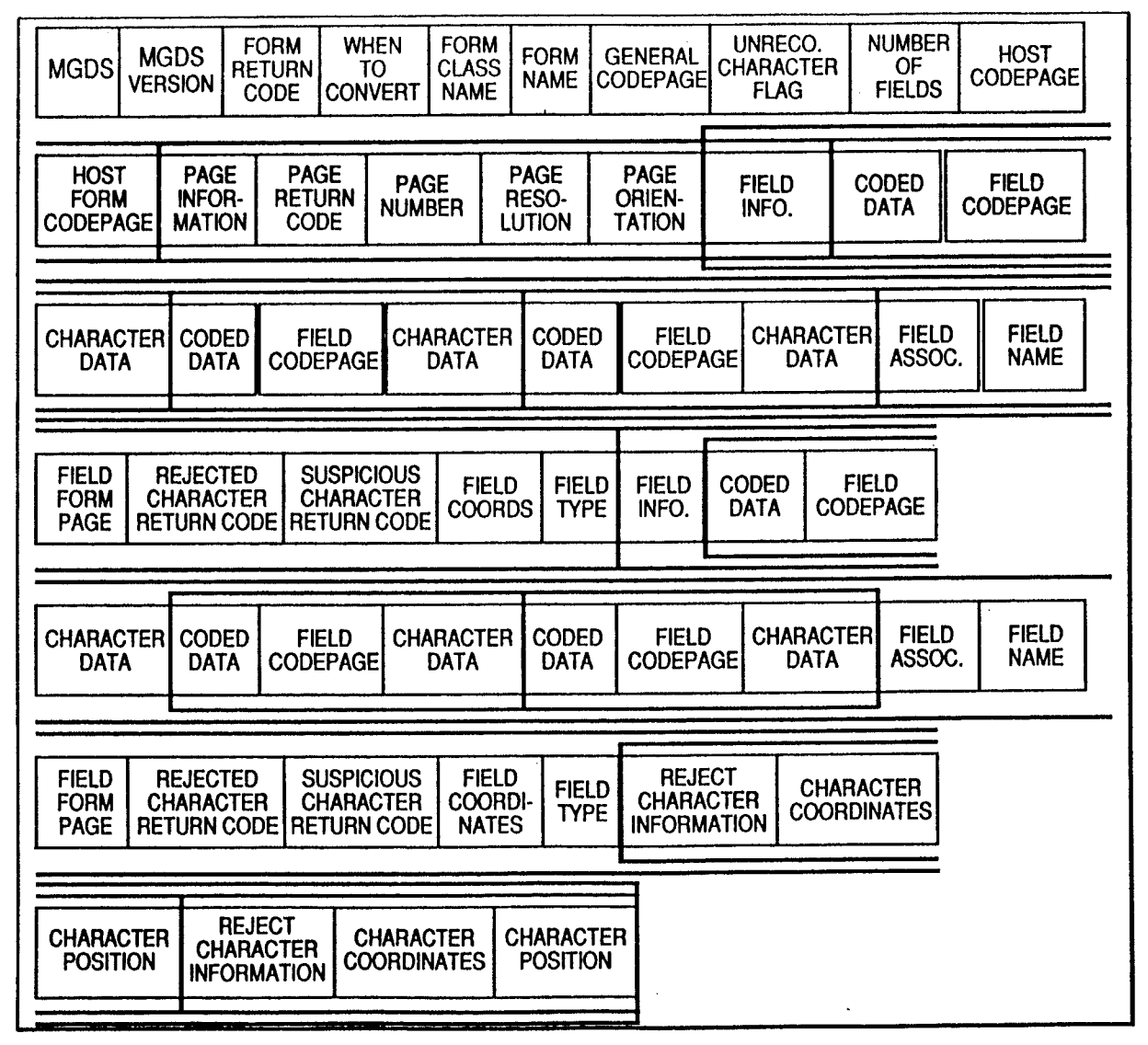

Optionally, an image data parameter (not shown) may be included in the MGDS message 50A, provided by the processor 24. After the processor 24 has performed its field extraction operation, the cleaned-up image of the field can have its bit map arranged in serial order and optionally compressed and loaded into MGDS 50A Reference to FIG. 6 will illustrate the relationships among the various MGDS parameters in an MGDS message structure. It is seen that form information is a part of the beginning portion H for the MGDS 50A. That is followed by the page information which is clustered together as shown in FIG. 6. This is then followed by several field information segments, each field information segment corresponding to one of the fields of the subject form. Within the field information segment will be one or more coded data segments, each coded data segment corresponding to a portion of the field characterized by a single code page. If the entire field is characterized by a single code page, then there will be a single coded data segment for the field. Also included with the field information will be any reject character information which may be produced by the character recognition processor 26.

The character recognition process 26A performed by the character recognition processor 26 will operate upon the image 16" of FIG. 3 to produce the character string 42 "Ja*n."

Figure 4B:
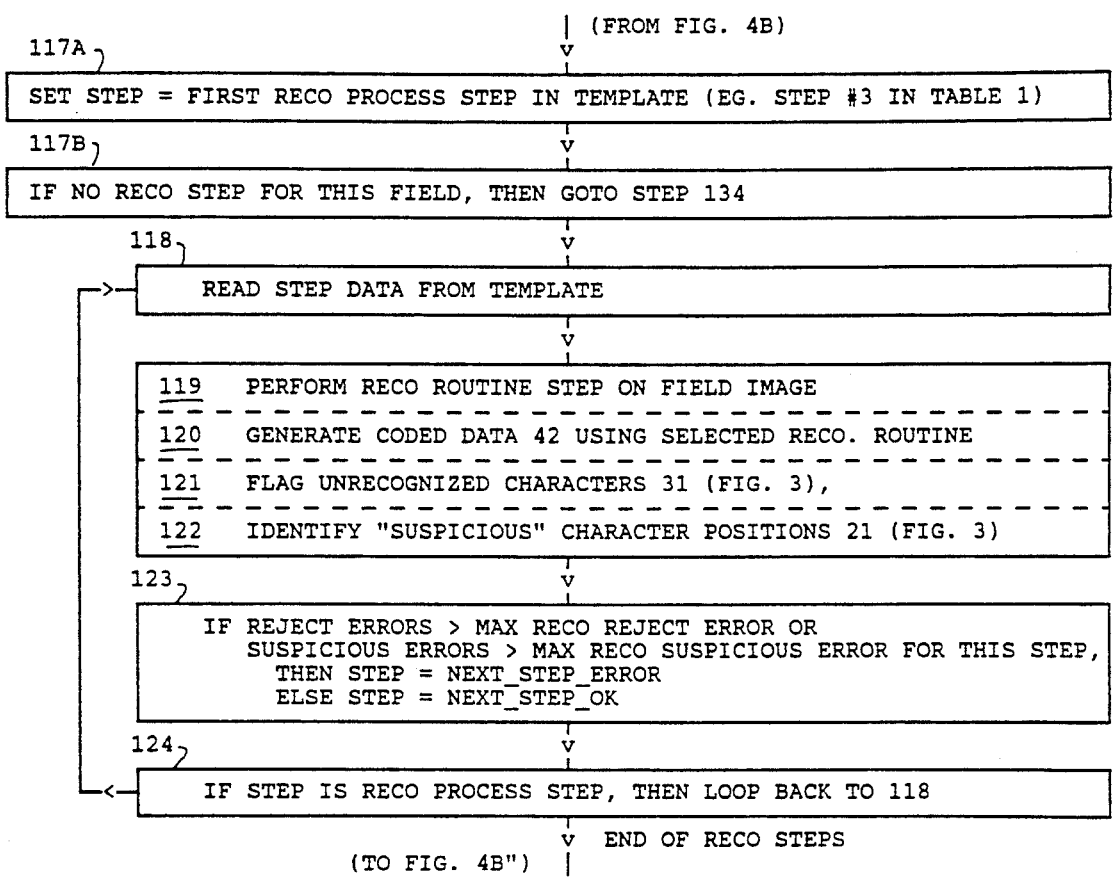
FIGS. 4B, 4B' and 4C" illustrate a flow diagram of the sequence of operational steps for the character recognition process 26A.

FIGS. 4B, 4B' and 4B" are the flow diagram of the sequence of operational steps for the character recognition process 26A.

Step 112 inputs the form processing template 33. Then step 113A inputs the MGDS message 50A shown in FIG. 1A. Steps 112 and 113A will be accomplished in a single step if the form processing template 33 is incorporated as a part of the MGDS 50A. Step 113B then inputs the extracted field images file 10" shown in FIG. 2D.

Then 114 begins a loop for each field on the form. Initially the field variable is set equal to one. Step 114 gets the field data segment from the MGDS message 50A.

Then in step 115A, if there is a re-route destination value in portion 76 of MGDS 50A, and if that destination is to another process than the character recognition process 26A, then the process of FIG. 4B flows to step 134. If a "skip" command is in portion 76, then the process of FIG. 4B flows to step 134.

The process step at 115A then transitions to step 115B. Step 115B through step 115E performs a "skip if redundant" operation if the template contains the "skip if redundant" step for this field. If so, then step 115B of FIG. 4B gets the related fields data 77 from the MGDS and identifies any related field having a higher priority than this field and also having character recognition coded data. An example of this can be seen in Table 3 for the state abbreviation field. In step 3 of Table 3, a "skip if redundant" process type is specified. Step 115B will check the related fields data 77 shown in FIG. 1A. The related fields specify "(1, 2);3." This is representation that fields 1 and 2, when taken together, have priority over and are related to field 3. In this example, field 1 is the last name field containing "Doe" and field 2 is the first name field containing "John." These two fields, if their coded data were certain, would be sufficient to specify to the host computer 34 and the insurance application running in it, all of the information which characterizes the customer "John Doe," including his state of residence, which is Florida. Therefore, 115B of FIG. 4B identifies two related fields, fields 1 and 2, which have a higher priority than field 3 and fields 1 and 2 also have character recognition coded data, as represented by their respective data segments in the MGDS 50B of FIG. 1B. It should be remembered that fields 1 and 2 are processed by the character recognition processor 26 prior to the processing of field 3, and therefore the coded data "Doe" in character data buffer B' and the coded data "Ja*n" 42 in character data buffer B, already exists at the point where step 115B of FIG. 4B is processing field 3.

Step 115B then transitions to step 115C of FIG. 4B, to get the certainty data for the coded data of the higher priority related field. In this case, step 115C gets the character certainty 61 for the second field, which has a value of 50 percent, and which shows in FIG. 1B that there are two rejected characters, a first rejected character 31 and a second suspicious character.

Then step 115C transitions to step 115D in FIG. 4B, which determines if the certainty for the coded data of the higher priority related field, is greater than the branch value for the step specified in the template 33. Referring to the Table 3, step 3, it is seen that the maximum recognition rejection error is zero and the maximum recognition suspicious character error is also zero. Thus, 115D determines that the certainty for the coded data of field 2 is not greater than the branch value specified for the step 3 in Table 3 of the template 33. Thus step 115D transitions to step 116A and the "skip if redundant" operation is terminated for this stage of processing field 3.

It can be seen in FIG. 4B, that if the certainty for the coded data of the higher priority related fields were greater than the branch value provided for the step in the template 33, then the process would transition to step 115E, which would insert a "skip" command into the MGDS destination portion 76 for this field and then the process would transition to step 134. This would have the effect of preventing this field, in this example field 3 for state abbreviation, from being further processed in any of the subsequent character recognition or coded data error correction processes. Since this is not true for the example given here, the process of FIG. 4B transitions from step 115D to step 116A.

The process flows to step 116A which gets the field coordinate 64 from the field data segment. Then step 116B gets the extracted field image bit map of FIG. 2D.

Then in step 117A, the step variable is set equal to the first recognition process step in the template 33. This for example would be step 3 in Table 1. Then in step 117B, if there is no recognition step for this field, then the process flows to step 134.

Step 118 then starts a loop for each step in the field. Reference should be made to Table 1 to illustrate the operation of the invention. Step 118 of FIG. 4B reads the step data from the template. Since the step is the first recognition process step, this will be step 3 in Table 1 which specifies a handprint recognition routine. Step 119 of FIG. 4B performs the recognition routine step on the field image. In this case, it would be the handprint recognition routine. Then in step 120 of FIG. 4B, coded data 42 is generated using the selected recognition routine. In step 121, unrecognized characters 31 are flagged, as shown in FIG. 3. Then in step 122, suspicious character positions are identified 21, as is shown in FIG. 3.

Then in step 123 of FIG. 4B, a determination is made as to whether the reject errors generated by the selected recognition routine are greater than the maximum recognition reject error value specified for this step in the template (see Table 1). Also, it is determined whether the suspicious errors generated by the selected recognition routine are greater than the maximum recognition suspicious error value specified in the template (see Table 1). As is shown in Table 1, for a handprint recognition routine in step 3, the maximum reject error rate is one error and the maximum suspicious error rate is one error. Therefore, step 123 will determine if the actual number of errors generated by the selected recognition routine, that is the handprint recognition routine, is greater than one reject error or one suspicious error. If it is, then the step variable is set equal to the next step-if-error value which, as is shown in Table 1, is value four. The value of four will cause the next step to be performed in Table 1 to be step 4 which specifies a fast Latin font recognition routine.

Alternately, if step 123 in FIG. 4B determines that the maximum reject error rate has not been exceeded and that the maximum suspicious error rate has not been exceeded, then the step variable is set equal to the next step OK value which is provided in Table 1 for step 3 as the value of seven. This will cause the next step to be performed in Table 1 to be step 7 which is the data base processing step.

Then step 124 is executed in FIG. 4B, which determines if the next step which has been identified in step 123, is a recognition process step. If it is a recognition process step, such as step 4, then the process will loop back to step 118 to repeat the loop. Alternately, if the new step is not a recognition step, such as step 7 in Table 1, then this signifies the end of the recognition steps.

It can be seen from the operation of the loop in steps 118-124 of FIG. 4B, that a sequence of character recognition processes will be executed, as specified in Table 1. The sequence is governed by the identity of the next step-if-error column and the next step-if-OK column in Table 1. If reject errors or suspicious errors are generated in a greater number than is permitted by the branch values given in Table 1, then the next step-if-error value will be used to guide the recognition sequence to the next desired recognition step provided in Table 1. If the recognition errors are less than the number provided by the branch values in Table 1, then a sufficient recognition operation has been achieved and the additional backup recognition routines will not be executed.

For example, if errors continue to be generated by selected recognition routines, then the recognition routine sequence will start with the handprint recognition routine of step 3, it will next go to the fast Latin font recognition routine of step 4, and then will conclude with the accurate Latin font recognition routine of step 5 in Table 1.

If as a result of the execution of the accurate Latin font recognition routine, the reject error rate or the suspicious error rate is greater than the branch values provided in Table 1, then the processing template of Table 1 will direct the next step to be the re-route step 6. This will cause the insertion of a field re-route destination value in portion 76 of the MGDS 50B.

The character recognition process 26A of FIG. 4B then transitions to step 125 after the end of the recognition steps. In step 125, the reject character return code RC is incremented and the form return code FR is incremented for as many reject characters as have been identified with the last character recognition process step executed in the loop of steps 118-124. Then step 126 increments the suspicious character return code SC and the form return code FR for as many suspicious characters as have been identified in the last recognition process step executed by the steps 118-124.

The step 127 loads the coded data 42 of the recognized characters, suspicious characters and reject flags into the character data buffer B of the field data segment.

Then in step 128, the field data segment is augmented when a sub-segment S and in it is loaded the location coordinates 21 of the suspicious characters, as is shown in FIG. 1B.

Then in step 129A, the second guess character 29 is loaded for the suspicious characters in the sub-segment S. Then in step 129B, the certainty value 61 for the suspicious characters is loaded into the sub-segment S.

In step 130, the field data segment is augmented with a sub-segment R and in it is loaded the location coordinates 31 of the reject characters.

Then in step 131, the name of the final recognition routine executed in the loop of step 118-124, is loaded into the portion 63 of the field data segment.

Then in step 132, if the last step pointed to by the loop from steps 118-124, is a re-route process step, then a destination value is inserted into the MGDS portion 76.

Optionally, the next step can be step 133A which for a field type which is an image field, will get the extracted field image as shown in FIG. 2D. Then in optional step 133B, the extracted field image is loaded into the image data sub-segment 47 of the field data segment, as is shown in FIG. 1I.

Then in step 134, the field variable is incremented by one and it is determined that if there is another field in the form to be processed. If there is, then the process flows to the beginning of the loop at step 114. Alternately, the process flows to the output step 136 which outputs the MGDS message 150B, as is shown in FIG. 1J(B).

In the example given for the "flood claims" template shown in Tables 1-6, the second field is the first name field which is represented for the template 33 in Table 2. The process of FIG. 4B will be conducted in accordance with the value specified in Table 2 for the second field of the form. Then, when step 134 of FIG. 4B determines that there is still a third field to be processed, the third field is represented by the template portion shown in Table 3. The step specified by the template portion shown in Table 3 for the third field of the form, will be executed.

Then step 134 of FIG. 4B will determine that there is still a fourth field to be processed. The portion of the template represented by Table 4 will then be executed by the process of FIG. 4B. Since the first operation shown in Table 4 for field 4 is a "skip field" operation, the fourth field (which is the "address" field) will be skipped in the form.

Then step 134 of FIG. 4B will determine that there is still a fifth field to be processed for the form and the portion of the template represented in Table 5 will be executed.

Then finally, the step 134 of FIG. 4B will determine that there is a sixth field to be processed for the form. The portion of the template represented in Table 6 will be executed for this field. Then step 134 will determine there are no more fields for this form to be processed and thus the character recognition process 26A will output the MGDS message 50B as provided in step 136.

Note that in FIG. 1B, the identity of the recognition routine for the first field is "fast Latin font" which is loaded into portion $63 \propto 0$ of data segment 52B of the MGDS 50B. Further note that the identity of the recognition routine as "accurate Latin font" is loaded into portion 63 of the second field data segment 54B of the MGDS 50B of FIG. 1.

Reference to FIG. 1B will illustrate some of the information that can be added by the character recognition processor 26 to the MGDS message 50B. The character data buffer B would be loaded with the recognized character string which includes the fully recognized characters "J" and "n," the suspicious character "a" and the position of the reject or unrecognized character which is indicated by an asterisk "*." In addition, first reject character information S will be placed in the reject character information segment identifying the character position, the character coordinates, a second guess character and a character certainty. The character position for the first character is indicated as "0," the second character is indicated as "1" and so on. Thus, character position for the suspicious character "a" is indicated as "1." The character coordinates are provided for the location in the field image of the suspicious character "a." In addition, the character recognition processor 26 will have formulated several candidate alternate characters which have a lesser certainty value. The next highest certainty value corresponds to the character "o" and this is the second guess character which is provided in the second guess character parameter of the reject information segment S. In addition, the character certainty of 50 percent, in this example, is also loaded into the reject character information segment S. A second reject character information segment R is provided for the reject character position "*." The character position is indicated as two, indicating it's the third character position, and the coordinates for that character position are provided for the field image. This information is loaded into the MGDS message 50B of FIG. 1B.

The coded data 42 consisting of the recognized characters "J" and "n," the suspicious character "a," and the reject flag "*" are loaded into the character data buffer B of the field data segment 54B, shown in FIG. 1B.

The second guess character 29 for the suspicious characters are loaded into the sub-segment S, as shown in FIG. 1B. In this example, the second guess character 29 is a "o." In this example, the certainty of the first guess 27 character "a" is 50 percent and this value is value 61 for the certainty.

Figure 1G:
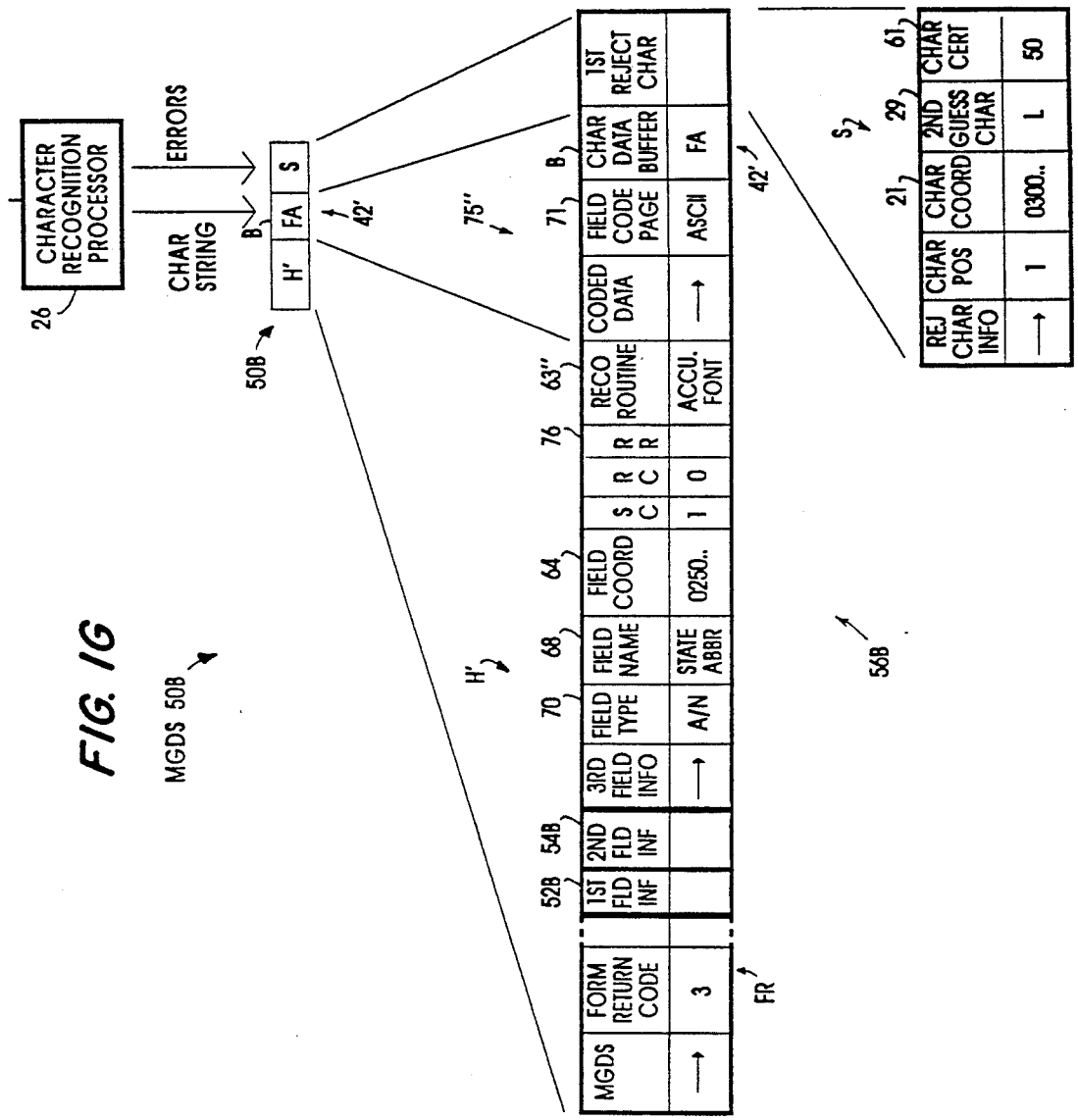
FIG. 1G illustrates the MGDS 50B after having generated the character string and error information for the third field data segment 56B.
Figure 11:
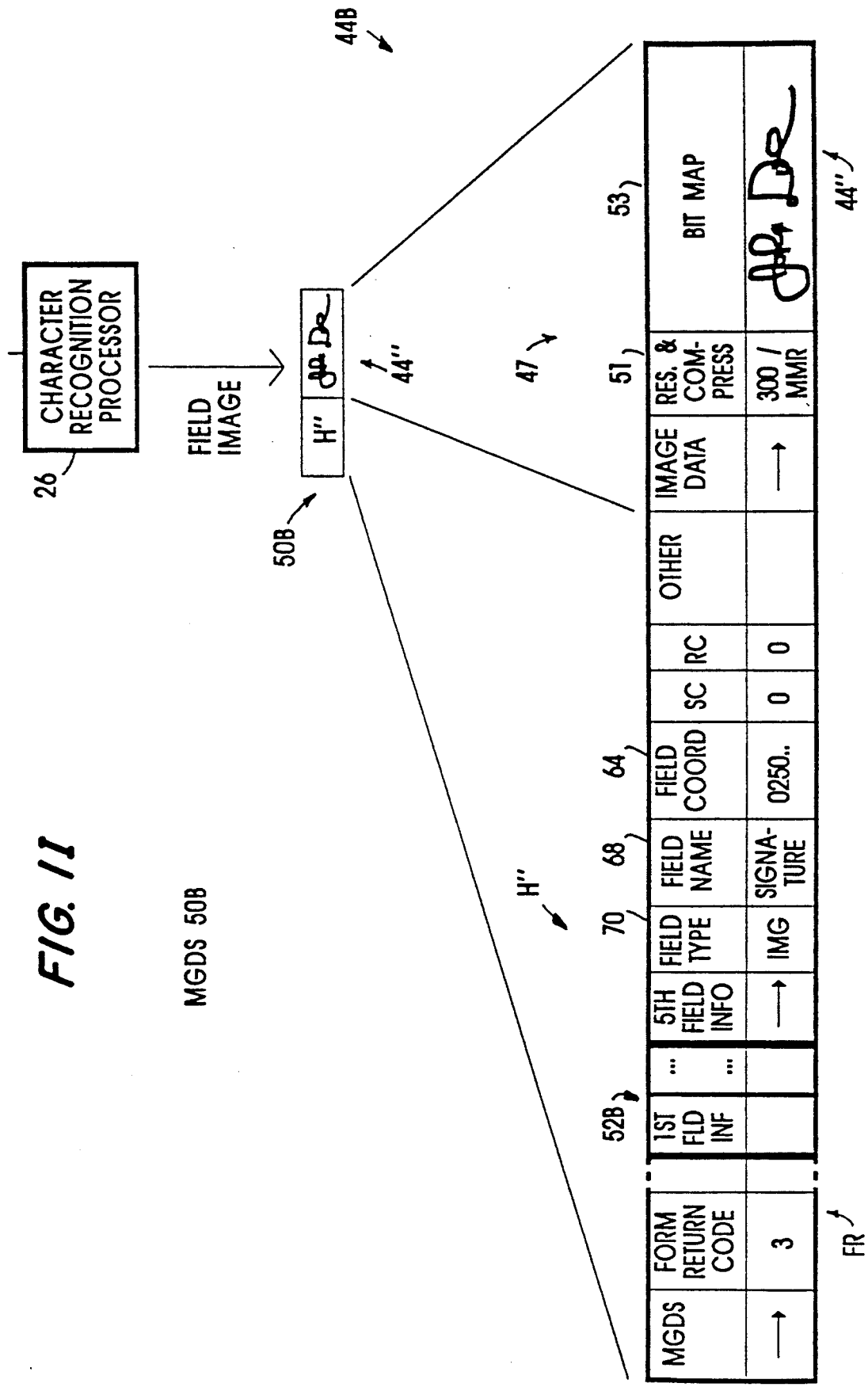
Figure 1L:
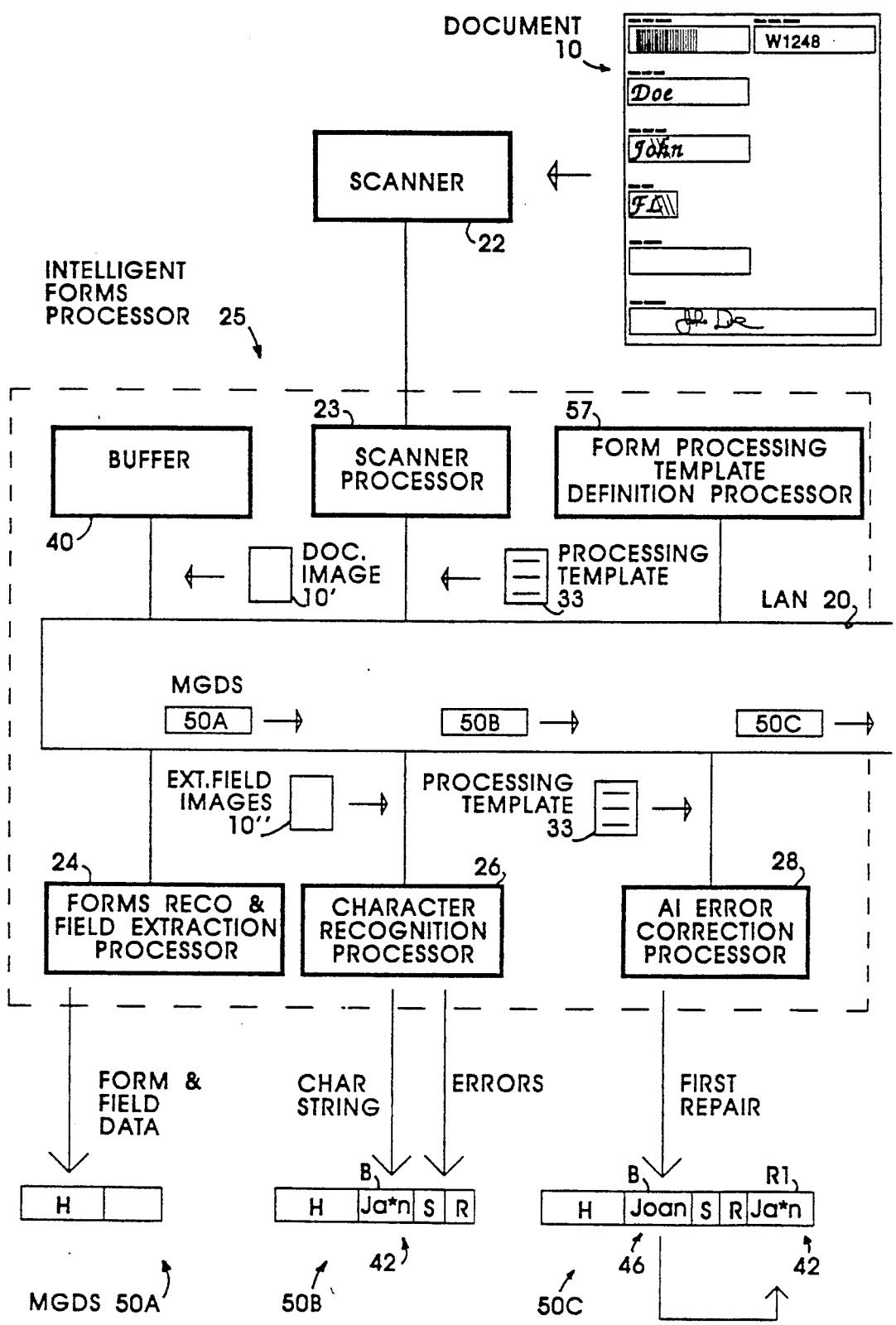
FIG. 1 which is composed of FIG. 1L and FIG. 1R, is an overall architectural diagram of the invention.
FIG. 1H illustrates the MGDS 50C after having generated the repair segment R1' for the third field data segment 56C.
FIG. 1I illustrates the MGDS 50B after having generated the fifth field data segment with the field image 44".
FIG. 1J(B) illustrates the MGDS 50B after the character recognition processor 26 has completed its operations on all six fields of the form.

The third field data segment 56B is shown in FIG. 1G, corresponding to the state field 12a'' in FIG. 2D. It is seen in FIG. 2D, that the "L" in the abbreviation for the state of Florida, has spurious marks which overlay it. The character recognition processor 26 interprets the first guess for the second character position as "A," and therefore the character string "FA" is entered into the character data buffer B of the field data segment 56B of FIG. 1G. The character recognition processor 26 also determines that the second guess for the second character position is a "L" and this second guess "L" 29 is entered into the second guess character portion of the suspicious character sub-segment S shown in FIG. 1G.

FIG. 1J(B) shows the character buffer B for the coded data for each field segment of the six fields in the form of FIG. 2D. The first field segment 52 has the character string "Doe" in buffer B. The second field segment 54 has the character string "Ja*n" in its buffer B. The third field segment 56 has the character string "FA" in its buffer B. The fourth field segment 12b has its buffer B empty since there was no corresponding image information in the field 12b' of the form image 10' of FIG. 2C. The fifth field data segment 44 has the signature image 45 in its field image portion. The sixth field data segment 12 has its buffer B containing the string W1248. The contents of each of the character buffers B in each respective field data segment is the best current estimate of the correct alphanumeric string which corresponds to the image contained in the respective field of the extracted field images 10'' of FIG. 2D.

The coded data information format shown in FIG. 7D depicts the field code page parameter which is the code page used for each specific character string in the field. Whenever code page changes in a field, the field code page parameter will precede the character string that uses it. If all the code pages on the form are the same, then the field code parameter need not be used and the form code page parameter will indicate the code page that should be used for all character data on the form.

The character buffer parameter B is also shown in FIG. 7D and that is the location for storage of the character string that uses one code page. If the field contains no characters, but the field was indicated to be a mandatory field by the processor 24, the rejected character return code will indicate no value was an error. The character buffer is the repository for the current corrected value of the character string representing the field. At each sequential stage of field repair, the highest probability character string representing the field will be loaded into the character buffer B.

The reject information format is shown in detail in FIG. 7E. The reject character information encompassing parameter encompasses the character position parameter which identifies the position of the character in the string of characters for the entire field. This is required so that an association between the character value and the image character can occur at the respective repair stations. This position indicates the character position in the field and not the number of bytes preceding the character.

The MGDS message 50B is transferred over the LAN 20 to the artificial intelligence error correction processor 28, to accomplish a first repair of those fields whose field segments have an error. The correction processor 28 can be a part of the character recognition processor 26 in some embodiments. An example of an artificial intelligence error correction process would be the lexical testing of the character strings produced by the character recognition processor 26. Generally the data contained in a particular field of a form are constrained in the sense that not every character string is permissible. An amount field is typically filled with numeric data and a name field is typically filled with alphabetic data. Such constraints are useful for character recognition correction. For example, if a particular field is only numeric, then a comparison of suspicious characters in the field with numeric characters will be appropriate. An example of this would be a zip code field where one or more of the numeric characters in the image of the zip code field were either suspicious or not read. If the state or especially the state and city fields of the form were read without unrecognized characters, then a lexical analysis can be performed using the data base equivalent of a zip code directory to fill out the most probably numeric values for the rejected or suspicious characters in the zip code field. For particular types of fields, not only digits, but also letters and punctuation can be inferred from positions or the context of the misread character. For example, if a particular field is a state field, and there is a misread character in the field, a list of the 50 states can be used in a lexical analysis, to find the highest probability match for the characters that are accurately recognized, thereby enabling the inference of the values for those characters which are rejected or suspicious.

Still another application, and one used in the example herein, is common English given names or first names. The MGDS 50B is input to the artificial intelligence error correction processor 28, and the first name field 16'' contains the letters "John" which is the character image 18. The output character string 42 of "Ja*n" from the character recognition processor 26, will be processed in the error correction processor 28 using lexical analysis. The corresponding second guess character "o"

for the second character in the string 42 will also be tested using a lexical analysis to test "Jo*n." The lexical analysis example is of given names having four letters with the first letter being "J" and the last letter being "n." A lexical analysis will draw upon a list of candidate names such as "Joel," "Jack," "John," "Jake," "Jane," "Jean," "Jill," "Joan," "Judy," and "June." The example of the lexical analysis performed by the artificial intelligence error correction processor 28, requires that the input MGDS message 50B supply some information in connection with the field, to enable the first repair to take place. The information supplied is the character string from the character data buffer B of the string 42 "Ja*n," and the second guess character for the second character position, namely "o." The artificial intelligence error correction processor 28 will determine from its lexical analysis that the string "Joan" has a 50 percent certainty and the string "John" also has a 50 percent certainty.

Figure 4C:
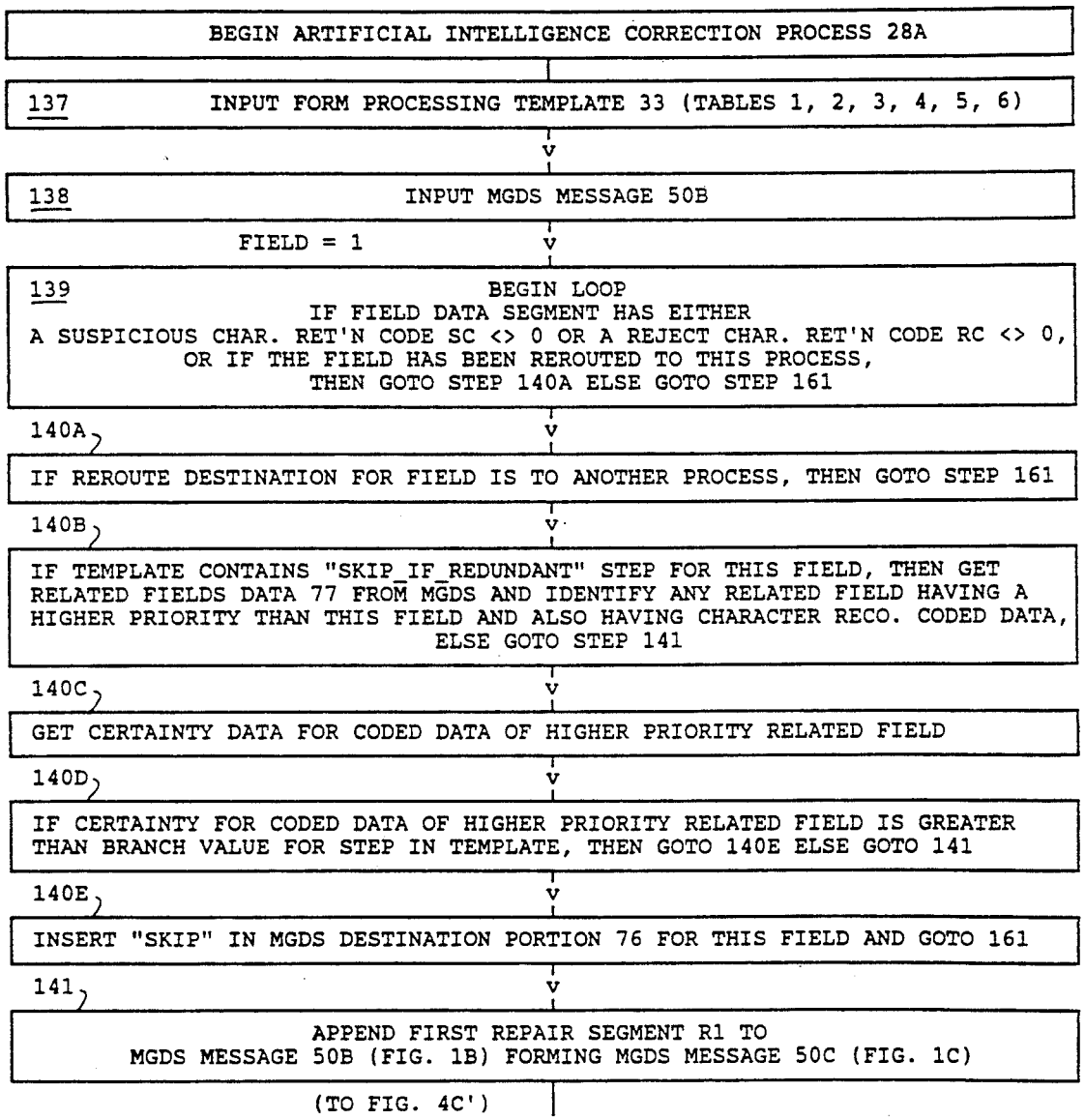
FIGS. 4C, 4C' and 4C" illustrate the sequence of operational steps for the artificial intelligence error correction processor 28A.
Figure 4C:
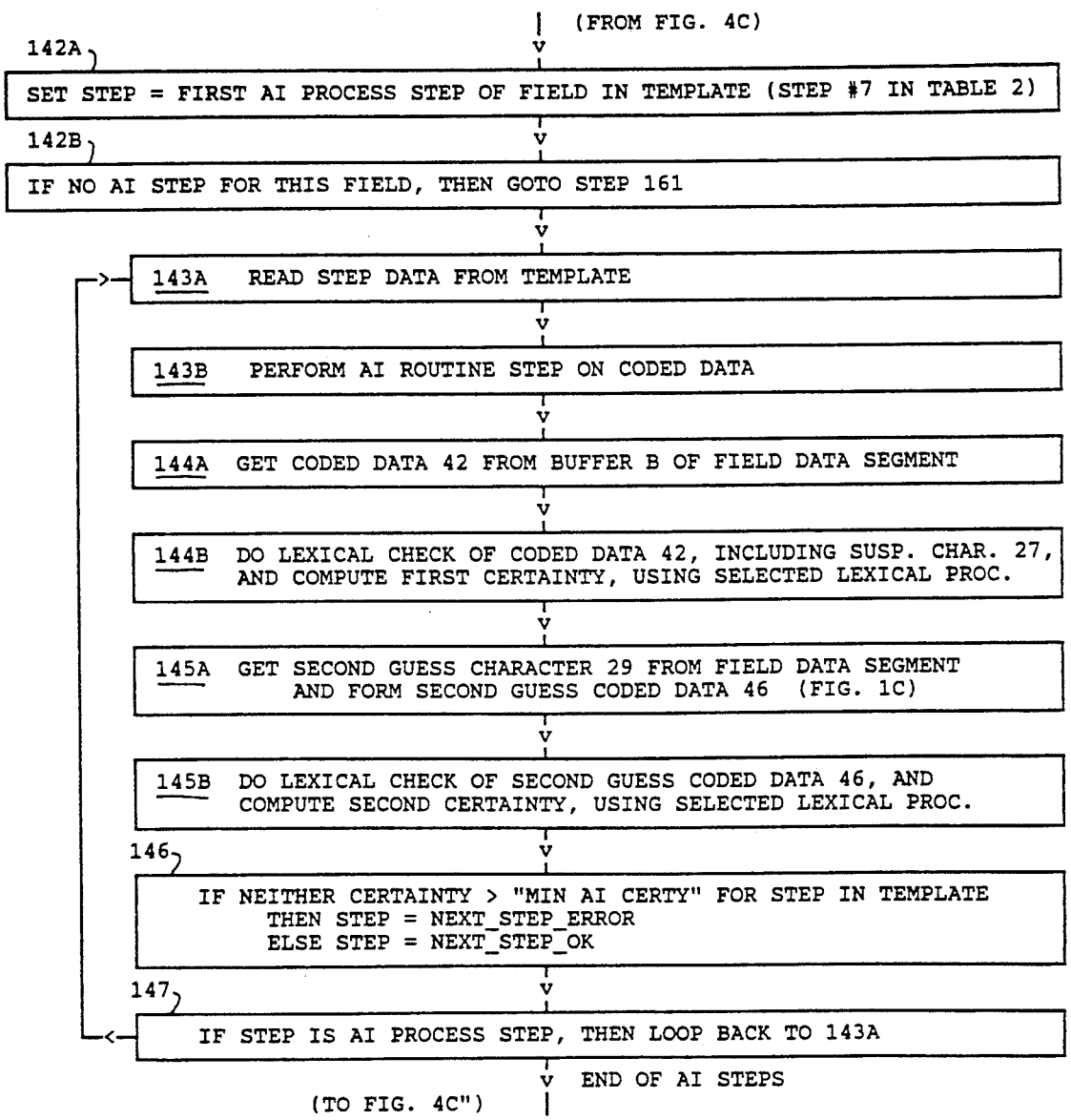

The artificial intelligence correction process 28a is shown in a flow diagram which is a sequence of operational steps in FIGS. 4C and 4C'. The process starts with step 137 which inputs the form processing template 33.

Then step 138 inputs the MGDS message 50B. Then step 139 begins a loop which goes for each respective field in the form. The loop is initialized with the field variable set equal to one. In step 139, it is determined whether the field data segment has either a suspicious character return code SC which is not equal to zero or reject character return code RC which is not equal to zero, or alternately if the field has been re-routed to this process, which would be indicated by a field re-route destination value in portion 76 of the MGDS which pointed to the AI correction process 28A. If any of these conditions is met, then the process flows to step 140. Alternately, if there are not met, then the process flows to step 161.

In step 140A, if the re-route destination field 76 points to another process 28A, or includes a "skip" command, then the process of FIG. 4C flows to step 161. Alternately, the process flows to step 140B.

Step 140B through step 140E represent a "skip if redundant" feature which determines if the template 33 contains a "skip if redundant" step for this field. Reference can be made here to Table 3 for the state abbreviation field, and in particular to step 8. Step 8 is a "skip if redundant" process type entry to the processing template 33, just prior to the AI process type step 9.

Step 140B of FIG. 4C will then get the related fields data 77 from the MGDS and it will identify any related field having a higher priority than this field and also having character recognition coded data in its field segment. The related fields data 77 includes the entry "(1, 2);3." This indicates that field 3 has related fields 1 and 2 which in combination, have a higher priority than field 3. Step 140B will inspect the character data buffer B' for the first field segment 52B and it will inspect the B character data buffer for field data segment 54B for the second field, and it will determine that coded data is present for both field 1 and field 2. Since step 140B is satisfied, it then transitions to step 140C. If the test of step 140B were not satisfied, then the process would flow to step 141 and the "skip if redundant" feature would be terminated for this portion of the process.

Step 140C gets the certainty data for the coded of the higher priority related field. Step 140C will determine that there is a first reject character which is a suspicious character in the segment S of FIG. 1B and that it has a character certainty of 50 percent and further, that there is a second reject character for the second field. Then step 140C of FIG. 4C transitions to step 140D.

In step 140D, it is determined whether the certainty for the coded data of the higher priority related field is greater than the branch value for the step provided in template 33. In this example, the minimum AI certainty provided for step 8 in Table 3 is 100 percent and therefore the certainty for the coded data for field 2 is not greater than the branch value in the step in template. Thus, step 140D of FIG. 4C transitions to step 141 and this terminates the "skip if redundant" feature.

Alternately, if step 140D determined that the certainty for the coded data of the higher priority related field was in fact greater than the branch value for the step in the template 33, then the process would flow to step 140E where the parameter "skip" would be inserted into the MGDS destination portion 76 for this field and then the process would flow to step 161. This would result in this field not being further processed by error correction processes, as desired. The process of FIG. 4C then transitions to step 141.

In step 141 of FIG. 4C, the first repair segment R1 is appended to the MGDS message 50B in FIG. 1B, thereby forming the MGDS message 50C, shown in FIG. 1C.

Then in step 142A, the step variable is set equal to the first artificial intelligence process step of the field in the template 33. This for example would be step 7 in Table 2.

Then in step 142B, if it is determined that there is no artificial intelligence step for this field, then the process flows to step 161.

Step 143A of FIG. 4C, begins a loop which runs for each step in the field as specified in the template 33. Reference to Table 2 for field 2 will give further illustration to the operation of the invention. In step 143A, the step data from the template is read. Since the step is the first AI process step, Table 2 shows that the first AI process step is step 7 which has the operation of performing a lexical routine based on English first names. Step 143B of FIG. 4C, performs the AI routine step on the coded data in the field data segment buffer B. Step 144A gets the coded data 42 from the buffer B of the field data segment. Then step 144B does a lexical check of the coded data 42, including the suspicious characters 27 and it computes a first certainty value using the selected lexical procedure. In this case, the selected lexical procedure is a comparison with a AI reference list of English first names.

Then the process of FIG. 4C, flows to step 145A which gets the second guess character 29 from the field data segment and forms a second guess coded data 46 as is seen in FIG. 1C. Then in step 145B, a lexical check is performed of the second coded data 46, and a second certainty value is computed, using the selected lexical procedure provided by step 7 of Table 2.

Then in step 146, a determination is made as to whether the first certainty value computed in step 144B, or the second certainty value computed in step 145B, is greater than a minimum AI certainty value provided in the branch values for step 7 in Table 2. As is seen in Table 2, step 7 provides that the minimum AI certainty "MIN-AI-CERTY" is 50 percent. Thus, if step 146 of FIG. 4C determines that neither the first certainty nor the second certainty computed in steps 144B and 145B, respectively, is greater than 50 percent, then the step variable is set equal to the next step error value provided in Table 2 for step 7. As is seen in Table 2 for step 7, the next step-if-error value is eight, which means that step 8 will be the next step to be performed. Step 8 is the international first name lexical routine.

Alternately, if step 146 of FIG. 4C determines that the certainty of either the first certainty value or the second certainty computed in steps 144B or 145B, respectively, is greater than the minimum certainty value provided in Table 2 for step 7, then the step variable is set equal to the next-step-OK value provided in Table 2 for step 7. Table 2 shows that step 7 has the next step-if-OK value of 10, which means that step 10 will be the next step to be performed. Step 10 of Table 2 has the operation of the insured customer name data base routine.

Step 146 then flows to step 147 which determines if the new step identified in step 146 is another AI process step. If it is, then the process loops back to step 143A to perform the step as provided in Table 2. Alternately, if the new step is not an AI process step, then this signifies the end of the AI steps.

It can be seen in Table 2, that two consecutive artificial intelligence error correction process routines are provided in Table 2, at steps 7 and 8. If the performance of the first routine in step 7 fails in providing a certainty value greater than the branch value shown for that step in Table 2, then the next step to be performed is the next AI error correction step in the sequence, namely step 8. If step 8 fails to provide an adequate certainty as provided by the branch values in Table 2, then the next step to be performed is identified in Table 2 in step 9. Step 9 is a re-route step which inserts a field re-route destination value in the MGDS 50C. Alternately, if step 8 succeeds, then the next step will be step 10 which is the data base step 10 of Table 2.

Thus it is seen that the form processing template 33 provides a specification for the preferred sequence of artificial intelligence error correction steps to be performed on the coded data derived from field 2.

FIG. 4C then transitions from step 147 to step 152. Step 152 determines if the second certainty value computed in step 145B, is greater than the first certainty value computed in step 144B. If it is, then step 152 transfers the coded data 42 from the data buffer B to the data repair portion 37 of the first repair segment R1. It then loads the second guess coded data 46 into the buffer B of the field data segment which is now shown as 54C of FIG. 1C.

The process of FIG. 4C now flows to step 154 which loads the certainty value 39 into the first repair segment R1. The process then flows to step 155 which then loads the cluster data and/or the alternate choices 48 into the first repair segment R1.

In step 156, the repair operation is loaded into the first repair segment R1. It is seen in FIG. 1C, that the operation done is specified as "NAME LEX" which corresponds to the English lexical routine which was prescribed by step 7 in Table 2. In addition, a time stamp value can be placed into the first repair segment R1.

Then step 157 of FIG. 4C determines if the last process step identified in the loop from step 143A through step 147 is a re-route process step. If it is, then the re-route destination value is inserted into the MGDS portions 76.

Step 157 then transitions to step 159 which determines if the current step in the template 33 is a "cross-check" step. If it is, then step 159 gets the related fields data 77 from the MGDS and it executes the related field cross-check routine on the current field and its related fields. An example of this would be if the current field is a city field and the related fields data 77 indicated a related field which is a zip code field. An appropriately programmed related field cross-check routine would verify the city field coded data by comparing it with the zip code directory, if the zip code coded data had a high certainty value.

Step 159 of FIG. 4C then transitions to step 160 which determines if a "re-order fields" step is present in the template 33. If a "re-order fields" step is present, then the field variable is set equal to the value of the new field minus one. In order to pass the new field value, it was set equal to the "MIN-AI-CERTY." variable in the step of template 33, for convenience. This value is then reduced by one in order to flow into the next step 161.

In step 161, the field variable is incremented by one, bringing the field value up to the desired new field value for "re-order fields" feature. The re-order fields feature enables the user to re-define the order of the fields originally specified in the MGDS. The fields are re-ordered in their sequence for processing for error correction processes.

Then in step 161, the field variable is incremented by one, and it is determined whether there is another field data segment. If there is, then the process of FIG. 4C flows to the start of the loop at step 139. Alternately, the process flows to step 162 which outputs the MGDS message 50C, as is shown in FIG. 1J(C).

In the example of the template named "flood claims" shown in Tables 1-6, there are six fields and therefore the loop will continue from step 161 back through step 139 for all six fields. For each respective field, the corresponding portion of the template 33 of Tables 1-6 will be executed. As was seen in the example for the second field which is the "first name" field, the artificial intelligence routines which were specified in Table 2 are for step 7, the English first name lexical routine, and for step 8, the international first name lexical routine. For field 3 which is the state abbreviation field, Table 3 of the processing template 33, provides an artificial intelligence error correction step 7, which is the state abbreviation lexical routine.

It is interesting to refer to Table 7 which is an Asian template 33' for Asian shipping claims. The same document form is employed as was used for the example of Tables 1-6. Table 7 is the portion of the template 33' for the first name field which is the second field of the form, where it is expected that there will be some Mandarin Chinese characters for some forms, and some Kanji characters for other forms, as well as Latin alphabetical characters. Thus, the "Asian shipping claims" template represented in Table 7 provides in step 8 for a Mandarin character recognition routine and in step 4 for a Kanji character recognition routine to be performed in sequence prior to the performance of the accurate Latin font recognition routine in step 5. This can be contrasted with a third form of the template 33" shown in Table 8 for field 2, for a template named "East European Shipping." For the template 33" of Table 8, it is expected that there will be some Cyrillic alphabet and Greek alphabet characters as well as Latin alphabet characters. Thus the East European Shipping template of Table 8 will be used to analyze the first name field of those forms. Table 8 is for the first name field which is the second field of the form. Note that processing templates 33, 33' and 33" all refer to the same document form 10.

A similar interesting contrast can be seen in comparing Table 2, Table 7 and Table 8 for the artificial intelligence error correction processes specified in those three tables. The template 33 named "flood claims," which is shown in Table 2 for the portion representing the first name field, provides in step 7 for English first name lexical routine and in step 8 for the international first name lexical routine. By contrast, Table 7 for the template 33' named "Asian Shipping Claims," provides for the first name field, a Chinese first name lexical routine in step 7 and the international first name lexical routine in step 8. In further contrast, Table 8 for the template 33" named "East European Shipping," provides for the second field "the first name" field, the Russian first name lexical routine in step 7 and the international first name lexical routine in step 8. All three of these templates apply to the same document form, namely the insurance claim form 10. However it is anticipated that a first batch of forms will be received which deal with "flood claims" initiated by primarily western-speaking writers. That a second batch of forms will be received which were initiated by principally Asian writers, and therefore the alternate "Asian Shipping Claims" template 33' represented in Table 7 will be used. As a further alternate, when it is anticipated that the principal initiators of the forms will be Eastern Europeans, then the "Eastern European Shipping" template 33" represented in Table 8 will be used.

An additional feature of the artificial intelligence error correction processor 28 is the capability of searching for an appropriate knowledge base list. Where the subject matter of a particular field can be related to the alphabet typically selected to fill out that field, then a relationship is established between the character recognition process which can provide the lowest error rate and the corresponding knowledge base list which provides the lowest error rate for the artificial intelligence coded data error correction process. An example of this is the relationship between the principal alphabet used by residents of a particular country. Where a field on a document form identifies the country of the person filling out the form, then there is some likelihood that a relationship can be established between the optimum character recognition process and the optimum artificial intelligence error correction process for that field. Reference can be made to Table 10 which shows an example of this relationship. Table 10 shows five lists of countries, each list corresponding to a principal alphabet used by the countries. For example, list 1 is for Latin alphabet countries and the list includes the countries of Angola, Argentina, Canada, France, United Kingdom, U.S.A., etc. List 2 is for Cyrillic alphabet countries and its list includes Bulgaria, Byelorussia, Russia, Ukraine, etc. List 3 is for Greek alphabet countries, and includes Albania, Cyprus, Greece, Yugoslavia, etc. List 4 is for Mandarin alphabet countries and includes China, Mongolia, etc. List 5 is for Arabic alphabet countries and includes Afghanistan, Egypt, Jordan, etc.

Table 9 is a processing template 33'" for the insurance claim form 10, modified so that field 3 is a country field. The template name is "International Claims" and it is intended for use for batches of forms drawn from a variety of international country sources. In anticipation of the variety of alphabets which will fill out the form, steps 3, 4, 5, 6 and 7 of Table 9 call for recognition routines for the Latin alphabet, Cyrillic alphabet, Greek alphabet, Mandarin alphabet, and Arabic alphabet, respectively. In accordance with this feature of the invention, step 9 of Table 9 provides an artificial intelligence process step whose operation is a knowledge base list search routine.

Figure 9:
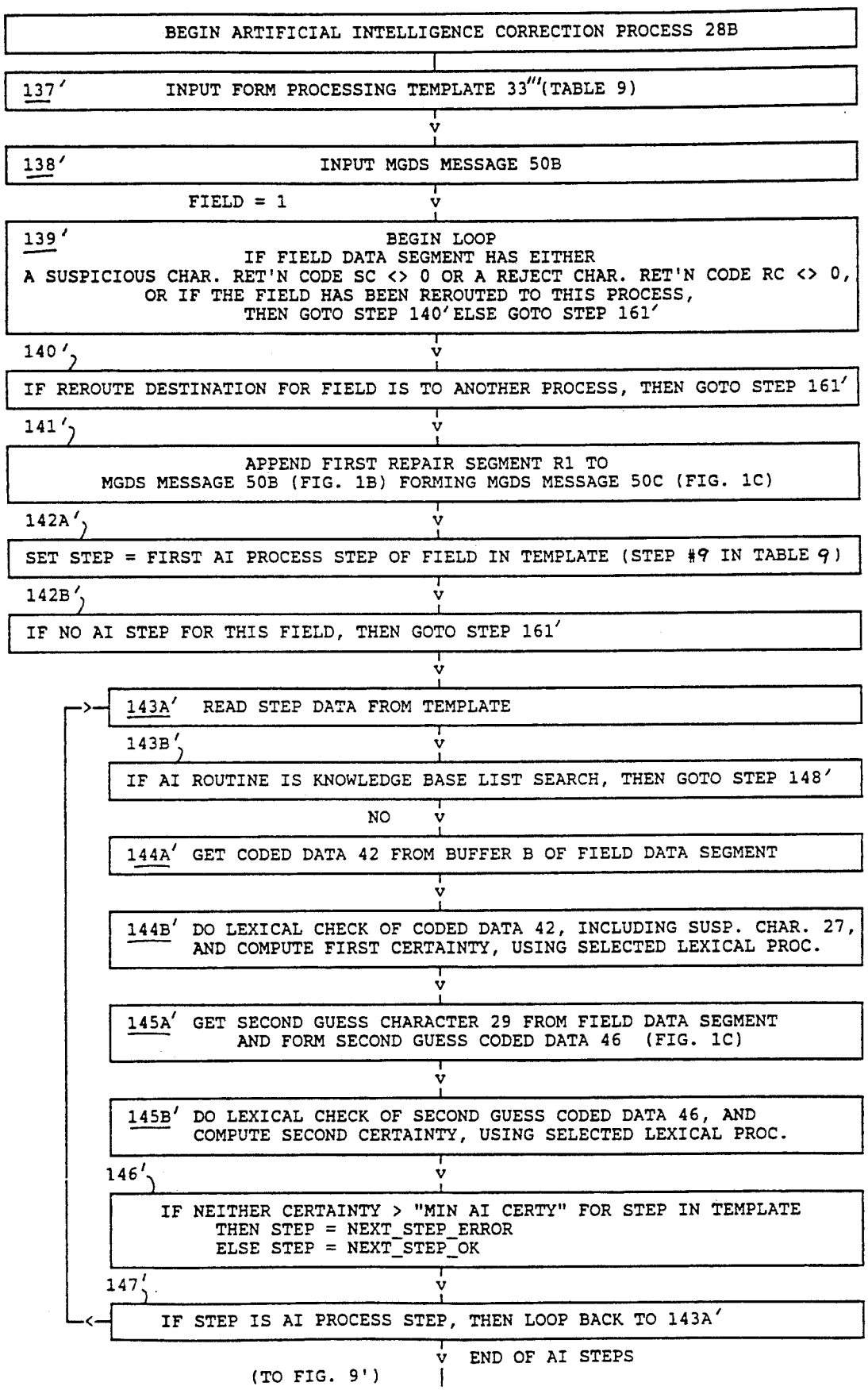
FIGS. 9 and 9' illustrate the sequence of operational steps for the artificial intelligence correction process 28B.

FIG. 9 is a flow diagram of a sequence of operational steps for an artificial intelligence correction process 28B which runs on the artificial intelligence error correction processor 28, to carry out a knowledge base list search routine processing. The process of FIG. 9 starts with 137' which inputs the template 33'" of Table 9. Step 138' inputs the MGDS message and step 139 begins the loop for each field. Step 140' determines if the field is to be re-routed. Step 141' appends a first repair segment R1 to the MGDS message.

Step 142A' sets the step variable equal to the first artificial intelligence process step of the field in the template, for example step 9 in Table 9. Then step 142B' determines if there is no AI step for this field. Then step 143A' begins a loop which reads the step data from the template 33'".

Then step 143B' determines if the AI routine is a knowledge base list search routine and if it is, then the process flows to step 148'. In step 148', the step gets the recognition routine name from the MGDS portion 63. Then in step 149A', the step accesses the AI reference list in Table 10, corresponding to the recognition routine name obtained from the MGDS portion 63.

Then in step 149B', the step performs a lexical check of the coded data 42, generating a best-guess data and it computes the certainty of that coded data, using the accessed AI reference list from Table 10.

Then in step 150', if the certainty computed in step 149B' is less than "MIN-AI-CERTY" set forth in step 9 of Table 9, then the step variable is set equal to the next step-if-error. Alternately, if the certainty is greater than the minimum AI certainty provided in the step in the template, then the step variable is set equal to the next-step-OK. Referring to step 9 in Table 9, the minimum AI certainty value is stated as 100 percent.

Then in step 151', if the certainty computed in step 150' is determined to be greater than the minimum AI certainty for the step in the template, then the coded data 42 is transferred from the data buffer B to the first repair segment R1, and then the step loads the best-guess data computed in step 149B', into buffer B of the field data segment. Then step 151' goes to step 154'. That sequence of steps from 148' through 151' carries out the processing of a knowledge base list search routine such as is shown in the example of Table 9 and Table 10.

In the flow diagram of FIG. 9, if step 143B' determines that the AI routine is not a knowledge base list routine, then the process flows to step 144A' through step 147' to perform the same type of artificial intelligence error correction processing as was performed in the flow diagram of FIG. 4C for steps 143A through 147 of process 28A, as previously described. Step 147', at the end of all AI steps in the template 33'" of Table 9, will flow to step 152' which operates similarly to step 152 of FIG. 4C, as previously described.

Then step 154' of FIG. 9 loads the certainty value 39 into the first repair segment R1. Step 156' loads the cluster data or alternate choices 48 into the first repair segment R1. Then step 158' loads the repair operation 69 and time stamp into the first repair segment R1. Then step 160' determines if the current step in the template is a re-route process step, and if it is, then the intended re-routed destination is inserted into the MGDS portion 76. Then in step 161′, the field variable is incremented by one and it is determined whether another data field segment is present for processing. If it is, then the loop returns to step 139′. Alternately, the process flows to the output step 162′, which outputs the MGDS message 50C. The process 28B of FIG. 9 carries out the support of a knowledge base list search routine. The steps of process 28B of FIG. 9 can be combined with the steps of process 28A of FIG. 4C, for appropriate artificial intelligence error correction process applications.

When step 161 of process 28a determines that there are no more field data segments for analysis, then the process transitions to step 162 which outputs the MGDS message 50C shown in FIG. 1J(C). The MGDS message 50C shown in FIG. 1J(C) includes the six field data segments. In addition to the six field data segments, there are two repair segments, R1 which pertains to the second field for the first name and the repair segment R1′ which pertains to the third field for the state. The first field data segment 52 has its buffer B unchanged from the MGDS 50B. The field data segment 54 for the MGDS 50C, has its buffer B changed to the new character string "Joan." The third state field segment 56 in MGDS 50C has its buffer B changed to the character string "FL." The fourth, fifth and sixth field segments 12b, 44 and 12 respectively, remain unchanged in MGDS 50C, over that in MGDS 50B. The additional repair segment R1 which repaired the first name field, has its buffer 37 containing the character string "Ja*n." The second repair segment R1′ which repaired the state field, has its buffer 37 containing the string "FA." It is seen that a repair history is accumulating in the MGDS 50C in the form of the presence of the repair segments R1 and R1′. In addition, it is seen that the best estimate of the character string representing each respective field in the extracted field images 10″ of FIG. 2D, is present in each respective character buffer B for each field data segment in the MGDS 50C.

In FIG. 1C, the MGDS message 50C is formed by the error correction processor 28, using information from the MGDS 50B received from the character recognition processor 26. The MGDS 50C of FIG. 1C will have the repair address for the processor 28 entered into the repair segment R1 which augments the MGDS 50B. The segment R1 also will have the ID of the repair namely artificial intelligence or "AI." Also included will be a repair time stamp which in this case is fifth hour, third minute, 58th second or the day. The operation done will be entered as "LEX," indicating the English lexical analysis has been performed for this first repair. Then, the field repaired encompassing parameter for the MGDS 50C of FIG. 1C, will include the field name which is "FIRST," character position which is the second character or as used herein, "1." The first stage repair carried out at correction processor 28 makes use of first and second choice information included in the input MGDS message 50B from the character recognition processor 26.

It is appropriate at this point to discuss how the preferred embodiment of the invention uses a single intelligent forms processor 25 to execute in multi-task form, the respective processes carried out in the forms recognition and field extraction processor 24, the character recognition processor 26, and the artificial intelligence error correction processor 28.

FIG. 5A shows a detailed architectural diagram of the intelligent forms processor 25. The processor 25 includes a memory 302 which is connected by the bus 322 to the CPU 310, the bulk storage device 312, the display and keyboard 314, and the LAN adapter 316. The scanner adapter 318 connects the scanner 22 to the bus 322. The LAN adapter 316 connects the LAN 20 to the bus 322. In addition, an optional FAX and communications network adapter 320 can couple a fax telephone line to the bus 322 and can connect a data communications network to the bus 322. The CPU 310, can be for example an Intel 386 or 486 data processing unit. The bulk storage device 312 can be a hard disk storage such as a 200 megabyte hard disk storage, or it can be a combination of a hard disk magnetic storage and an optical read-write storage.

The memory 302 will include several computer programs, each of which is a sequence of executable instructions to carry out a process. The memory 302 includes the form processing template definition program 57A′ which carries out the processes 57A performed by the form processing template definition processor 57. The memory 302 further includes the template assembly partition 33P which is a space set aside for the assembly for the template 33 through the operation of the template definition program 57A′. Also included in the memory 302 is the form processing template 33, which is represented for example as Tables 1-6 and FIG. 10. Still further, a handprint recognition routine, a fast Latin font recognition routine, and an accurate Latin font recognition routine are also provided in the memory 302 for use with the character recognition program 26A′. Still further, an English first name AI error correction routine, an international first name AI error correction routine, and a state abbreviation AI error correction routine are provided in the memory 302, to be used with the AI correction program 28A′. The memory 302 includes a scanner interface program 23A′ which carries out the processes performed by the scanner processor 23, as described above. Also included in the memory 302 is a partition for the buffer 40. Still further, a partition is provided in the memory 302 for the master form format 10F which is shown in FIG. 2A and in FIG. 2B.

The memory 302 provides a partition for the forms recognition program 24A′ which carries out the forms recognition process 24A shown in FIG. 4A. The partition also includes the field extraction program 24B′ which carries out the field extraction process 24B shown in FIG. 4A. The result of the execution of the forms recognition program 24A′ and the field extraction program 24B′ is the production of the extracted field images 10″ and the production of the MGDS 50A, as has been described above.

Another partition is provided in the memory 302 for the character recognition program 26A′ which carries out the character recognition process 26A shown in FIG. 4B. As a result of the execution of the character recognition program 26A′, the MGDS 50B is produced. The character recognition program 26A′ operates upon the MGDS 50A produced by the forms to produce the MGDS 50B.

A partition is also provided in the memory 302 for the artificial intelligence error correction program 28A′ which carries out the artificial intelligence process 28A shown in FIG. 4C. The artificial intelligence error correction program 28A′ operates upon the MGDS 50B produced by the character recognition program 26A′, to produce the MGDS 50C.

A multi-tasking operating system 304, such as IBM's Operating Systems/2, Extended Edition, can be used in multi-tasking mode to control the multi-task execution of the programs in the memory 302. Alternately, the operating system 304 need not oversee the multi-task execution of the application programs, but instead the application programs can be sequentially executed for processing a particular data field segment in the MGDS.

The provision of a facsimile and network adapter 320 connecting a telephone facsimile line to the processor 25, enables the receipt of facsimile images in lieu of images provided through the scanner adapter 318. Similarly, the connection of the adapter 320 to a data communications network enables the receipt of existing document image files from the network, in lieu of the production of such document image files by the scanner 22.

The MGDS message 50C is output from the AI error correction processor 28 over the local area network 20 to the second repair station which is the data base error correction processor 30. The data base error correction processor 30 contains a data base of customer names used in the particular application running on the host computer 34. The host computer 34, in this example, manages a document image archiving system for insurance forms, for an insurance company. The insurance company will have many insured customers and the list of those insured customers will be contained in the data base error correction processor 30. By comparing suggested character strings in the MGDS 50C which is input to the data base error correction processor 30, a selection can be made of that character string which is the same as the actual name of one of the insured customers in the particular host computer application. In this example, the MGDS 50C is input from the AI error correction processor 28 to the data base error correction processor 30 where there is appended thereto a second repair segment R2. The second repair segment R2 will characterize the second repair performed by the processor 30. In an alternate embodiment of the invention, the data base error correction processor 30 can be combined with the artificial intelligence error correction processor 28 and the character recognition processor 26 in the same processor 25 in a multi-task application.

The data base error correction processor 30 will take the preferred choice character string "Joan" 46 from the character data buffer B and will perform a comparison with the data base containing all of the insured customer names. It is found that there is no match for a "Joan Doe." Then, the data base error correction processor 30 takes the alternate choice 48 "John" received from the MGDS 50C, and applies it in a comparison of insured customer names in the data base. A successful comparison is made finding a "John Doe." As a result of this second repair operation, the contents of the character data buffer B with the string 46 "Joan," is transferred to the input data repair portion 37 in the second repair segment R2. Then, the contents of the character data buffer B is loaded with the repaired value for the character string 48 "John."

Figure 4D:
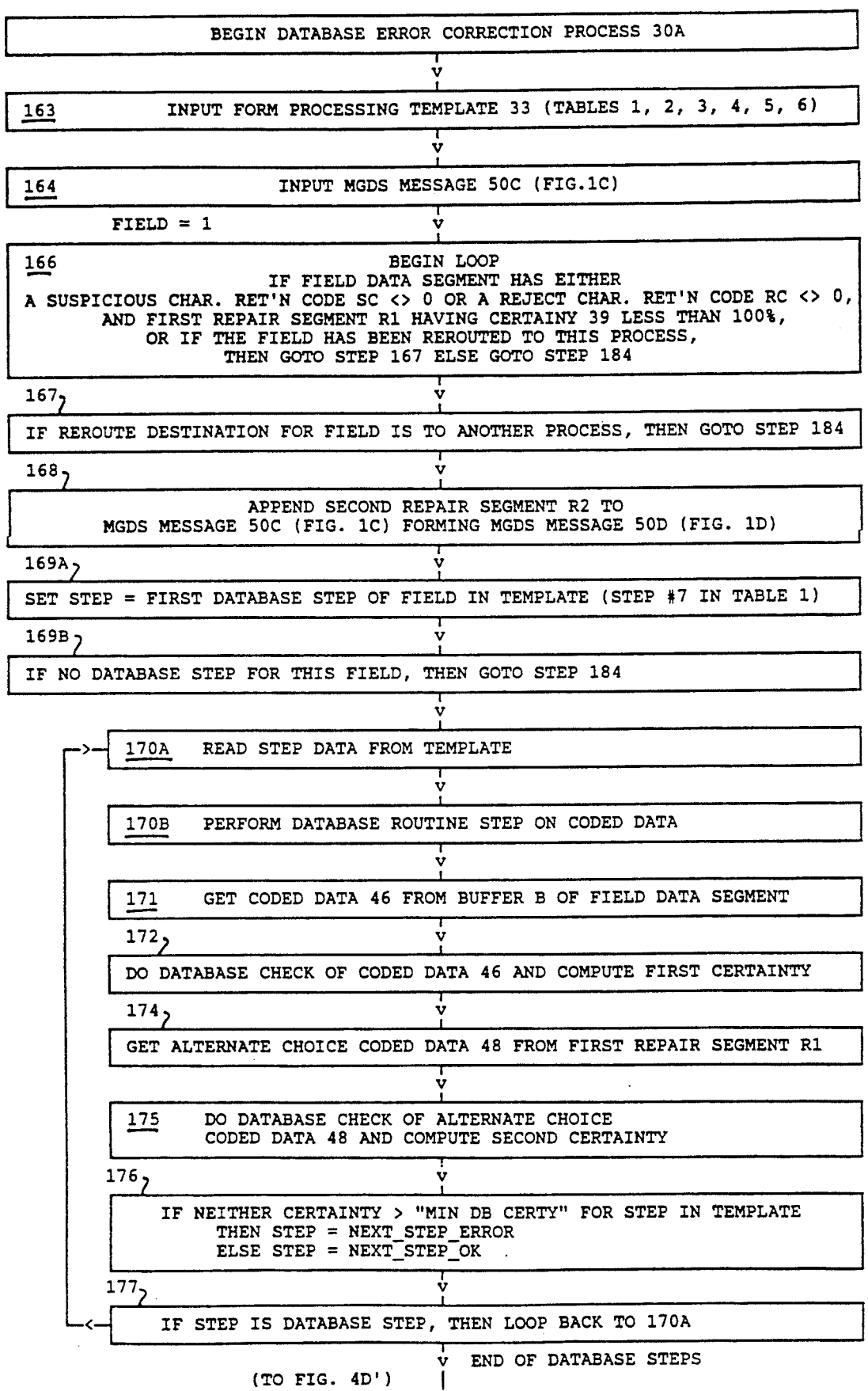
FIGS. 4D and 4D' illustrate the sequence of operational steps for the data base error correction process 30A.
Figure 4D:
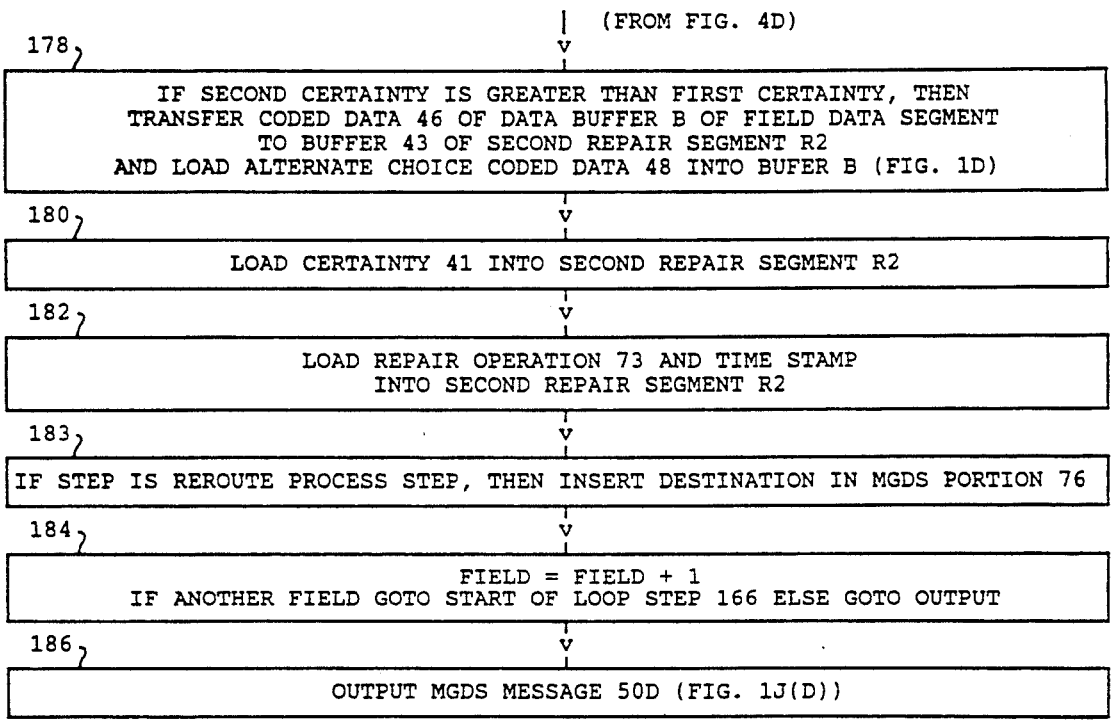

FIG. 4D illustrates the data base error correction process 30A which is performed by the data base error correction processor 30. The data base error correction processor 30 is shown in a more detailed architectural diagram in FIG. 5C. The processor 30 includes a memory 502 connected by means of the bus 522 to the CPU 510, the bulk store 512, the display and keyboard 514, the LAN adapter 516, and the fax and network adapter 520. The LAN adapter 516 connects the LAN 20 to the bus 522.

The memory 502 of the data base error correction processor 30, includes a partition for receiving and storing the form processing template 33. Also included is another partition for receiving and restoring the MGDS 50C. In addition, there is a partition for storing the data base error correction program 30A' which performs the second repair process and outputs the MGDS 50D. Also included in the memory 502 is the operating system 504.

The flow diagram of FIG. 4D illustrates the data base error correction process 30A which is encoded in a sequence of executable instructions forming the program 30A'. The process of FIG. 4D begins with step 163 of inputting the form processing template 33. The process then transitions to step 164 which inputs the MGDS message 50C, as shown in FIG. 1C.

Then step 166 begins a loop for each field in the form. The field variable is set equal to one and step 166 begins by determining if the field data segment has either a suspicious character return code SC not equal to zero or a reject character return code RC not equal to zero. This may be accompanied by the requirement that the first repair segment R1 have a certainty value 39 which is less than 100 percent. An alternate condition can be determined whether the field has been re-routed to this process, as would be indicated by a re-route destination value being in location 76 which identified the process 30A as the destination process. If any of these conditions are met, then the process flows to step 167. Alternately, if none of the conditions are met, then the process will flow to step 184.

In step 167, a determination is made as to whether the re-route destination for the field is indicated as going to another process. If so, then the process flows to step 184. Alternately, the process of FIG. 4D flows to step 168. In step 168, a second repair segment R2 is appended to the MGDS message 50C in FIG. 1C, forming the MGDS message 50D shown in FIG. 1D.

Then the process flows to step 169A which sets the step variable equal to the first data base step of the field in the template 33. This for example is shown for step 7 in Table 1. Then the process flows to step 169B, which determines if no data base step is present for this field in template 33, then the process flows to step 184.

Step 170A begins a loop which goes for each respective step in the field as specified in the template 33. Step 170A reads the step data from the template. Referring to Table 1 for this example, step 7 is the first data base step for field 1, and its operation is specified as the insured customer name data base routine. Step 170B of FIG. 4D performs the data base routine step on the coded data. Step 171 gets the coded data 46 from the buffer B of the field data segment. Then step 172 does the data base check of the coded data 46 and computes a first certainty value.

Then step 174 gets the alternate choice coded data 48 from the first repair segment R1. Step 175 does a data base check of the alternate choice coded data 48 and computes a second certainty value.

Then step 176 determines if neither certainty value is greater than the minimum data base certainty value provided in the template for the step. Turning to Table 1, step 7, the branch value is provided for a minimum data base certainty "MIN-DB-CERTY" of 100 percent.

This means that the certainty value computed in either step 172 or step 175 must be greater than 100 percent. If step 176 determines that neither certainty value computed in either step 172 or 175 is greater than the minimum data base certainty value, then the step variable is set equal to the next step error value provided in the template 33. Referring to Table 1, step 7 shows that the next step-if-error value is eight, which means that the next step will be the re-route step 8 which will insert a field re-route destination in the MGDS 50D.

Alternately, step 176 determines that either one or both of the certainty values computed in steps 172 or 175 is greater than the minimum data base certainty value provided in the template 33, then the step variable is set equal to the next-step-OK value provided in the template 33. Turning to Table 1, step 7 shows that the next-step-if-OK is nine, meaning that the next step will be step 9 of the template in Table 1, which provides for a manual verifying correction routine as the next step.

The flow diagram of FIG. 4D then transitions to step 177 which determines if the new step identified in step 176 is the data base step. If it is the data base, then the process loops back to step 170A. Alternately, if it is not a data base step, then this signifies the end of the data base steps for this field.

The process then transitions to step 178 which determines if the second certainty value computed in step 175 is greater than the first certainty value computed in step 172. If it is, then the coded data 46 is transferred from the data buffer B of the field data segment to the buffer 43 of the second repair segment R2. Then the alternate choice coded data 48 is loaded into the buffer B, as shown in FIG. 1D.

Then, step 180 loads the certainty value 41 into the second repair segment 42, which was computed and identified in step 178. Then in step 182, the repair operation 73 and the time stamp are loaded into the second repair segment R2. Referring to FIG. 1D, the operation done portion 73 of the repair segment R2 has loaded therein the operation designation "ICN-DB," which represents the "insured customer name data base."

Then in step 183 of FIG. 4D, it is determined if the last step identified in the loop from steps 170A–177 is a re-route process step. If it is, then a re-route destination is inserted into the MGDS portion 76.

Then in step 184, the field variable is incremented by one and it is determined whether another field is present in the form. If it is, then the process loops back to step 166. Alternately, the process flows to step 186. In step 186, the MGDS 50D is output, as is shown in FIG. 1J(D).

The MGDS 50D shown in FIG. 1J(D) has six field data segments and three repair segments. The six field data segments correspond to the six fields present in the extracted field images 10″ of FIG. 2D. The buffer B for each respective field data segment of the MGDS 50D contains the character string which is the best current estimate of the image of the characters in the corresponding field of the extracted field images 10″. In addition, a character recognition repair history has been constructed in the form of the three repair segments R1, R1′ and R2. The presence of these three repair segments assists in the subsequent further analysis of respective field data segments. The presence of these three repair segments also provides an audit trail for improving the overall character recognition process.

The error correction processor 30 loads the repair address "30" into the segment R2, it loads the repair ID which in this case is data base "DB" into second segment R2, and it loads the repair time stamp of the fifth hour, fourth minute, first second into the repair time stamp parameter of R2. The operation done is loaded as "DATA BASE" into the segment R2 and then their field repaired encompassing parameter in R2 has a field name of "FIRST" loaded therein, the character position of "2" is loaded indicating that the character which is changed is the third character in the string. The data base query can also be entered and is characterized as "customer name" in the segment R2. Also, the level of certainty of 100 percent can be entered into the segment R2. The completed MGDS message 50D output from the data base error correction processor 30 is shown in FIG. 1D.

The MGDS 50D is then transferred to the manual verify and correction processor 32 over the local area network 20.

The manual verify and correction processor 32 will accept the MGDS 50D and will append to it a third repair segment R3. Depending upon the application, a required manual verification can be made on the result of the sequential correction for the character string which has been flagged for the particular field.

The MGDS message 50D output from the data base error correction processor 30 and received by the manual verify and correction processor 32, contains the character data 48 "John" which is to be verified by the operator at the processor 30. The correction processor 32 will append a third repair segment R3 for the third repair stage, whether an actual repair or merely a validation takes place. The repair address "32" and the identity of the operator "Jones" will be entered into the segment R3. Also, the repair time stamp of fifth hour, fifth minute, 15th second, will be entered into the segment R3. The operation done will be indicated as "valid" for validate in segment R3. The coordinates for the character or the entire string as the application may require, are abstracted from the reject character information S originally produced by the character recognition processor 26. These are the coordinates of the location in the image bit map for the field and the reject or suspicious character identified by the character recognition processor 26. The correction processor 32 will use these coordinate values to highlight and/or magnifying the field as it is displayed to the operator. A copy of the document image 10′ will be delivered over the LAN 20 to the correction processor 32, for viewing by the operator. The location specified by the coordinates of the rejected or suspicious character are used to highlight and/or magnify that portion of the document image displayed. The operator can then quickly compare the highlighted portion of the document image to the character string 48 "John," which is also displayed in alphanumeric characters on the display screen of the processor 32. If the operator accepts the representation of the string 48 "John," then a validation acceptance is recorded in the segment R3. The validation indication can be entered into the segment R3, for example under the comments portion.

Alternately, if the operator wishes to make a change such as capitalizing all of the characters to change string 48 into string 49 "JOHN," then in accordance with the invention, the string 48 is transferred from the character data buffer B to the input data repair portion 55 of the segment R3. Then the processor 32 loads the corrected value string 49 "JOHN" into the character data buffer B. Other appropriate fields are filled in the segment R3, such as the field name, character position, and comments.

Figure 4E:
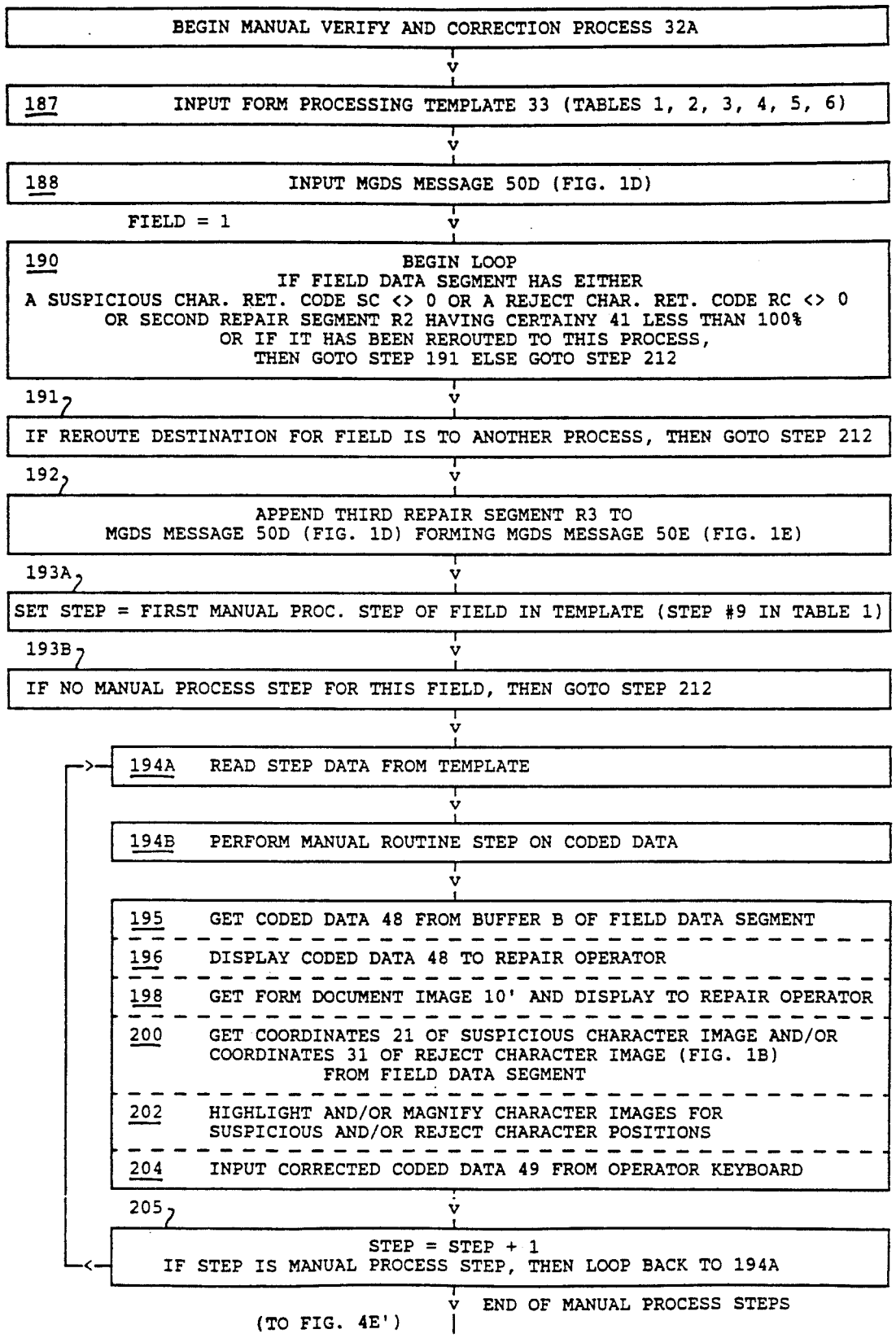
FIGS. 4E and 4E' illustrate the sequence of operational steps for the manual verify and correction process 32A.
Figure 4E:
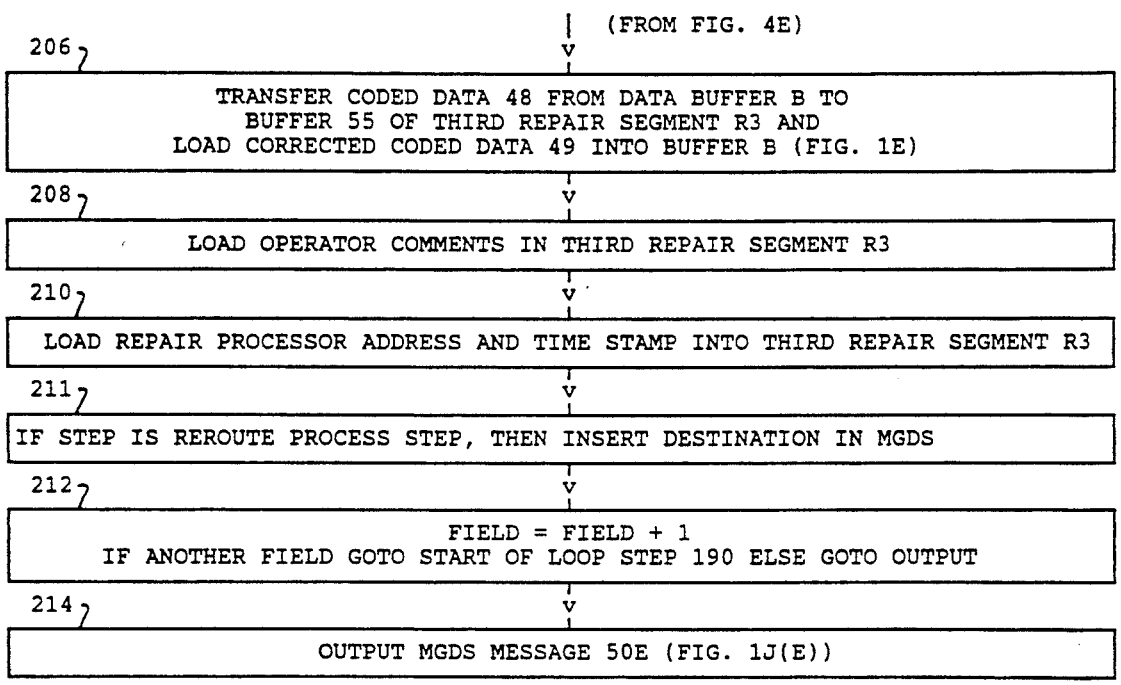

The manual verify and correction process 32A is shown in FIGS. 4E and 4E'. The flow diagram of FIG. 4E begins with step 187 which inputs the form processing template 33. Then in step 188, the MGDS message 50D is input as shown in FIG. 1D.

Then step 190 begins a loop for each field in the form. The field variable is set equal to one and then the step 190 determines if the field data segment has either a suspicious character return code SC not equal to zero or reject character return code RC not equal to zero. Alternately, the step 190 determines if the second repair segment R2 has a certainty value 41 of less than 100 percent. Alternately, the step 190 determines if field data segment has been re-routed to this process by means of a re-route destination value in the MGDS pointing to process 32A. If any of these conditions are met, then the process flows to step 191. Alternately, the process flows to step 212.

In step 191, determination is made as to whether the re-route destination for the field is to another process. If it is, then the process flows to step 212. Alternately, the process of FIG. 4E flows to step 192 which appends the third repair segment R3 to the MGDS message 50D shown in FIG. 1D, forming the MGDS message 50E shown in FIG. 1E.

Then in step 193A, the step variable is set equal to the first manual processing step of the field in the template 33. This corresponds to step 9 in Table 1. Then in step 193B, it is determined if no manual process step is present for this field as shown in the template 33, then the process flows to step 212.

Step 194A begins a loop for each step in the field. Step 194A reads the step data from the template. Referring to Table 1, step 9 is the first manual processing step in the template for this field. In step 194B, the step performs the manual routine on the coded data. The manual routine is the manual verify and correction routine set forth in the template 33. Step 195 gets the coded data 48 from the buffer B of the field data segment. Then step 196 displays the coded data 48 to the repair operator. Then step 198 gets the form document image 10' and displays it to the repair operator. Step 200 gets the coordinates 21 in the suspicious character image and/or the coordinates 31 the reject character image as shown in FIG. 1B, from the field data segment. Then in step 202, the step highlights and/or magnifies the character images for the suspicious and/or reject character positions. Then in step 204, the corrected coded data 49 is input from the operator keyboard.

Step 205 increments the step variable by unity and determines if the new step is a manual process step. If it is, then the process loops back to step 194A. If it is not, then this constitutes the end of the manual process steps for the loop from step 194A to 205.

The process of FIG. 4E then transitions to step 206 which transfers the coded data 48 from the data buffer B to the buffer 55 of the third repair segment R3 and it loads the corrected coded data 49 into the buffer B, as is shown in FIG. 1E. Then in step 208, operator comments are loaded into the third repair segment R3.

Then in step 210, the repair processor address and the time stamp are loaded into the third repair segment R3. In step 111, it is determined whether the last step identified in the loop from steps 194A-205 is a re-route process step. If it is, then a re-route destination value is inserted into the MGDS.

Then in step 212, the field variable is incremented by one and it is determine whether there is another field in the form. If there is, then the process transitions to step 190. If there is not, then the process transitions to step 214. Step 214 outputs the MGDS message 50E, as is shown in FIG. 1J(E).

In this example, there will be no other fields to process by the manual verify and correction process 32A. Thus the process transitions to step 214 which outputs the MGDS message 50E, shown in FIG. 1J(E). The MGDS message 50E shown in FIG. 1J(E) has six field data segments and five repair segments.

FIG. 1J(E) shows the form of the MGDS 50E which will be output to the host computer 34 for storage in the repair history storage 38. Before storing the MGDS 50E in the repair history storage 38, the host computer 34 will take the contents of the buffer B for each field data segment for each of the six fields of the form 10' of FIG. 2C, and it will store the contents of each buffer B as the best estimate of the character string which represents the image of the corresponding field in the form. The coded data from field segment 52 for the MGDS 50E is contained in its buffer B as "Doe." This coded data is stored in the coded data storage 35 by the host computer 34, as representing the last name field 16' of the scanned form image 10' in FIG. 2C. Similarly, the buffer B for the field data segment 54 containing the character string "JOHN" will be stored by the host computer 34 in the coded data storage 35 as the best estimate of the character string representing the first name field 16' of the scanned form image 10'. Similarly, the contents of the buffer B for the field data segment 56 which is the character string "Fla." will be stored in the coded data storage 35 by the host computer 34, as the best estimate of the state field 12a' of the scanned form image 10' of FIG. 2C.

At a later time, if the host computer 34 is instructed to conduct an audit as to how the character string in buffer B for a particular field data segment in the MGDS 50E was repaired, the history of repairs for the character recognition of that field can be ascertained by accessing the MGDS 50E from the repair history storage 38. Each respective repair segment corresponding to the field being audited, can be examined to determine how the repair was carried out. For example, for the second field segment 54 which represents the first name field 16', an audit of the character recognition repairs would examine the field data segment 54, the repair segment R3, the repair segment R2, and the repair segment R1, in that sequential order. This would enable working backwards from the final best estimate of the field contained in the field data segment 54 of the MGDS 50E, backward in reverse sequence for the repairs that were executed on that field. If such an audit were conducted in order to improve the overall repair process, a clear indication as to how each stage of the repair was conducted would be revealed from the collective repair history represented by the repair segments in the MGDS 50E.

The resulting MGDS message 50E now contains a history of the sequential repairs performed on the contents of the first name field 16. The MGDS message 50E can then be transmitted over the LAN 20 to the buffer storage 40' for temporary storage. Alternately it can be transferred to the repair history storage 38 for long term storage. Alternately, it can be transferred to the host computer 34 where the contents of the coded data buffer B for the field data segment 54, which is the string 49, can be loaded into the coded data storage 35. The contents can be used for example as an index value where the application uses the insured customer name as the index value to store the document image 10'.

Figure 5B:
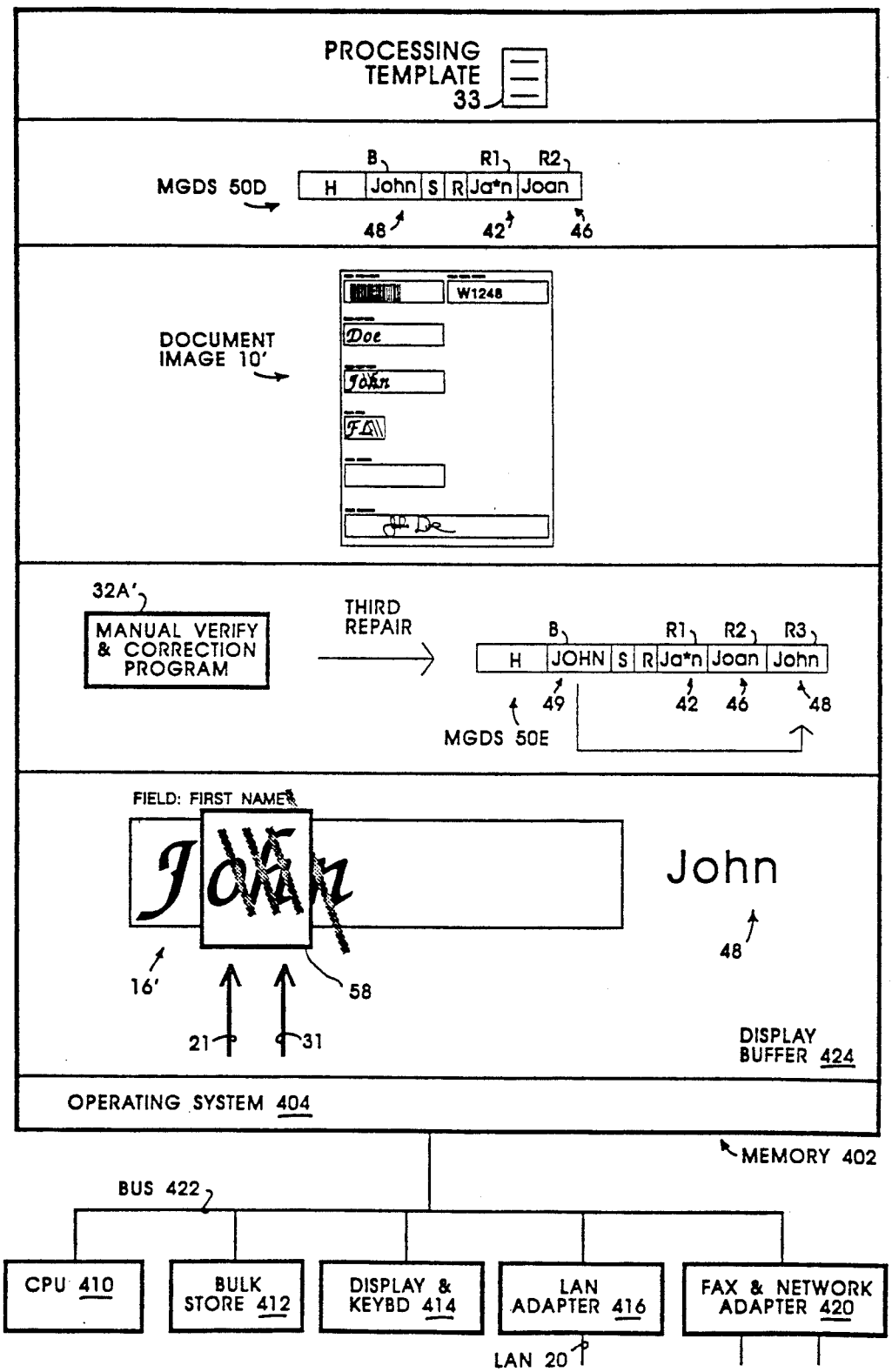
FIG. 5B illustrates a detailed architectural diagram of the manual verify and correction processor 32.
Figure 5C:
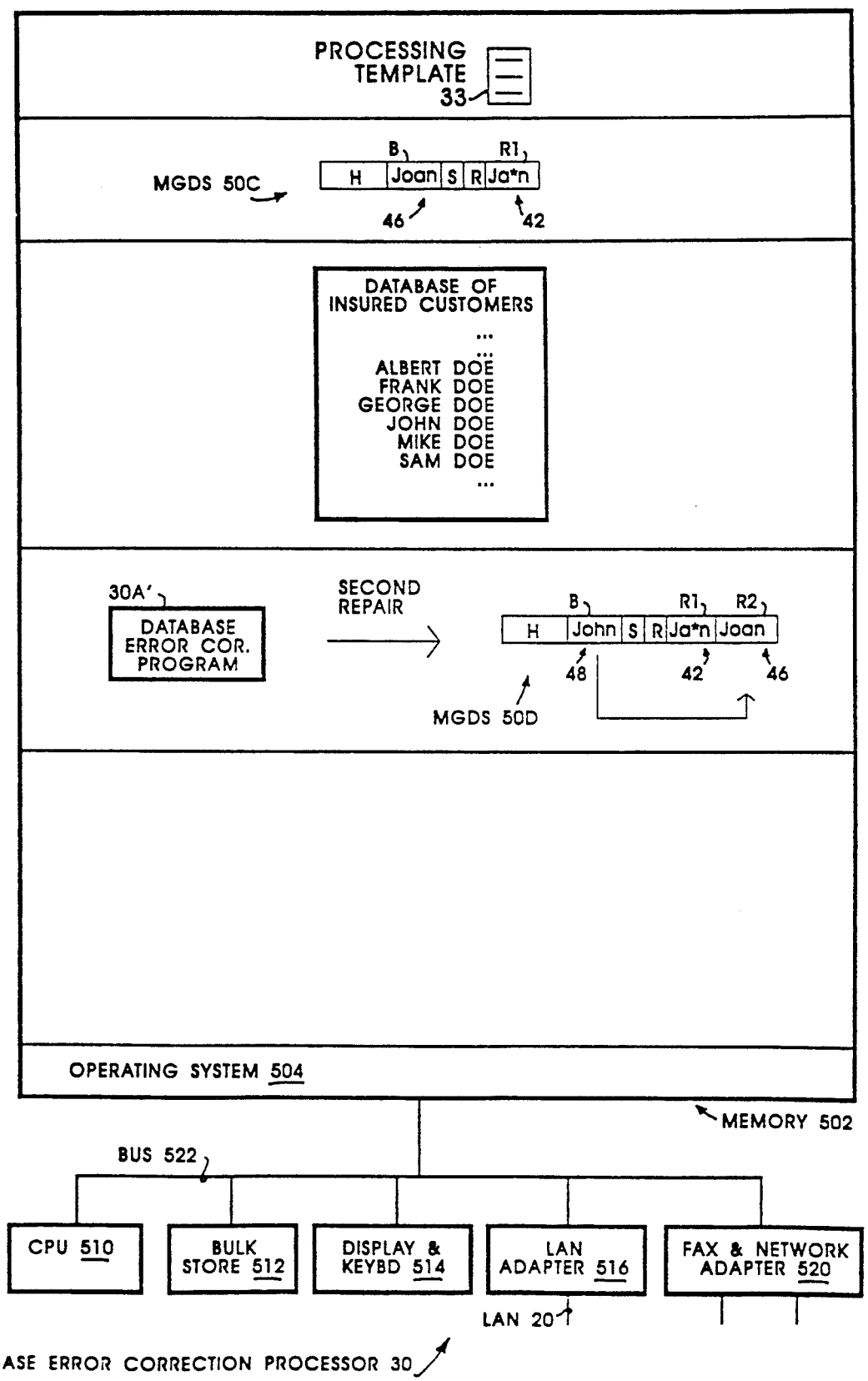
FIG. 5C illustrates a detailed architectural diagram of the data base error correction processor 30.

The manual verify and correction processor 32 is shown in a more detailed architectural diagram in FIG. 5B. The processor 32 consists of a memory 402 connected by the bus 422 to CPU 410, a bulk storage device 412, a display and keyboard 414, a LAN adapter 416, and a facsimile and network adapter 420. The LAN adapter 416 connects the LAN 20 to the bus 422. The FAX and network adapter 420 connects a facsimile telephone line to the bus 422 and it connects a data communications network line to the bus 422.

The memory 402 of the processor 32 contains several partitions which include computer programs which are sequences of executable instructions to carry out the processes described above. In particular, the manual verify and correction program 32A' is stored in the memory 402, and when its instructions are executed by the CPU 410, it carries out the manual verify and correction process 32A of FIG. 4E.

The memory 402 also includes a partition for receiving and storing the MGDS 50D shown in greater detail in FIG. 1D. The memory 402 also has a partition for receiving and storing the form document image 10'.

The memory 402 also has a display buffer partition 424 where the form document image 10' is assembled with a highlighted region 58 which is superimposed on the field image 16' at the suspicious character position 21 and the rejected character position 31. This composite image is then displayed to the operator at the processor 32. In addition, the display buffer will assemble the coded data 48 which is "John" so that it may be also displayed to the operator, as previously described. The coded data 48 is obtained from the character data buffer B of the coded data portion 75 of the MGDS 50D. The display buffer 424 in the memory 402 has its contents displayed on a display device 414. The operator will enter the alternate character string 49 which is "JOHN" at the keyboard.

Figure 8B:
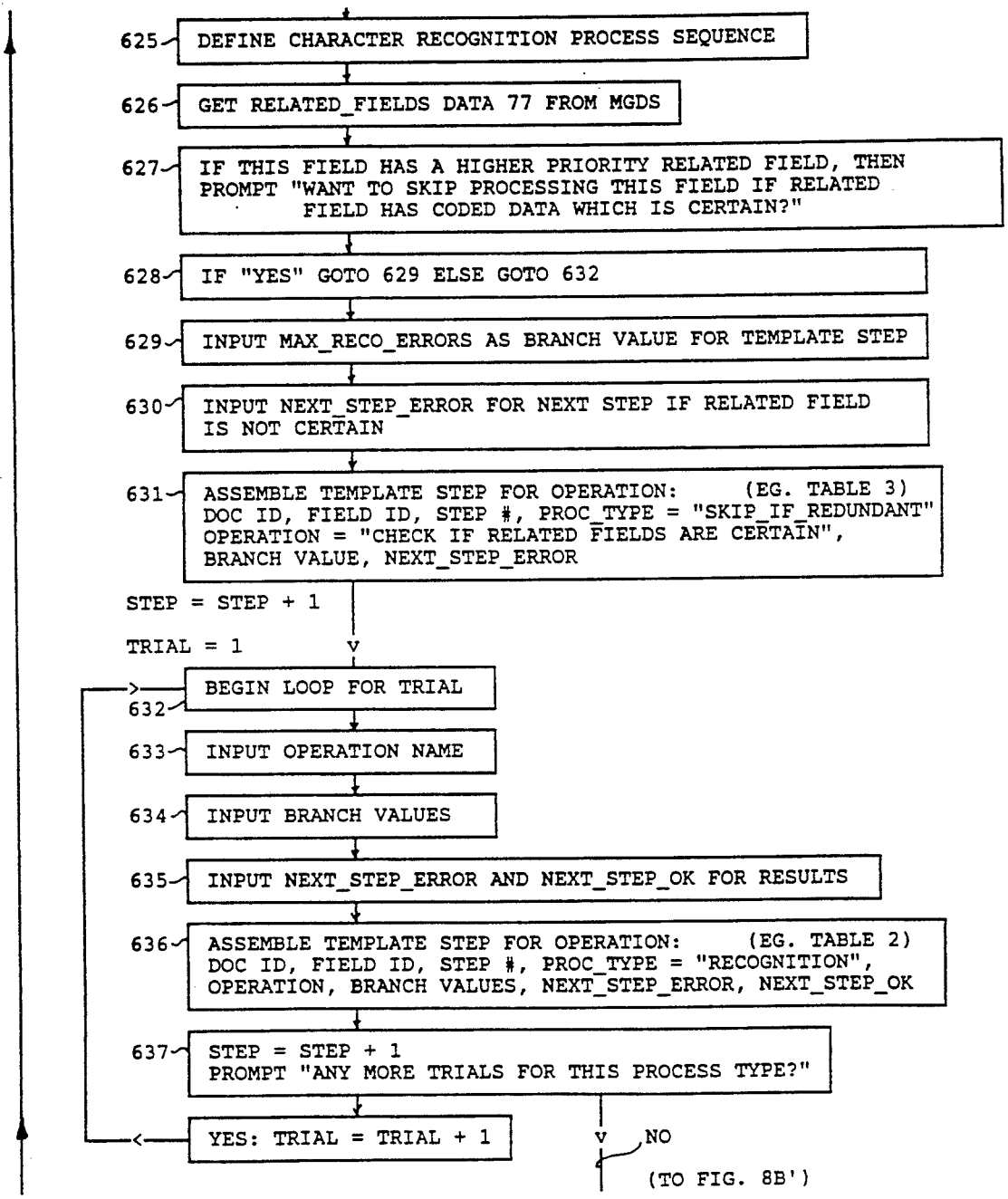
FIG. 8, which is composed of FIGS. 8A, 8B, 8B', 8C, 8C', 8C", 8D and 8E, illustrates a flow diagram of the sequence of operational steps for the definition process 57A to create a form processing template 33.
Figure 8B:
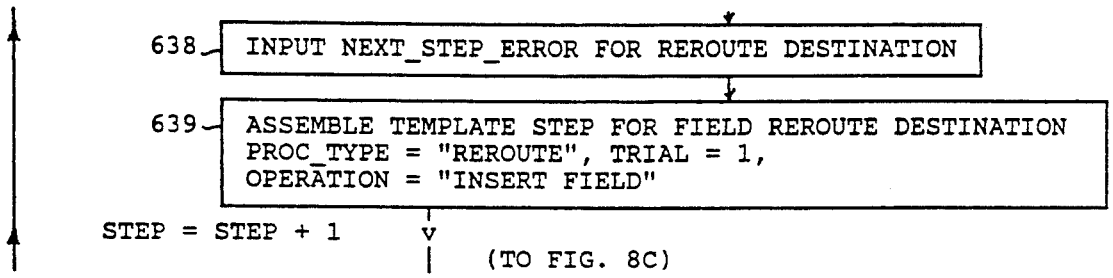
Figure 8C:
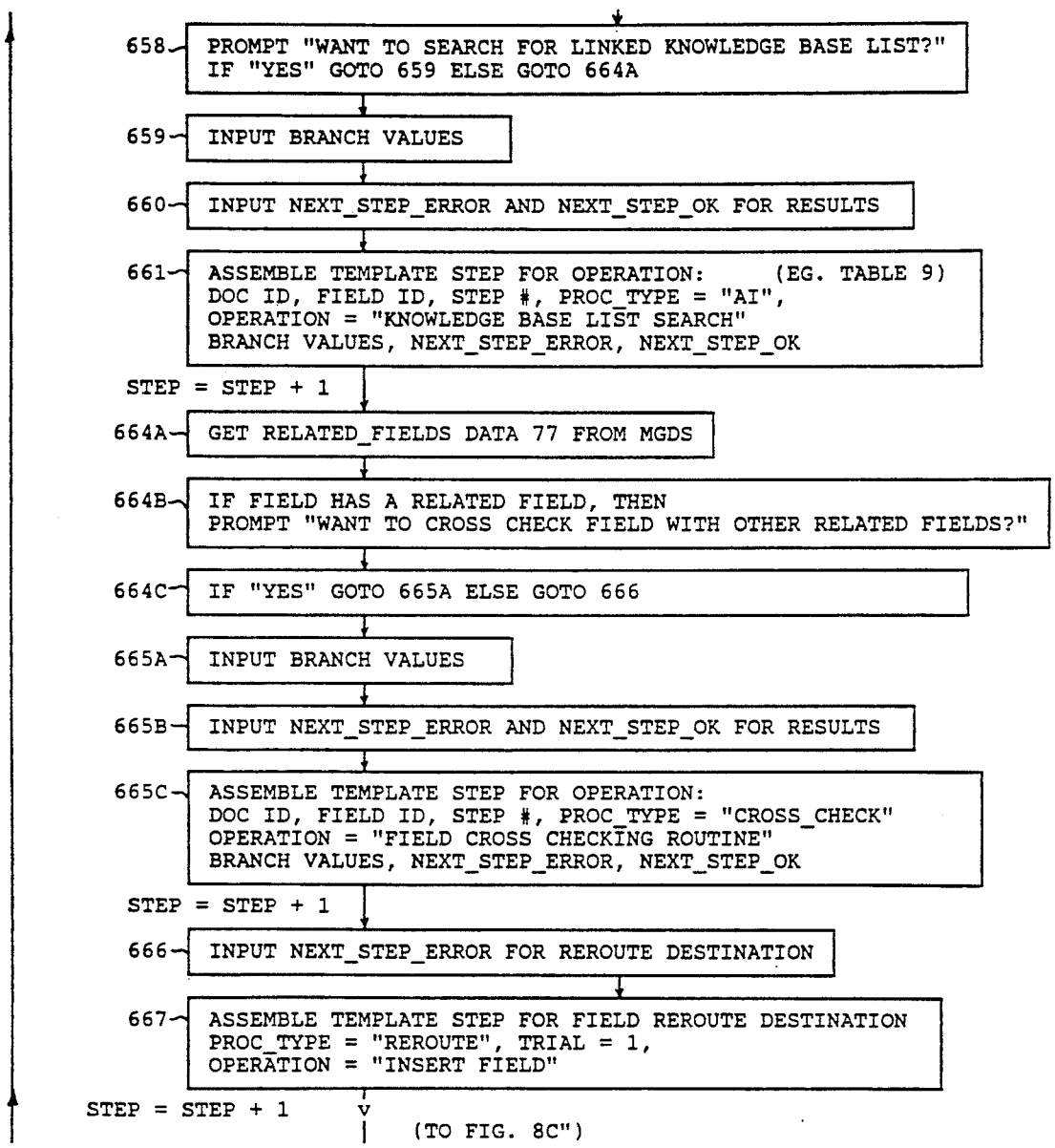
Figure 8D:
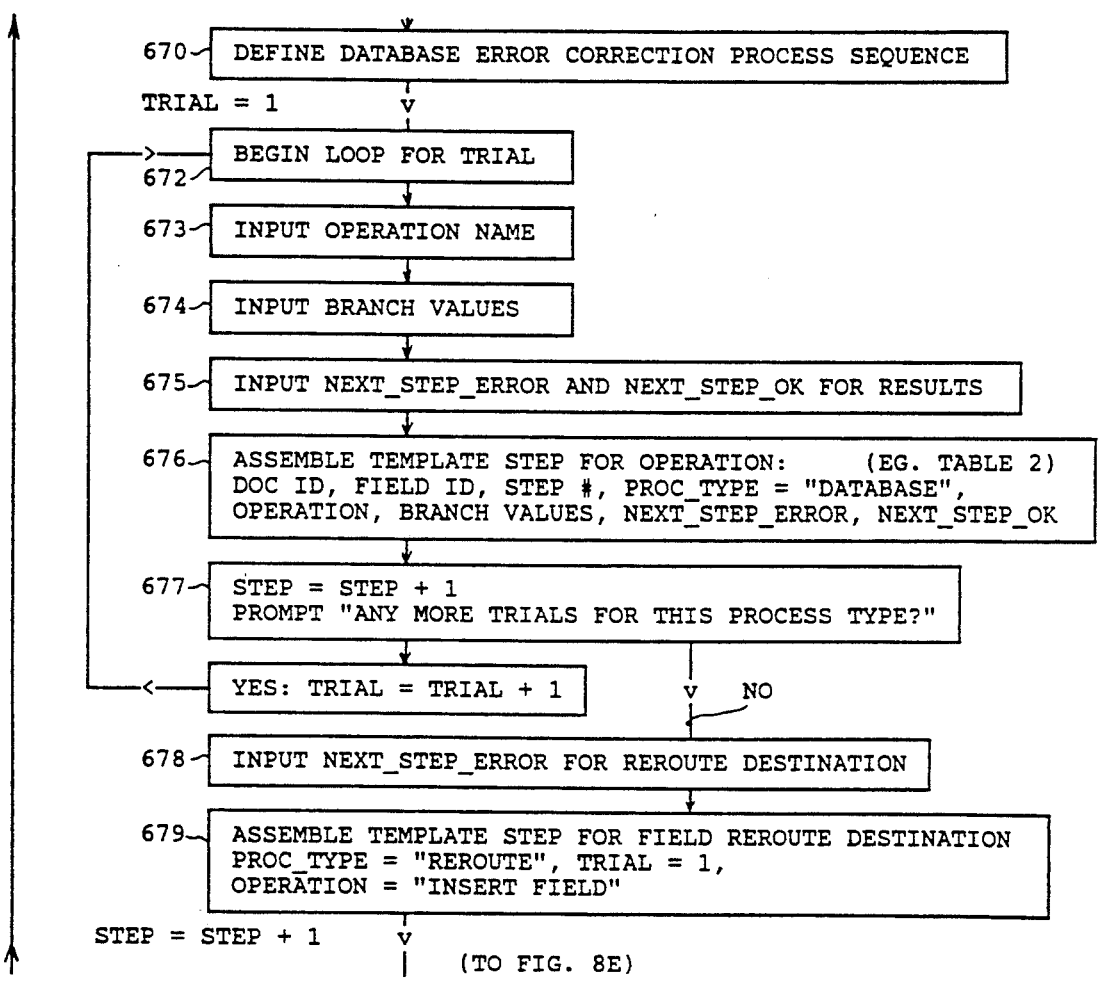
Figure 8E:
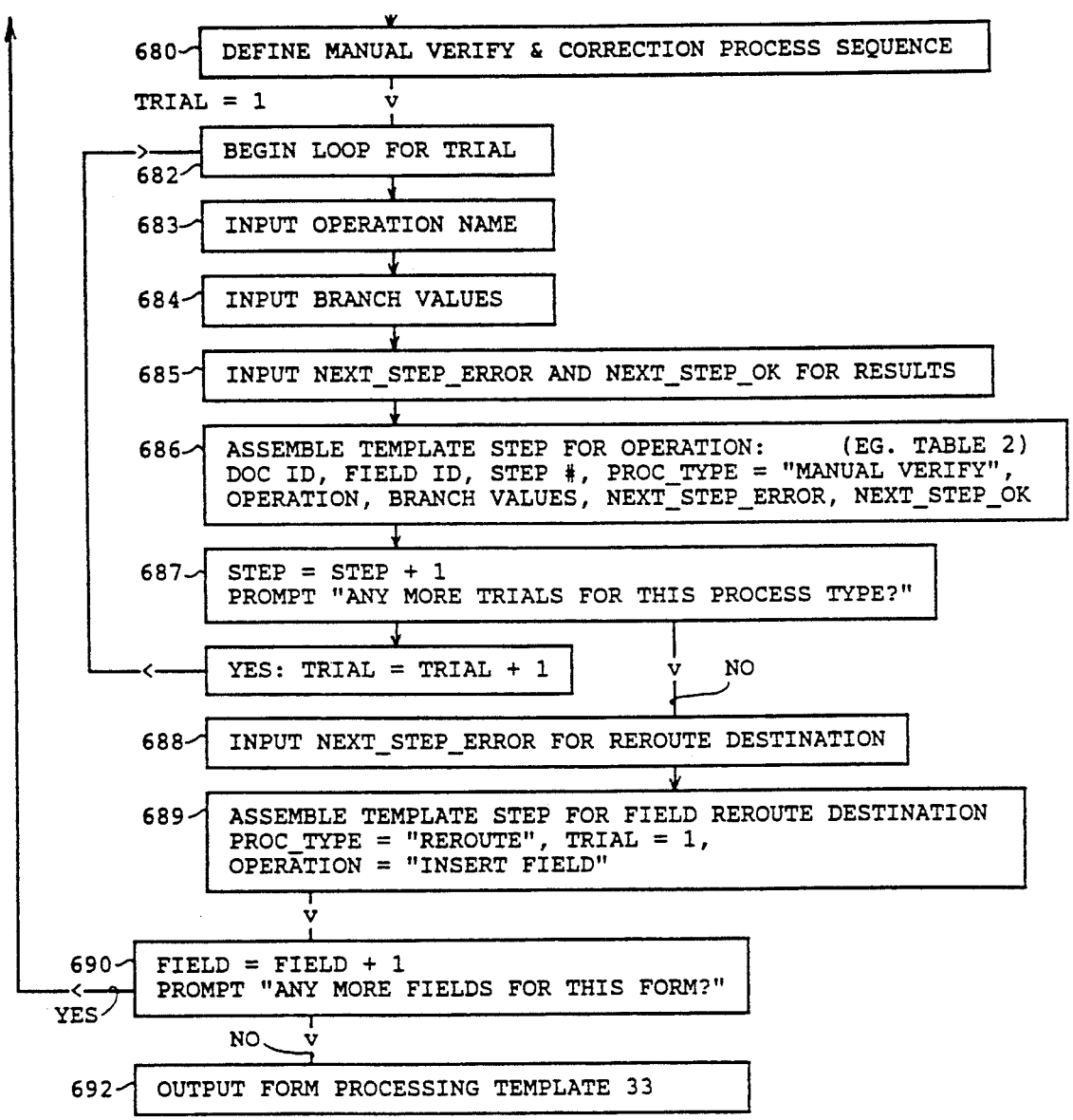

FIG. 8, which consists of FIGS. 8A, 8B, 8B', 8C, 8C', 8C'', 8D, and 8E, is a flow diagram of the sequence of operational steps for the definition process 57A for the form processing template 33. The process of 57A is embodied as a sequence of executable program instructions in the program 57A' in the form processing template definition processor 57 shown in FIG. 1.

The template definition process 57A enables the user to select customized character recognition processes and customized coded data error correction processes which are reasonably likely to be needed to automatically process a batch of document forms whose fields have certain, anticipated, uniform characteristics. FIG. 10 shows the layout of the template 33 formed by process 57A.

The process of FIG. 8A begins with step 600 in which the user inputs a form name. In the example herein, the form name is "Insurance Claim Form." In step 602, the master form MGDS 50M is accessed for the particular input form name, as is shown in FIG. 2B. Then in step 604, the user inputs the template name. In the example herein, Tables 1-6 illustrate the template whose name is "flood claims." At this point the process 57A forms the header portion 78 of the processing template 33 shown in FIG. 10. The header portion 78 can include the template name, the form name, and the number of fields in the form. In addition, an option selection can be provided for the "skip if redundant" step for all of the fields of the form. As shown in FIG. 10, this option is not selected so that only individual fields can be elected for "skip if redundant" feature. In addition, an option is provided in the header portion 78 for the "cross-check" of all related fields in the form. As is shown in FIG. 10, this option is not selected, thereby cross-checking is only elected for individual fields in this example. Then step 604 transitions to step 606, which begins the formation of the field processing definition portion 80 for the processing template 33 shown in FIG. 10.

Step 606 begins a loop for each field. Since the insurance claim form in the example herein has six fields, there will be six iterations of this loop. Step 610 begins the definition of the field extraction process sequence. The step variable is set equal to one and then the trial variable is set equal to one.

Another loop begins at step 612 for each trial. In step 613, the user inputs the operation name for the trial. For example, in Table 1, step 1 has trial 1 corresponding to the "field extraction routine" operation.

Then in step 614, the user inputs branch values for the step. For example in Table 1, step 3, for the recognition process of handprint recognition, branch values for the maximum rejected errors is one and for the maximum suspicious character errors is one.

Then in step 615 of FIG. 8, the user inputs the next step error value and the next step OK value. For example, in Table 1, step 3, the next step-if-error value is four and the next step-if-OK is seven.

Then in step 616, the portion of the template for the current step is assembled. For example, the document ID, the field ID, step number, process type which equals "field extraction," operation, branch values, next-step-error, and next-step-OK values are assembled. Reference can be made to Table 1 to illustrate this.

In step 617, the step variable is incremented by unity and a prompt is displayed to the user "Any more trials for this process type?". If the user responds with a yes, then the trial variable is incremented by one and the process loops back to step 612. Alternately, if the user indicates there are no more trials for this process type, then the process flows to step 618.

In step 618, the user inputs the next-step-error value for a re-route designation. This would correspond to Table 1, step 2, where the value of nine is inserted into the next step-if-error column. This would cause the field re-route destination to be process specified in step 9, which is the manual verify and correction routine.

Then the process flows to step 619, which assembles the template step for the field re-route destination, which would include the process type equaling "re-route," the trial equal to one, and the operation equal to "insert field," as can be seen by inspection of Table 1.

The process then flows to step 625 and increments the step variable by unity. In step 625, the character recognition process sequence definition begins. Step 625 transitions to step 626 which starts the feature of determining if the user wishes to skip processing this field is there is a related field which has coded data which is certain. Step 626 gets the related fields data 77 from the MGDS. Then if step 627 determines if this field has a higher priority related field, then it displays the prompt "Want to skip processing this field if related field has coded data which is certain?". Then step 628 determines that if the user inputs a "yes," it goes to step 629. Alternately if a "no," then it goes to step 632. In step 629, the user inputs the maximum recognition errors as the branch value for the template step. Then in step 630, the user inputs the next-step-error for the next step if the related field is not certain. Then in step 631, the template step is assembled for the operation, such as is shown in Table 3. Table 3, step 3 shows the "skip if redundant" process step. Step 631 of FIG. 8 assembles the document ID, field ID, step number and the process type equals "skip if redundant." It assembles the operation as "Check if related fields are certain," it adds the branch value and the next-step-if-error. Then the process transitions to step 632, incrementing the step variable by one and setting the trial variable equal to one.

The trial variable is set equal to one and a loop begins at step 632 for each trial. In step 633, the user inputs the operation name, in step 634, the user inputs the branch values, and in step 635, the user inputs the next step error and next step OK results. This corresponds to Table 2, step 3 wherein the user has input the operation name as "handprint reco routine," the user has input the branch values of the max reco rejection error being one and the max reco suspicious character error being one. The user has input the next-step-error value as being four and the next-step-OK value as being seven.

Then the process transitions to step 636 which assembles the template for the current step. By inspection of Table 2, step 3, it can be seen that the document ID, field ID, step number, process type equals "recognition," the operation, branch values, and next-step-error and next-step-OK values are entered into the step specification of the template 33 in Table 2.

Then the process transitions to step 637 which increments the step variable by unity and prompts the user with "Any more trials for this process type?". The user responds with a "yes," then the trial variable is incremented by one and the process flows back to step 632. If the user indicates "no," then the process flows to step 638.

In step 638, the user inputs the next-step-error value for the re-route destination. This would correspond to Table 2, step 6, where the re-route destination is designated as 12. Then in step 639, the template is assembled for this step, for the field re-route destination, indicating the process type is being "re-route," the trial is equal to one, and the operation being "insert field."

The process of FIG. 8 then flows to step 645, incrementing the step variable by unity and beginning the definition of the artificial intelligence process sequence.

Step 645 transitions to step 646 which starts a series through step 651 to determine if the user wishes to use the "skip if redundant" feature. Steps 646–651 operate in the same manner as steps 626–631 previously described. Step 651 assembles the template step for the example in Table 3, step 8 where a "skip if redundant" process type step is inserted. Step 651 then flows to step 652, incrementing the step variable by one and setting the trial variable equal to one.

The process then flows to step 652 and sets the trial variable equal to unity, to begin the loop for each trial. In step 653, the user inputs the operation name, in step 654, the user inputs the branch values, and in step 655, the user inputs the next-step-error and the next-step-OK for the results. This would correspond to Table 2, steps 7 and 8. In Table 2, step 7, the operation name is "English first name lexical routine." The branch values are for the "minimum AI certainty" of 50 percent. The next-step-error value is eight and the next-step-OK value is 10.

The process then flows to step 656 which assembles the template step for the operation. By inspection, Table 2, step 7 includes the document ID, the field ID, the step number, the process type equals "AI," the operation, the branch values, the next-step-error, and the next-step-OK data.

Then the process transitions to step 657 which increments the step variable by unity and prompts the user "Any more trials for this process type?". If the user responds with a "yes," then the trial variable is incremented by unity and the process flows back to step 652. If the user responds with a "no," then the process flows to step 658.

Steps 658-661 allow the user to insert a process to search for a linked knowledge base list. Step 658 offers the prompt then the process goes to step 658, otherwise it goes to step 664A. In step 659, the user inputs the branch values and in step 660, the user inputs the next-step-error, the next-step-OK for the results. Step 661 corresponds to step 9 of Table 9, assembling a template step for the AI process type whose operation is "knowledge base list search." Then step 661 transitions to step 664A, incrementing step variable by one.

Steps 664A–665C provide the user with the option of adding a cross-check step to cross-check the field with other related fields. Step 664A gets the related fields data 77 from the MGDS. Step 664B determines if the field has a related field, and if it does, then it displays the prompt "Want to cross-check field with other related fields?". In step 664C, if the user responds with a "yes," then the process goes to 665A, otherwise it goes to 666. In step 665A, the user inputs branch values, and in step 665E, the user inputs the next-step-error and next-step-OK values for results. Then step 665C assembles the template step in the template which has the process type as "cross-check" and the operation as "field cross-checking routine." Process 665C then transitions to process 666, incrementing the set variable by one.

In step 666, the user inputs the next-step-error for the re-route destination. This corresponds to Table 2, step 9. Then in step 667, the template step is assembled for the field re-route destination, with the process type equal to "re-route," the trial equal to one, and the operation equal to "insert field."

Step 667 transitions to step 668A, incrementing the step variable by one. Steps 668A–668D, provide the user with the option of changing the order of the next field to process.

The flow diagram of FIG. 8 then transitions to step 670, incrementing the step variable by unity and beginning the definition of the data base error correction process sequence.

The process transitions to step 672, setting the trial variable equal to unity, and beginning the loop for each trial. In step 673, the user inputs the operation name, in step 674, the user inputs the branch values, and in step 675, the user inputs the next-step-error and the next-step-OK data for results. This corresponds to Table 2, step 10 wherein the operation name is "insured customer name data base routine." The branch value is the "minimum data base certainty" value of 100 percent. The input next-step-error value is 11 and the next-step-OK value is 12.

Then the process transitions to step 676 which assembles a template step for the operation. By inspection of Table 2, step 10, it can be seen that the document ID, field ID, step number, process type equals "data base,"

operation, branch values, next-step-error, and next-step-OK data are entered into the template 33.

The process then transitions to step 677 which increments the step variable by unity and prompts the operator "any more trials for this process type?". If the user responds yes, then the trial variable is incremented by unity and process flows to step 672. If the user responds no, then the process flows to step 678.

Step 678 inputs the next-step-error data for the re-route destination. This corresponds to step 11 of Table 2, where the value of 12 is entered for the next-step-if-error. Then the process of FIG. 8 flows to step 679 which assembles the template step for the field re-route destination, including the process type equal to "re-route," the trial equal to one, and operation equal "insert field."

The process of FIG. 8 then transitions to step 680, incrementing the step variable by unity and beginning the definition of the manual verify and correction process sequence.

The process then transition to step 682, setting the trial variable equal to one and beginning the loop for each trial. Step 683 inputs the operation name, in step 684, the user inputs the branch values, and in step 685, the user inputs the next-step-error and the next-step-OK for results. This corresponds to step 12 of Table 2, wherein the operation name is a "manual verify and correction routine," the branch values are left blank and the input step error and next-step-OK values are left blank.

The process then transitions to step 686 which assembles the template step for the operation. By inspection of Table 2, step 12, it can be seen that the document ID, field ID, step number, process type equal "manual verify," operation, branch values, next-step-error, and next-step-OK data are entered into the template 33.

Then the process transitions to step 687 which increments the step variable by unity and prompts the user "Any more trials for this process type?". If the user responds "yes," then the trial variable is incremented by unity and the process flows to step 682. If the user responds "no," then the process flows to step 688.

In step 688, the user may optionally input the next-step-error for re-route destination. In step 689, the template step is assembled for the field re-route destination, including the process equal to "re-route," the trial equal to one, and the operation equal to "insert field." In this example herein, in Table 2, there is no step 12, the user has elected not to follow step 11 with a re-route destination step.

The process of FIG. 8 then flows to step 690, which increments the field variable by unity and prompts the user "any more fields for this form?". If the user responds yes, then the process flows back to step 606 which begins the loop for the next field. Since there are six fields in the insurance claim form of this example, this loop will be exercised six times, for fields 1-6.

In step 690, if the user answers no, then the process of FIG. 8 concludes with step 692 which outputs the form processing template 33. The format of template 33 can be modified from that shown in Tables 1-6, to make it more compact.

The form processing template 33 may be stored in the buffer 40 of the intelligent forms processor 25. Alternately, it may be stored in the buffer server 40' of FIG. 1. When a selected batch of document forms is to be processed, the user will select the processing template 33 which specifies the identity and preferred sequence for the customized character recognition processes and customized coded data error correction processes which the user believes are reasonably likely to be needed to automatically process the incoming batch document forms whose fields have certain uniform characteristics anticipated by the user.

Although a specific embodiment of the invention has been disclosed, it will be understood by those having skill in the art that changes can be made to that specific embodiment without departing from the spirit and the scope of the invention.

TABLE 1

Processing Template 33 for Insurance Claim Form - Field 1 - Last Name

| | | | | | BRANCH VALUES | | | | | |
|---|---|---|---|---|---|---|---|---|---|---|
| | TEMPLATE NAME "Flood Claims" | | | | MAX RECO REJ ERROR | MAX RECO SUSP. ERROR | MIN AI CERTY | MIN DB CERTY | NEXT STEP IF ERROR | NEXT STEP IF OK |
| DOC ID | FIELD ID | STEP # | PROC. TYPE | TRIAL # | OPERATION | | | | | | |
| Ins. Claim Form | 1 Last Name | 1 | Field Extrc | 1 | Field Extraction Routine | | | | | 2 | 3 |
| Ins. Claim Form | 1 Last Name | 2 | ReRoute | 1 | Insert Field ReRoute Dest. in MGDS 50A | | | | | (9) | |
| Ins. Claim Form | 1 Last Name | 3 | Reco | 1 | Handprint Reco Routine | 1 | 1 | | | 4 | 7 |
| Ins. Claim Form | 1 Last Name | 4 | Reco | 2 | Fast Latin Reco. Routine | 1 | 1 | | | 5 | 7 |
| Ins. Claim Form | 1 Last Name | 5 | Reco | 3 | Accurate Latin Reco. Routine | 1 | 1 | | | 6 | 7 |
| Ins. Claim Form | 1 Last Name | 6 | ReRoute | 1 | Insert Field ReRoute Dest. in MGDS 50B | | | | | (9) | |
| Ins. Claim Form | 1 Last Name | 7 | DB | 1 | Insured Customer Name Database Route | | | | 100% | 8 | 9 |
| Ins. Claim Form | 1 Last Name | 8 | ReRoute | 1 | Insert Field ReRoute Dest. in MGDS 50D | | | | | (9) | |
| Ins. Claim Form | 1 Last | 9 | Manual | 1 | Manual Verify & Correction | | | | | | |

TABLE 1-continued

Processing Template 33 for Insurance Claim Form - Field 1 - Last Name

| DOC ID | FIELD ID | STEP # | PROC. TYPE | TRIAL # | OPERATION | MAX RECO REJ ERROR | MAX RECO SUSP. ERROR | MIN AI CERTY | MIN DB CERTY | NEXT STEP IF ERROR | NEXT STEP IF OK |
|---|---|---|---|---|---|---|---|---|---|---|---|
| | Name | | | | Routine | | | | | | |

TEMPLATE NAME "Flood Claims" — BRANCH VALUES

TABLE 2

Processing Template for Insurance Claim Form - Field 2 - First Name

TEMPLATE NAME "Flood Claims" — BRANCH VALUES

| DOC ID | FIELD ID | STEP # | PROC. TYPE | TRIAL # | OPERATION | MAX RECO REJ ERROR | MAX RECO SUSP. ERROR | MIN AI CERTY | MIN DB CERTY | NEXT STEP IF ERROR | NEXT STEP IF OK |
|---|---|---|---|---|---|---|---|---|---|---|---|
| Ins. Claim Form | 2 First Name | 1 | Field Extrc | 1 | Field Extraction Routine | | | | | 2 | 3 |
| Ins. Claim Form | 2 First Name | 2 | ReRoute | 1 | Insert Field ReRoute Dest. in MGDS 50A | | | | | (12) | |
| Ins. Claim Form | 2 First Name | 3 | Reco | 1 | Handprint Reco Routine | 1 | 1 | | | 4 | 7 |
| Ins. Claim Form | 2 First Name | 4 | Reco | 2 | Fast Reco. Routine | 1 | 1 | | | 5 | 7 |
| Ins. Claim Form | 2 First Name | 5 | Reco | 3 | Accurate Reco. Routine | 1 | 1 | | | 6 | 7 |
| Ins. Claim Form | 2 First Name | 6 | ReRoute | 1 | Insert Field ReRoute Dest. in MGDS 50B | | | | | (12) | |
| Ins. Claim Form | 2 First Name | 7 | AI | 1 | English First Name Lexical Rout. | | | 50% | | 8 | 10 |
| Ins. Claim Form | 2 First Name | 8 | AI | 2 | International First Name Lexical Rout. | | | 50% | | 9 | 10 |
| Ins. Claim Form | 2 First Name | 9 | ReRoute | 1 | Insert Field ReRoute Dest. in MGDS 50C | | | | | (12) | |
| Ins. Claim Form | 2 First Name | 10 | DB | 1 | Insured Customer Name Database Rout | | | | 100% | 11 | 12 |
| Ins. Claim Form | 2 First Name | 11 | ReRoute | 1 | Insert Field ReRoute Dest. in MGDS 50D | | | | | (12) | |
| Ins. Claim Form | 2 First Name | 12 | Manual | 1 | Manual Verify & Correction Routine | | | | | | |

TABLE 3

Processing Template for Insurance Claim Form - Field 3 - State Abbr

TEMPLATE NAME "Flood Claims" — BRANCH VALUES

| DOC ID | FIELD ID | STEP # | PROC. TYPE | TRIAL # | OPERATION | MAX RECO REJ ERROR | MAX RECO SUSP. ERROR | MIN AI CERTY | MIN DB CERTY | NEXT STEP IF ERROR | NEXT STEP IF OK |
|---|---|---|---|---|---|---|---|---|---|---|---|
| Ins. Claim Form | 3 State Abbr. | 1 | Field Extrc | 1 | Field Extraction Routine | | | | | 2 | 3 |
| Ins. Claim Form | 3 State Abbr. | 2 | ReRoute | 1 | Insert Field ReRoute Dest. in MGDS 50A | | | | | (11) | |
| Ins. Claim Form | 3 State Abbr. | 3 | Skip If Redun | 1 | Check Related Fields | 0 | 0 | | | 4 | |
| Ins. Claim Form | 3 State Abbr. | 4 | Reco | 1 | Handprint Reco Routine | 0 | 0 | | | 5 | 8 |
| Ins. Claim Form | 3 State Abbr. | 5 | Reco | 2 | Fast Reco. Routine | 0 | 0 | | | 6 | 8 |
| Ins. Claim | 3 | 6 | Reco | 3 | Accurate | 0 | 0 | | | 7 | 8 |

TABLE 3-continued

Processing Template for Insurance Claim Form - Field 3 - State Abbr

<table>
<tr><th colspan="5">TEMPLATE NAME "Flood Claims"</th><th colspan="4">BRANCH VALUES</th><th>NEXT STEP</th><th>NEXT STEP</th></tr>
<tr><th>DOC ID</th><th>FIELD ID</th><th>STEP #</th><th>PROC. TYPE</th><th>TRIAL #</th><th>OPERATION</th><th>MAX RECO REJ ERROR</th><th>MAX RECO SUSP. ERROR</th><th>MIN AI CERTY</th><th>MIN DB CERTY</th><th>IF ERROR</th><th>IF OK</th></tr>
<tr><td>Form</td><td>State Abbr.</td><td></td><td></td><td></td><td>Reco. Routine</td><td></td><td></td><td></td><td></td><td></td><td></td></tr>
<tr><td>Ins. Claim Form</td><td>3 State Abbr.</td><td>7</td><td>ReRoute</td><td>1</td><td>Insert Field ReRoute Dest. in MGDS 50B</td><td></td><td></td><td></td><td></td><td>(11)</td><td></td></tr>
<tr><td>Ins. Claim Form</td><td>3 State Abbr.</td><td>8</td><td>Skip If Redun</td><td>1</td><td>Check Related Fields</td><td></td><td></td><td>100%</td><td></td><td></td><td>9</td></tr>
<tr><td>Ins. Claim Form</td><td>3 State Abbr.</td><td>9</td><td>AI</td><td>1</td><td>State Abbr. Lexical Routine</td><td></td><td></td><td>100%</td><td></td><td>10</td><td>11</td></tr>
<tr><td>Ins. Claim Form</td><td>3 State Abbr.</td><td>10</td><td>ReRoute</td><td>1</td><td>Insert Field ReRoute Dest. in MGDS 50C</td><td></td><td></td><td></td><td></td><td>(11)</td><td></td></tr>
<tr><td>Ins. Claim Form</td><td>3 State Abbr.</td><td>11</td><td>Manual</td><td>1</td><td>Manual Verify & Correction Routine</td><td></td><td></td><td></td><td></td><td></td><td></td></tr>
</table>

TABLE 4

Processing Template for Insurance Claim Form - Field 4 - Address

<table>
<tr><th colspan="5">TEMPLATE NAME "Flood Claims"</th><th colspan="4">BRANCH VALUES</th><th>NEXT STEP</th><th>NEXT STEP</th></tr>
<tr><th>DOC ID</th><th>FIELD ID</th><th>STEP #</th><th>PROC. TYPE</th><th>TRIAL #</th><th>OPERATION</th><th>MAX RECO REJ ERROR</th><th>MAX RECO SUSP. ERROR</th><th>MIN AI CERTY</th><th>MIN DB CERTY</th><th>IF ERROR</th><th>IF OK</th></tr>
<tr><td>Ins. Claim Form</td><td>4 Address</td><td>1</td><td>Skip</td><td>1</td><td>Skip Field</td><td></td><td></td><td></td><td></td><td></td><td></td></tr>
</table>

TABLE 5

Processing Template for Insurance Claim Form - Field 5 - Signature

<table>
<tr><th colspan="5">TEMPLATE NAME "Flood Claims"</th><th colspan="4">BRANCH VALUES</th><th>NEXT STEP</th><th>NEXT STEP</th></tr>
<tr><th>DOC ID</th><th>FIELD ID</th><th>STEP #</th><th>PROC. TYPE</th><th>TRIAL #</th><th>OPERATION</th><th>MAX RECO REJ ERROR</th><th>MAX RECO SUSP. ERROR</th><th>MIN AI CERTY</th><th>MIN DB CERTY</th><th>IF ERROR</th><th>IF OK</th></tr>
<tr><td>Ins. Claim Form</td><td>5 Signatur</td><td>1</td><td>Field Extrc</td><td>1</td><td>Field Extraction Routine</td><td></td><td></td><td></td><td></td><td>2</td><td>3</td></tr>
<tr><td>Ins. Claim Form</td><td>5 Signatur</td><td>2</td><td>ReRoute</td><td>1</td><td>Insert Field ReRoute Dest. in MGDS 50A</td><td></td><td></td><td></td><td></td><td>(4)</td><td></td></tr>
<tr><td>Ins. Claim Form</td><td>5 Signatur</td><td>3</td><td>Reco</td><td>1</td><td>Pass Through</td><td></td><td></td><td></td><td></td><td>4</td><td>4</td></tr>
<tr><td>Ins. Claim Form</td><td>5 Signatur</td><td>4</td><td>Manual</td><td>1</td><td>Manual Verify & Correction Routine</td><td></td><td></td><td></td><td></td><td></td><td></td></tr>
</table>

TABLE 6

Processing Template - Insurance Claim Form - Field 6 - Serial Number

<table>
<tr><th colspan="5">TEMPLATE NAME "Flood Claims"</th><th colspan="4">BRANCH VALUES</th><th>NEXT STEP</th><th>NEXT STEP</th></tr>
<tr><th>DOC ID</th><th>FIELD ID</th><th>STEP #</th><th>PROC. TYPE</th><th>TRIAL #</th><th>OPERATION</th><th>MAX RECO REJ ERROR</th><th>MAX RECO SUSP. ERROR</th><th>MIN AI CERTY</th><th>MIN DB CERTY</th><th>IF ERROR</th><th>IF OK</th></tr>
<tr><td>Ins. Claim Form</td><td>6 Ser. Num.</td><td>1</td><td>Field Extrc</td><td>1</td><td>Field Extraction Routine</td><td></td><td></td><td></td><td></td><td>2</td><td>3</td></tr>
<tr><td>Ins. Claim Form</td><td>6 Ser. Num.</td><td>2</td><td>ReRoute</td><td>1</td><td>Insert Field ReRoute Dest. in MGDS 50A</td><td></td><td></td><td></td><td></td><td>(5)</td><td></td></tr>
<tr><td>Ins. Claim Form</td><td>6 Ser. Num.</td><td>3</td><td>Reco</td><td>1</td><td>Fast Reco. Routine</td><td>1</td><td>1</td><td></td><td></td><td>4</td><td>5</td></tr>
<tr><td>Ins. Claim Form</td><td>6 Ser.</td><td>4</td><td>ReRoute</td><td>1</td><td>Insert Field ReRoute Dest.</td><td></td><td></td><td></td><td></td><td>(5)</td><td></td></tr>
</table>

TABLE 6-continued

Processing Template - Insurance Claim Form - Field 6 - Serial Number

TEMPLATE NAME "Flood Claims"

| DOC ID | FIELD ID | STEP # | PROC. TYPE | TRIAL # | OPERATION | MAX RECO REJ ERROR | MAX RECO SUSP. ERROR | MIN AI CERTY | MIN DB CERTY | NEXT STEP IF ERROR | NEXT STEP IF OK |
|---|---|---|---|---|---|---|---|---|---|---|---|
| Ins. Claim Form | Num. 6 Ser. Num. | 5 | Manual | 1 | in MGDS 50B Manual Verify & Correction Routine | | | | | | |

TABLE 7

Asian Template for Insurance Claim Form - Field 2 - First Name

TEMPLATE NAME "Asian Shipping Claims"

| DOC ID | FIELD ID | STEP # | PROC. TYPE | TRIAL # | OPERATION | MAX RECO REJ ERROR | MAX RECO SUSP. ERROR | MIN AI CERTY | MIN DB CERTY | NEXT STEP IF ERROR | NEXT STEP IF OK |
|---|---|---|---|---|---|---|---|---|---|---|---|
| Ins. Claim Form | 2 First Name | 1 | Field Extrc | 1 | Field Extraction Routine | | | | | 2 | 3 |
| Ins. Claim Form | 2 First Name | 2 | ReRoute | 1 | Insert Field ReRoute Dest. in MGDS 50A | | | | | (12) | |
| Ins. Claim Form | 2 First Name | 3 | Reco | 1 | Mandarin Character Reco. Routine | 1 | 1 | | | 4 | 7 |
| Ins. Claim Form | 2 First Name | 4 | Reco | 2 | Kanji Character Reco. Routine | 1 | 1 | | | 5 | 7 |
| Ins. Claim Form | 2 First Name | 5 | Reco | 3 | Accurate Reco. Routine | 1 | 1 | | | 6 | 7 |
| Ins. Claim Form | 2 First Name | 6 | ReRoute | 1 | Insert Field ReRoute Dest. in MGDS 50B | | | | | (12) | |
| Ins. Claim Form | 2 First Name | 7 | AI | 1 | Chinese First Name Lexical Rout. | | | 50% | | 8 | 10 |
| Ins. Claim Form | 2 First Name | 8 | AI | 2 | International First Name Lexical Rout. | | | 50% | | 9 | 10 |
| Ins. Claim Form | 2 First Name | 9 | ReRoute | 1 | Insert Field ReRoute Dest. in MGDS 50C | | | | | (12) | |
| Ins. Claim Form | 2 First Name | 10 | DB | 1 | Insured Customer Name Database Rout | | | | 100% | 11 | 12 |
| Ins. Claim Form | 2 First Name | 11 | ReRoute | 1 | Insert Field ReRoute Dest. in MGDS 50D | | | | | (12) | |
| Ins. Claim Form | 2 First Name | 12 | Manual | 1 | Manual Verify & Correction Routine | | | | | | |

TABLE 8

Eastern European Template for Ins. Claim Form - Field 2 - First Name

TEMPLATE NAME "East European Shipping"

| DOC ID | FIELD ID | STEP # | PROC. TYPE | TRIAL # | OPERATION | MAX RECO REJ ERROR | MAX RECO SUSP. ERROR | MIN AI CERTY | MIN DB CERTY | NEXT STEP IF ERROR | NEXT STEP IF OK |
|---|---|---|---|---|---|---|---|---|---|---|---|
| Ins. Claim Form | 2 First Name | 1 | Field Extrc | 1 | Field Extraction Routine | | | | | 2 | 3 |
| Ins. Claim Form | 2 First Name | 2 | ReRoute | 1 | Insert Field ReRoute Dest. in MGDS 50A | | | | | (12) | |
| Ins. Claim Form | 2 First Name | 3 | Reco | 1 | Cyrillic Character Reco. Routine | 1 | 1 | | | 4 | 7 |
| Ins. Claim Form | 2 First Name | 4 | Reco | 2 | Greek Character Reco. Routine | 1 | 1 | | | 5 | 7 |
| Ins. Claim | 2 | 5 | Reco | 3 | Accurate | 1 | 1 | | | 6 | 7 |

TABLE 8-continued

Eastern European Template for Ins. Claim Form - Field 2 - First Name

TEMPLATE NAME "East European Shipping"

| DOC ID | FIELD ID | STEP # | PROC. TYPE | TRIAL # | OPERATION | MAX RECO REJ ERROR | MAX RECO SUSP. ERROR | MIN AI CERTY | MIN DB CERTY | NEXT STEP IF ERROR | NEXT STEP IF OK |
|---|---|---|---|---|---|---|---|---|---|---|---|
| Form | First Name | | | | Reco. Routine | | | | | | |
| Ins. Claim Form | 2 First Name | 6 | ReRoute | 1 | Insert Field ReRoute Dest. in MGDS 50B | | | | | (12) | |
| Ins. Claim Form | 2 First Name | 7 | AI | 1 | Russian First Name Lexical Rout. | | | 50% | | 8 | 10 |
| Ins. Claim Form | 2 First Name | 8 | AI | 2 | International First Name Lexical Rout. | | | 50% | | 9 | 10 |
| Ins. Claim Form | 2 First Name | 9 | ReRoute | 1 | Insert Field ReRoute Dest. in MGDS 50C | | | | | (12) | |
| Ins. Claim Form | 2 First Name | 10 | DB | 1 | Insured Customer Name Database Rout | | | | 100% | 11 | 12 |
| Ins. Claim Form | 2 First Name | 11 | ReRoute | 1 | Insert Field ReRoute Dest. in MGDS 50D | | | | | (12) | |
| Ins. Claim Form | 2 First Name | 12 | Manual | 1 | Manual Verify & Correction Routine | | | | | | |

TABLE 9

Processing Template for Insurance Claim Form - Field 3 - Country

TEMPLATE NAME "International Claims"

| DOC ID | FIELD ID | STEP # | PROC. TYPE | TRIAL # | OPERATION | MAX RECO REJ ERROR | MAX RECO SUSP. ERROR | MIN AI CERTY | MIN DB CERTY | NEXT STEP IF ERROR | NEXT STEP IF OK |
|---|---|---|---|---|---|---|---|---|---|---|---|
| Ins. Claim Form | 3 Country | 1 | Field Extrc | 1 | Field Extraction Routine | | | | | 2 | 3 |
| Ins. Claim Form | 3 Country | 2 | ReRoute | 1 | Insert Field ReRoute Dest. in MGDS 50A | | | | | (11) | |
| Ins. Claim Form | 3 Country | 3 | Reco | 1 | Latin Alphabet Reco Routine | 1 | 1 | | | 4 | 9 |
| Ins. Claim Form | 3 Country | 4 | Reco | 2 | Cyrillic Alphabet Reco Routine | 1 | 1 | | | 5 | 9 |
| Ins. Claim Form | 3 Country | 5 | Reco | 3 | Greek Alphabet Reco Routine | 1 | 1 | | | 6 | 9 |
| Ins. Claim Form | 3 Country | 6 | Reco | 4 | Mandarin Alphabet Reco Routine | 1 | 1 | | | 7 | 9 |
| Ins. Claim Form | 3 Country | 7 | Reco | 5 | Arabic Alphabet Reco Routine | 1 | 1 | | | 8 | 9 |
| Ins. Claim Form | 3 Country | 8 | ReRoute | 1 | Insert Field ReRoute Dest. in MGDS 50B | | | | | (11) | |
| Ins. Claim Form | 3 Country | 9 | AI | 1 | KnowledgeBase List Search Routine | | | 100% | | 10 | 11 |
| Ins. Claim Form | 3 Country | 10 | ReRoute | 1 | Insert Field ReRoute Dest. in MGDS 50C | | | | | (11) | |
| Ins. Claim Form | 3 Country | 11 | Manual | 1 | Manual Verify & Correction Routine | | | | | | |

TABLE 10

Alphabet/Country AI Knowledge Base Reference Lists

| List = 1<br>Latin<br>Alphabet<br>Countries | List = 2<br>Cyrillic<br>Alphabet<br>Countries | List = 3<br>Greek<br>Alphabet<br>Countries | List = 4<br>Mandarin<br>Alphabet<br>Countries | List = 5<br>Arabic<br>Alphabet<br>Countries |
|---|---|---|---|---|
| Angola | Bulgaria | Albania | China | Afghanistan |
| Antigua | Byelorussia | Cyprus | Korea | Algeria |
| Argentina | Estonia | Greece | Mongolia | Bahrain |
| Australia | Latvia | . | Singapore | Egypt |
| Austria | Lithuania | . | . | Iran |
| . | Russia | . | . | Iraq |
| . | . | Yugoslavia | . | Jordan |
| . | . | . | Vietnam | Libya |
| Canada | . | | | . |
| Cape Verde | Urkaine | | | . |
| . | | | | . |
| . | | | | Yemen |
| France | | | | |
| Gabon | | | | |
| . | | | | |
| . | | | | |
| . | | | | |
| UK | | | | |
| USA | | | | |
| Zambia | | | | |
| Zimbabwe | | | | |

What is claimed is:

1. In a data processing system, a method for repairing character recognition errors for digital images of document forms, comprising:

inputting a document form processing template including a first sequence specification for a first plurality of character recognition processes and a second sequence specification for a second plurality of coded data repair processes;

inputting a digital document image of a document form and extracting a field image from said document image, forming a corresponding extracted field image;

selecting a character recognition process from said first plurality specified in said template and generating recognition coded data from said extracted field image and generating recognition error data using said selected character recognition process; and selecting a coded data repair process from said second plurality specified in said template and operating on said recognition coded data and said recognition error data to generate repaired coded data using said selected coded data repair process.

2. In a data processing system, a method for repairing character recognition errors for digital images of document forms, comprising:

inputting a document form processing template including a first sequence specification for a first plurality of character recognition processes and a second sequence specification for a second plurality of coded data repair processes;

inputting a digital document image of a document form and extracting a field image from said document image, forming a corresponding extracted field image;

selecting a character recognition process from said first plurality specified in said template and generating recognition coded data from said extracted field image and generating recognition error data using said selected character recognition process; and selecting a coded data repair process from said second plurality specified in said template and operating on said recognition coded data and said recognition error data to generate repaired coded data using said selected coded data repair process;

said form processing template including a first process step definition for a first character recognition process of a first field and a second process step definition for a second character recognition process of a second field on said document form;

said form processing template including a third process step definition for determining whether said second field is related to said first field and whether character recognition of said second field should be omitted; and omitting character recognition processing of said second field in response to said third process step definition.

3. In a data processing system, a method for repairing character recognition errors for digital images of document forms, comprising:

inputting a document form processing template including a first sequence specification for a first plurality of character recognition processes and a second sequence specification for a second plurality of coded data repair processes;

inputting a digital document image of a document form and extracting a field image from said document image, forming a corresponding extracted field image;

selecting a character recognition process from said first plurality specified in said template and generating recognition coded data from said extracted field image and generating recognition error data using said selected character recognition process; and selecting a coded data repair process from said second plurality specified in said template and operating on said recognition coded data and said recognition error data to generate repaired coded data using said selected coded data repair process;

said form processing template including a first process step definition for a first character recognition process of a first field and a second process step definition for a second character recognition process of a second field on said document form;

said form processing template including a third process step definition for determining whether said second field is related to said first field and whether character recognition of said second field should be omitted;

performing said first character recognition process of said first field and generating first recognition coded data;

determining that said first recognition coded data has a first certainty value; and omitting character recognition processing of said second field in response to said third process step definition and said first certainty value.

4. In a data processing system, a method for repairing character recognition errors for digital images of document forms, comprising:

inputting a document form processing template including a first sequence specification for a first plurality of character recognition processes and a second sequence specification for a second plurality of coded data repair processes;

inputting a digital document image of a document form and extracting a field image from said document image, forming a corresponding extracted field image;

selecting a character recognition process from said first plurality specified in said template and generating recognition coded data from said extracted field image and generating recognition error data using said selected character recognition process;

selecting a coded data repair process from said second plurality specified in said template and operating on said recognition coded data and said recognition error data to generate repaired coded data using said selected coded data repair process;

said form processing template including a first process step definition for a first coded data repair process of a first field and a second process step definition for a second coded data repair process of a second field on said document form;

said form processing template including a third process step definition for determining whether said second field is related to said first field and whether coded data repair of said second field should be omitted; and omitting coded data repair processing of said second field in response to said third process step definition.

5. In a data processing system, a method for repairing character recognition errors for digital images of document forms, comprising:

inputting a document form processing template including a first sequence specification for a first plurality of character recognition processes and a second sequence specification for a second plurality of coded data repair processes;

inputting a digital document image of a document form and extracting a field image from said document image, forming a corresponding extracted field image;

selecting a character recognition process from said first plurality specified in said template and generating recognition coded data from said extracted field image and generating recognition error data using said selected character recognition process;

selecting a coded data repair process from said second plurality specified in said template and operating on said recognition coded data and said recognition error data to generate repaired coded data using said selected coded data repair process;

said form processing template including a first process step definition for a first coded data repair process of a first field and a second process step definition for a second coded data repair process of a second field on said document form;

said form processing template including a third process step definition for determining whether said second field is related to said first field and whether coded data repair of said second field should be omitted;

performing said first coded data repair process of said first field and generating first coded data repair coded data;

determining that said first repaired coded data has a first certainty value; and omitting coded data repair processing of said second field in response to said third process step definition and said first certainty value.

6. In a data processing system, a method for repairing character recognition errors for digital images of document forms, comprising:

inputting a document form processing template including a first sequence specification for a first plurality of character recognition processes and a second sequence specification for a second plurality of coded data repair processes;

inputting a digital document image of a document form and extracting a field image from said document image, forming a corresponding extracted field image;

selecting a character recognition process from said first plurality specified in said template and generating recognition coded data from said extracted field image and generating recognition error data using said selected character recognition process;

selecting a coded data repair process from said second plurality specified in said template and operating on said recognition coded data and said recognition error data to generate repaired coded data using said selected coded data repair process;

said form processing template including a first process step definition to search for a first coded data repair process which is related to said selected character recognition process, and said step of selecting a coded data repair process further comprises reading said first process step definition and in response thereto, identifying said selected coded data repair process as being related to said selected character recognition process and performing said step of operating on said recognition coded data with said selected coded data repair process.

7. In a data processing system, a method for repairing character recognition errors for digital images of document forms, comprising:

inputting a document form processing template including a first sequence specification for a first plurality of character recognition processes and a second sequence specification for a second plurality of coded data repair processes;

inputting a digital document image of a document form and extracting a field image from said document image, forming a corresponding extracted field image;

selecting a character recognition process from said first plurality specified in said template and generating recognition coded data from said extracted field image and generating recognition error data using said selected character recognition process;

selecting a coded data repair process from said second plurality specified in said template and operating on said recognition coded data and said recognition error data to generate repaired coded data using said selected coded data repair process;

said form processing template including a first process step definition for a first coded data repair process of a first field and a second process step definition for a second coded data repair process of a second field on said document form;

said form processing template including a third process step definition for determining whether said second field is related to said first field and whether repaired coded data of said second field should be cross-checked with repaired coded data of said second field; and cross-checking repaired coded data of said first field with repaired coded data of said second field in response to said third process step definition.

8. In a data processing system, a method for repairing character recognition errors for digital images of document forms, comprising:

inputting a document form processing template including a first sequence specification for a first plurality of character recognition processes and a second sequence specification for a second plurality of coded data repair processes;

inputting a digital document image of a document form and extracting a field image from said document image, forming a corresponding extracted field image;

selecting a character recognition process from said first plurality specified in said template and generating recognition coded data from said extracted field image and generating recognition error data using said selected character recognition process;

selecting a coded data repair process from said second plurality specified in said template and operating on said recognition coded data and said recognition error data to generate repaired coded data using said selected coded data repair process;

said form processing template including a first process step definition for a first coded data repair process in said second sequence specification and a second process step definition for a second coded data repair process in said second sequence specification;

said form processing template including a third process step definition for selectively changing the order of performing said first coded data repair process and said second coded data repair process; and changing the order of performing said first coded data repair process and said second coded data repair process in response to said third process step definition.

9. In a data processing system, a method for repairing character recognition errors for digital images of document forms, comprising:

inputting a document form processing template including a first sequence specification for a first plurality of character recognition processes and a second sequence specification for a second plurality of coded data repair processes;

inputting a digital document image of a document form and extracting a field image from said document image, forming a corresponding extracted field image;

selecting a character recognition process from said first plurality specified in said template and generating recognition coded data from said extracted field image and generating recognition error data using said selected character recognition process;

selecting a coded data repair process from said second plurality specified in said template and operating on said recognition coded data and said recognition error data to generate repaired coded data using said selected coded data repair process;

said first sequence specification of said form processing template including a first process step definition for a first character recognition process of a first field and a second process step definition for a second character recognition process of a second field on said document form;

said form processing template including a third process step definition for selectively changing the order of performing said first character recognition process on said first field and said second character recognition process on said second field; and changing the order of performing said first character recognition process on said first field and said second character recognition process on said second field in response to said third process step definition.

10. In a data processing system, a method for repairing character recognition errors for digital images of document forms, comprising:

inputting a document form processing template including a first sequence specification for a first plurality of character recognition processes including first occurring and second occurring character recognition processes, said template including a second sequence specification for a second plurality of coded data repair processes, including first occurring and second occurring coded data repair processes;

inputting a digital document image of a document form and extracting a field image from said document image, forming a corresponding extracted field image;

selecting said first occurring character recognition process specified in said first plurality in said template and generating first recognition coded data from said extracted field image and generating first recognition error data using said first occurring character recognition process;

determining that said first recognition error data is greater than a first predetermined value, and in response thereto, selecting said second occurring character recognition process specified in said first plurality in said template and generating second recognition coded data from said extracted field image and generating second recognition error data using said second occurring character recognition process;

selecting said first occurring coded data repair process specified in said second plurality in said template and operating on said second recognition coded data and said second recognition error data to generate first repaired coded data using said first occurring coded data repair process; and determining that said first repaired coded data has less certainty than a second predetermined value, and in response thereto, selecting said second occurring coded data repair process specified in said second plurality in said template and operating on said second recognition coded data and said second recognition error data to generate second repaired coded data using said second occurring coded data repair process.

11. In a data processing, a method for repairing character recognition errors for digital images of document forms, comprising:

inputting a document form processing template including a first sequence specification for a first plurality of character recognition processes including first occurring and second occurring character recognition processes, said template including a second sequence specification for a second plurality of coded data repair processes, including first occurring and second occurring coded data repair processes;

inputting a digital document image of a document form and extracting a field image from said document image, forming a corresponding extracted field image;

selecting said first occurring character recognition process specified in said first plurality in said template and generating first recognition coded data from said extracted field image and generating first recognition error data using said first occurring character recognition process;

determining that said first recognition error data is greater than a first predetermined value, and in response thereto, selecting said second occurring character recognition process specified in said first plurality in said template and generating second recognition coded data from said extracted field image and generating second recognition error data using said second occurring character recognition process;

assembling a machine generated data structure which includes a field data segment including a coded data buffer portion and an error buffer portion for said extracted field image;

inserting said second recognition coded data into said coded data buffer portion and inserting said second recognition error data into said error buffer portion of said field data segment;

transferring said MGDS to said second plurality of coded data repair process, for repairing said second recognition coded data;

augmenting said MGDS with a repair segment which includes a repair data buffer portion;

selecting said first occurring coded data repair process from said second plurality in said template and operating on said second recognition coded data and said second recognition error data to generate first repaired coded data using said first occurring coded data repair process;

determining that said first repaired coded data has less certainty than a second predetermined value, and in response thereto, selecting said second occurring coded data repair process specified in said second plurality in said template and operating on said second recognition coded data and said second recognition error data to generate second repaired coded data using said second occurring coded data repair process;

inserting said second repaired coded data into said coded data buffer portion of said field data segment and inserting said second recognition coded data into said repair data buffer portion of said repair segment; and transferring said MGDS to a utilization device and accessing the contents of said coded data buffer portion of said field data segment for use as a corrected form of coded data representing said extracted field image.

12. In a data processing system, a method for assembling a document form processing template for defining a processing sequence to convert a document image into corrected coded data, comprising:

inputting document form data specifying a plurality of fields on a document form;

defining a first character recognition process sequence using said document form data, specifying a first plurality of character recognition processes for generating first recognition coded data for a first field of said plurality of fields; and defining a first coded data repair process sequence using said document form data, specifying a second plurality of coded data repair processes, for use in repairing character recognition errors of said first recognition coded data for said first field and generating first corrected coded data for said first field.

13. In a data processing system, a method for assembling a document form processing template for defining a processing sequence to convert a document image into corrected coded data, comprising:

inputting document form data specifying a plurality of fields on a document form;

defining a first character recognition process sequence using said document form data, specifying a first plurality of character recognition processes for generating first recognition coded data for a first field of said plurality of fields;

defining a first coded data repair process sequence using said document form data, specifying a second plurality of coded data repair processes, for use in repairing character recognition errors of said first recognition coded data for said first field and generating first corrected coded data for said first field;

defining a second character recognition process sequence using said document form data, specifying a third plurality of character recognition processes for generating second recognition coded data for a second field of said plurality of fields;

defining a second coded data repair process sequence using said document to form data, specifying a fourth plurality of coded data repair processes, for use in repairing character recognition errors of said second recognition coded data for said second field and generating second corrected coded data for said second field; and said second character recognition process sequence including a process step definition for determining whether said second field is related to said first field and whether character recognition of said second field should be omitted.

14. In a data processing system, a method for assembling a document form processing template for defining a processing sequence to convert a document image into corrected coded data, comprising:

inputting document form data specifying a plurality of fields on a document form;

defining a first character recognition process sequence using said document form data, specifying a first plurality of character recognition processes for generating first recognition coded data for a first field of said plurality of fields;

defining a first coded data repair process sequence using said document form data, specifying a second plurality of coded data repair processes, for use in repairing character recognition errors of said first recognition coded data for said first field and generating first corrected coded data for said first field;

defining a second character recognition process sequence using said document form data, specifying a third plurality of character recognition processes for generating second recognition coded data for a second field of said plurality of fields;

defining a second coded data repair process sequence using said document to form data, specifying a fourth plurality of coded data repair processes, for use in repairing character recognition errors of said second recognition coded data for said second field and generating second corrected coded data for said second field; and said second coded data repair process sequence including a process step definition for determining whether said second field is related to said first field and whether coded data repair of said second field should be omitted.

15. In a data processing system, a method for assembling a document form processing template for defining a processing sequence to convert a document image into corrected coded data, comprising:

inputting document form data specifying a plurality of fields on a document form;

defining a first character recognition process sequence using said document form data, specifying a first plurality of character recognition processes for generating first recognition coded data for a first field of said plurality of fields;

defining a first coded data repair process sequence using said document form data, specifying a second plurality of coded data repair processes, for use in repairing character recognition errors of said first recognition coded data for said first field and generating first corrected coded data for said first field;

defining a second character recognition process sequence using said document form data, specifying a third plurality of character recognition processes for generating second recognition coded data for a second field of said plurality of fields;

defining a second coded data repair process sequence using said document to form data, specifying a fourth plurality of coded data repair processes, for use in repairing character recognition errors of said second recognition coded data for said second field and generating second corrected coded data for said second field; and said second coded data repair process sequence including a process step definition for determining whether said second field is related to said first field and whether coded data repair of said first field should be cross-checked with repaired coded data on said second field.

16. A computer program for execution in a data processing system, to perform a process for repairing character recognition errors for digital images of document forms, the program when executed, performing the steps of:

inputting a document form processing template including a first sequence specification for a first plurality of character recognition processes and a second sequence specification for a second plurality of coded data repair processes;

inputting a digital document image of a document form and extracting a field image from said document image, forming a corresponding extracted field image;

selecting a character recognition process from said first plurality specified in said template and generating recognition coded data from said extracted field image and generating recognition error data using said selected character recognition process; and selecting a coded data repair process from said second plurality specified in said template and operating on said recognition coded data and said recognition error data to generate repaired coded data using said selected coded data repair process.

17. A computer program for execution in a data processing system, to perform a process for assembling a document form processing template for defining a processing sequence to convert a document image into corrected coded data, the program when executed, performing the steps of:

inputting document form data specifying a plurality of fields on a document form;

defining a first character recognition process sequence using said document form data, specifying a first plurality of character recognition processes for generating first recognition coded data for a first field of said plurality of fields;

defining a first coded data repair process sequence using said document form data, specifying a second plurality of coded data repair processes, for use in repairing character recognition errors of said first recognition coded data for said first field and generating first corrected coded data for said first field;

defining a second character recognition process sequence using said document form data, specifying a third plurality of character recognition processes for generating second recognition coded data for a second field of said plurality of fields;

defining a second coded data repair process sequence using said document form data, specifying a fourth plurality of coded data repair processes, for use in repairing character recognition errors of said second recognition coded data for said second field and generating second corrected coded data for said second field; and said second character recognition process sequence including a process step definition for determining whether said second field is related to said first field and whether character recognition of said second field should be omitted.

18. A data processing system, for repairing character recognition errors for digital images of document forms, comprising:

first input means for inputting a document form processing template including a first sequence specification for a first plurality of character recognition processes and a second sequence specification for a second plurality of coded data repair processes;

second input means for inputting a digital document image of a document form and extracting a field image from said document image, forming a corresponding extracted field image;

selection means coupled to said first input means, for selecting a character recognition process from said first plurality specified in said template;

recognition means coupled to said selection means and said second input means and generating recognition coded data from said extracted field image and generating recognition error data using said selected character recognition process; and from said second plurality specified in said template; repair means coupled to selection means and said recognition means for operating on said recognition coded data and said recognition error data to generate repaired coded data using said selected coded data repair process.

19. A data processing system for assembling a document form processing template for defining a processing sequence to convert a document image into corrected coded data, comprising:

input means for inputting document form data specifying a plurality of fields on a document form;

processor means coupled to said input means, for defining a first character recognition process sequence using said document form data, specifying a first plurality of character recognition processes for generating first recognition coded data for a first field of said plurality of fields;

said processor means defining a first coded data repair process sequence using said document form data, specifying a second plurality of coded data repair processes, for use in repairing character recognition errors of said first recognition coded data for said first field and generating first corrected coded data for said first field;

said processor means defining a second character recognition process sequence using said document form data, specifying a third plurality of character recognition processes for generating second recognition coded data for a second field of said plurality of fields;

said processor means defining a second coded data repair process sequence using said document form data, specifying a fourth plurality of coded data repair processes, for use in repairing character recognition errors of said second recognition coded data for said second field and generating second corrected coded data for said second field; and said second character recognition process sequence including a process step definition for determining whether said second field is related to said first field and whether character recognition of said second field should be omitted.

* * * * *